US008400704B2

(12) United States Patent
McCabe et al.

(10) Patent No.: US 8,400,704 B2
(45) Date of Patent: Mar. 19, 2013

(54) INTERIOR REARVIEW MIRROR SYSTEM FOR A VEHICLE

(75) Inventors: Ian A. McCabe, Holland, MI (US); Hamid Habibi, Holland, MI (US); Desaraju V. Varaprasad, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/555,553

(22) Filed: Jul. 23, 2012

(65) Prior Publication Data

US 2012/0281268 A1 Nov. 8, 2012

Related U.S. Application Data

(63) Continuation of application No. 12/965,052, filed on Dec. 10, 2010, now Pat. No. 8,228,588, which is a continuation of application No. 12/555,276, filed on Sep. 8, 2009, now Pat. No. 7,859,737, which is a continuation of application No. 12/342,452, filed on (Continued)

(51) Int. Cl.
*G02F 1/15* (2006.01)

(52) U.S. Cl. ........................................ 359/265; 359/267

(58) Field of Classification Search .................... 359/265
See application file for complete search history.

(56) References Cited

U.S. PATENT DOCUMENTS

| 1,096,452 A | 5/1914 | Perrin |
| 1,563,258 A | 11/1925 | Cunningham |
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |

(Continued)

FOREIGN PATENT DOCUMENTS

| AU | A-40317/95 | 2/1995 |
| CN | 1189224 | 7/1998 |

(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — James Jones
(74) *Attorney, Agent, or Firm* — Gardner, Linn, Burkhart & Flory, LLP

(57) ABSTRACT

An interior rearview mirror system for a vehicle includes an interior rearview mirror assembly including an electrochromic reflective element. A transflective mirror reflector is established at a third surface of a rear substrate of the mirror assembly. The mirror reflector has at least three layers, including a metallic layer, a transparent conductive metal oxide layer and a transparent dielectric metal oxide layer. The metallic layer is closer to the electrochromic medium than the transparent conductive metal oxide layer and the transparent dielectric metal oxide layer, and the transparent conductive metal oxide layer and the transparent dielectric metal oxide layer are disposed between the metallic layer and the third surface of the rear substrate. The at least three layers of the mirror reflector are established at the third surface of the rear substrate by a vacuum deposition process that includes sputtering from multiple sputtering targets in a single vacuum deposition chamber.

38 Claims, 33 Drawing Sheets

Related U.S. Application Data

Dec. 23, 2008, now Pat. No. 7,586,666, which is a continuation of application No. 11/860,223, filed on Sep. 24, 2007, now Pat. No. 7,471,438, which is a continuation of application No. 10/528,269, filed as application No. PCT/US03/29776 on Sep. 19, 2003, now Pat. No. 7,274,501.

(60) Provisional application No. 60/489,816, filed on Jul. 24, 2003, provisional application No. 60/424,116, filed on Nov. 5, 2002, provisional application No. 60/412,275, filed on Sep. 20, 2002.

(56) References Cited

U.S. PATENT DOCUMENTS

| | | |
|---|---|---|
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,664,479 A | 5/1987 | Hiroshi |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |

| | | | | | | |
|---|---|---|---|---|---|---|
| 4,729,076 | A | 3/1988 | Masami et al. | 5,017,903 | A | 5/1991 | Krippelz, Sr. |
| 4,731,669 | A | 3/1988 | Hayashi et al. | 5,018,839 | A | 5/1991 | Yamamoto et al. |
| 4,733,335 | A | 3/1988 | Serizawa et al. | 5,027,200 | A | 6/1991 | Petrossian et al. |
| 4,733,336 | A | 3/1988 | Skogler et al. | 5,037,182 | A | 8/1991 | Groves et al. |
| 4,740,838 | A | 4/1988 | Mase et al. | 5,038,255 | A | 8/1991 | Nishihashi et al. |
| 4,761,061 | A | 8/1988 | Nishiyama et al. | 5,052,163 | A | 10/1991 | Czekala |
| 4,773,740 | A | 9/1988 | Kawakami et al. | 5,056,899 | A | 10/1991 | Warszawski |
| 4,780,752 | A | 10/1988 | Angerstein et al. | 5,057,974 | A | 10/1991 | Mizobe |
| 4,781,436 | A | 11/1988 | Armbruster | 5,058,851 | A | 10/1991 | Lawlor et al. |
| 4,789,774 | A | 12/1988 | Koch et al. | 5,059,015 | A | 10/1991 | Tran |
| 4,789,904 | A | 12/1988 | Peterson | 5,066,108 | A | 11/1991 | McDonald |
| 4,793,690 | A | 12/1988 | Gahan et al. | 5,066,112 | A | 11/1991 | Lynam et al. |
| 4,793,695 | A | 12/1988 | Wada et al. | 5,069,535 | A | 12/1991 | Baucke et al. |
| 4,794,261 | A | 12/1988 | Rosen | 5,070,323 | A | 12/1991 | Iino et al. |
| D299,491 | S | 1/1989 | Masuda | 5,073,012 | A | 12/1991 | Lynam |
| 4,799,768 | A | 1/1989 | Gahan | 5,076,673 | A | 12/1991 | Lynam et al. |
| 4,803,599 | A | 2/1989 | Trine et al. | 5,076,674 | A | 12/1991 | Lynam |
| 4,807,096 | A | 2/1989 | Skogler et al. | 5,078,480 | A | 1/1992 | Warszawski |
| 4,820,933 | A | 4/1989 | Hong et al. | 5,096,287 | A | 3/1992 | Kakinami et al. |
| 4,825,232 | A | 4/1989 | Howdle | 5,100,095 | A | 3/1992 | Haan et al. |
| 4,826,289 | A | 5/1989 | Vandenbrink et al. | 5,101,139 | A | 3/1992 | Lechter |
| 4,827,086 | A | 5/1989 | Rockwell | 5,105,127 | A | 4/1992 | Lavaud et al. |
| 4,837,551 | A | 6/1989 | Iino | 5,115,346 | A | 5/1992 | Lynam |
| 4,842,378 | A | 6/1989 | Flasck et al. | 5,119,220 | A | 6/1992 | Narita et al. |
| 4,845,402 | A | 7/1989 | Smith | 5,121,200 | A | 6/1992 | Choi |
| 4,847,772 | A | 7/1989 | Michalopoulos et al. | 5,122,619 | A | 6/1992 | Dlubak |
| 4,855,161 | A | 8/1989 | Moser et al. | 5,123,077 | A | 6/1992 | Endo et al. |
| 4,855,550 | A | 8/1989 | Schultz, Jr. | 5,124,845 | A | 6/1992 | Shimojo |
| 4,859,813 | A | 8/1989 | Rockwell | 5,124,890 | A | 6/1992 | Choi et al. |
| 4,859,867 | A | 8/1989 | Larson et al. | 5,128,799 | A | 7/1992 | Byker |
| 4,860,171 | A | 8/1989 | Kojima | 5,130,898 | A | 7/1992 | Akahane |
| 4,862,594 | A | 9/1989 | Schierbeek et al. | 5,131,154 | A | 7/1992 | Schierbeek et al. |
| 4,871,917 | A | 10/1989 | O'Farrell et al. | 5,134,507 | A | 7/1992 | Ishii |
| 4,872,051 | A | 10/1989 | Dye | 5,134,549 | A | 7/1992 | Yokoyama |
| 4,882,466 | A | 11/1989 | Friel | 5,135,298 | A | 8/1992 | Feltman |
| 4,882,565 | A | 11/1989 | Gallmeyer | 5,136,483 | A | 8/1992 | Schöniger et al. |
| 4,883,349 | A | 11/1989 | Mittelhäuser | 5,140,455 | A | 8/1992 | Varaprasad et al. |
| 4,884,135 | A | 11/1989 | Schiffman | 5,140,465 | A | 8/1992 | Yasui et al. |
| 4,886,960 | A | 12/1989 | Molyneux et al. | 5,142,407 | A | 8/1992 | Varaprasad et al. |
| 4,889,412 | A | 12/1989 | Clerc et al. | 5,145,609 | A | 9/1992 | Varaprasad et al. |
| 4,891,828 | A | 1/1990 | Kawazoe | 5,148,306 | A | 9/1992 | Yamada et al. |
| 4,892,345 | A | 1/1990 | Rachael, III | 5,150,232 | A | 9/1992 | Gunkima et al. |
| 4,902,103 | A | 2/1990 | Miyake et al. | 5,151,816 | A | 9/1992 | Varaprasad et al. |
| 4,902,108 | A | 2/1990 | Byker | 5,151,824 | A | 9/1992 | O'Farrell |
| 4,906,085 | A | 3/1990 | Sugihara et al. | 5,154,617 | A | 10/1992 | Suman et al. |
| 4,909,606 | A | 3/1990 | Wada et al. | 5,158,638 | A | 10/1992 | Osanami et al. |
| 4,910,591 | A | 3/1990 | Petrossian et al. | 5,160,200 | A | 11/1992 | Cheselske |
| 4,916,374 | A | 4/1990 | Schierbeek et al. | 5,160,201 | A | 11/1992 | Wrobel |
| 4,917,477 | A | 4/1990 | Bechtel et al. | 5,166,815 | A | 11/1992 | Elderfield |
| 4,926,170 | A | 5/1990 | Beggs et al. | 5,168,378 | A | 12/1992 | Black et al. |
| 4,930,742 | A | 6/1990 | Schofield et al. | 5,173,881 | A | 12/1992 | Sindle |
| 4,933,814 | A | 6/1990 | Sanai | 5,177,031 | A | 1/1993 | Buchmann et al. |
| 4,935,665 | A | 6/1990 | Murata | 5,178,448 | A | 1/1993 | Adams et al. |
| 4,936,533 | A | 6/1990 | Adams et al. | 5,179,471 | A | 1/1993 | Caskey et al. |
| 4,937,796 | A | 6/1990 | Tendler | 5,183,099 | A | 2/1993 | Bechu |
| 4,937,945 | A | 7/1990 | Schofield et al. | 5,184,956 | A | 2/1993 | Langlarais et al. |
| 4,943,796 | A | 7/1990 | Lee | 5,189,537 | A | 2/1993 | O'Farrell |
| 4,948,242 | A | 8/1990 | Desmond et al. | 5,193,029 | A | 3/1993 | Schofield et al. |
| 4,953,305 | A | 9/1990 | Van Lente et al. | 5,197,562 | A | 3/1993 | Kakinama et al. |
| 4,956,591 | A | 9/1990 | Schierbeek et al. | 5,202,950 | A | 4/1993 | Arego et al. |
| 4,957,349 | A | 9/1990 | Clerc et al. | 5,207,492 | A | 5/1993 | Roberts |
| 4,959,247 | A | 9/1990 | Moser et al. | 5,210,967 | A | 5/1993 | Brown |
| 4,959,865 | A | 9/1990 | Stettiner et al. | 5,212,819 | A | 5/1993 | Wada |
| 4,970,653 | A | 11/1990 | Kenue | 5,214,408 | A | 5/1993 | Asayama |
| 4,973,844 | A | 11/1990 | O'Farrell et al. | 5,217,794 | A | 6/1993 | Schrenk |
| 4,974,122 | A | 11/1990 | Shaw | 5,223,814 | A | 6/1993 | Suman |
| 4,978,196 | A | 12/1990 | Suzuki et al. | 5,223,844 | A | 6/1993 | Mansell et al. |
| 4,983,951 | A | 1/1991 | Igarashi et al. | 5,229,975 | A | 7/1993 | Truesdell et al. |
| 4,985,809 | A | 1/1991 | Matsui et al. | 5,230,400 | A | 7/1993 | Kakinami et al. |
| 4,987,357 | A | 1/1991 | Masaki | 5,233,461 | A | 8/1993 | Dornan et al. |
| 4,989,956 | A | 2/1991 | Wu et al. | 5,235,316 | A | 8/1993 | Qualizza |
| 4,996,083 | A | 2/1991 | Moser et al. | 5,239,405 | A | 8/1993 | Varaprasad et al. |
| 5,001,386 | A | 3/1991 | Sullivan et al. | 5,239,406 | A | 8/1993 | Lynam |
| 5,001,558 | A | 3/1991 | Burley et al. | 5,243,417 | A | 9/1993 | Pollard |
| 5,005,213 | A | 4/1991 | Hanson et al. | 5,245,422 | A | 9/1993 | Borcherts et al. |
| 5,006,971 | A | 4/1991 | Jenkins | 5,252,354 | A | 10/1993 | Cronin et al. |
| 5,014,167 | A | 5/1991 | Roberts | 5,253,109 | A | 10/1993 | O'Farrell et al. |
| 5,016,988 | A | 5/1991 | Iimura | 5,255,442 | A | 10/1993 | Schierbeek et al. |
| 5,016,996 | A | 5/1991 | Ueno | 5,260,626 | A | 11/1993 | Takase et al. |

| Patent No. | Date | Inventor |
|---|---|---|
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,426,723 A | 6/1995 | Horsley |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,519,621 A | 5/1996 | Wortham |
| 5,521,744 A | 5/1996 | Mazurek |
| 5,521,760 A | 5/1996 | De Young et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenk et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,621,571 A | 4/1997 | Bantli et al. |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |

| | | |
|---|---|---|
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |

| | | | | | | |
|---|---|---|---|---|---|---|
| 6,008,486 | A | 12/1999 | Stam et al. | 6,130,448 A | 10/2000 | Bauer et al. |
| 6,008,871 | A | 12/1999 | Okumura | 6,132,072 A | 10/2000 | Turnbull et al. |
| 6,009,359 | A | 12/1999 | El-Hakim et al. | 6,137,620 A | 10/2000 | Guarr et al. |
| 6,016,035 | A | 1/2000 | Eberspächer et al. | 6,139,171 A | 10/2000 | Waldmann |
| 6,016,215 | A | 1/2000 | Byker | 6,139,172 A | 10/2000 | Bos et al. |
| 6,019,411 | A | 2/2000 | Carter et al. | 6,140,933 A | 10/2000 | Bugno et al. |
| 6,019,475 | A | 2/2000 | Lynam et al. | 6,142,656 A | 11/2000 | Kurth |
| 6,020,987 | A | 2/2000 | Baumann et al. | 6,146,003 A | 11/2000 | Thau |
| 6,021,371 | A | 2/2000 | Fultz | 6,147,934 A | 11/2000 | Arikawa et al. |
| 6,023,229 | A | 2/2000 | Bugno et al. | 6,148,261 A | 11/2000 | Obradovich et al. |
| 6,025,872 | A | 2/2000 | Ozaki et al. | 6,149,287 A | 11/2000 | Pastrick et al. |
| 6,028,537 | A | 2/2000 | Suman et al. | 6,150,014 A | 11/2000 | Chu et al. |
| 6,037,689 | A | 3/2000 | Bingle et al. | 6,151,065 A | 11/2000 | Steed et al. |
| 6,040,939 | A | 3/2000 | Demiryont et al. | 6,151,539 A | 11/2000 | Bergholz et al. |
| 6,042,253 | A | 3/2000 | Fant, Jr. et al. | 6,152,551 A | 11/2000 | Annas |
| 6,042,934 | A | 3/2000 | Guiselin et al. | 6,152,590 A | 11/2000 | Fürst et al. |
| 6,045,243 | A | 4/2000 | Muth et al. | 6,154,149 A | 11/2000 | Tyckowski et al. |
| 6,045,643 | A | 4/2000 | Byker et al. | 6,154,306 A | 11/2000 | Varaprasad et al. |
| 6,046,766 | A | 4/2000 | Sakata | 6,157,294 A | 12/2000 | Urai et al. |
| 6,046,837 | A | 4/2000 | Yamamoto | 6,157,418 A | 12/2000 | Rosen |
| 6,049,171 | A | 4/2000 | Stam et al. | 6,157,424 A | 12/2000 | Eichenlaub |
| D425,466 | S | 5/2000 | Todd et al. | 6,157,480 A | 12/2000 | Anderson et al. |
| 6,060,989 | A | 5/2000 | Gehlot | 6,158,655 A | 12/2000 | DeVries, Jr. et al. |
| 6,061,002 | A | 5/2000 | Weber et al. | 6,161,865 A | 12/2000 | Rose et al. |
| 6,062,920 | A | 5/2000 | Jordan et al. | 6,164,564 A | 12/2000 | Franco et al. |
| 6,064,508 | A | 5/2000 | Forgette et al. | 6,166,625 A | 12/2000 | Teowee et al. |
| 6,065,840 | A | 5/2000 | Caskey et al. | 6,166,629 A | 12/2000 | Hamma et al. |
| 6,066,920 | A | 5/2000 | Torihara et al. | 6,166,834 A | 12/2000 | Taketomi et al. |
| 6,067,111 | A | 5/2000 | Hahn et al. | 6,166,847 A | 12/2000 | Tench et al. |
| 6,067,500 | A | 5/2000 | Morimoto et al. | 6,166,848 A | 12/2000 | Cammenga et al. |
| 6,068,380 | A | 5/2000 | Lynn et al. | 6,167,255 A | 12/2000 | Kennedy, III et al. |
| D426,506 | S | 6/2000 | Todd et al. | 6,167,755 B1 | 1/2001 | Damson et al. |
| D426,507 | S | 6/2000 | Todd et al. | 6,169,955 B1 | 1/2001 | Fultz |
| D427,128 | S | 6/2000 | Mathieu | 6,170,956 B1 | 1/2001 | Rumsey et al. |
| 6,072,391 | A | 6/2000 | Suzukie et al. | 6,172,600 B1 | 1/2001 | Kakinami et al. |
| 6,074,077 | A | 6/2000 | Pastrick et al. | 6,172,601 B1 | 1/2001 | Wada et al. |
| 6,074,777 | A | 6/2000 | Reimers et al. | 6,172,613 B1 | 1/2001 | DeLine et al. |
| 6,076,948 | A | 6/2000 | Bukosky et al. | 6,173,501 B1 | 1/2001 | Blank et al. |
| 6,078,355 | A | 6/2000 | Zengel | 6,175,164 B1 | 1/2001 | O'Farrell et al. |
| 6,078,865 | A | 6/2000 | Koyanagi | 6,175,300 B1 | 1/2001 | Kendrick |
| D428,372 | S | 7/2000 | Todd et al. | 6,176,602 B1 | 1/2001 | Pastrick et al. |
| D428,373 | S | 7/2000 | Todd et al. | 6,178,034 B1 | 1/2001 | Allemand et al. |
| 6,082,881 | A | 7/2000 | Hicks | 6,178,377 B1 | 1/2001 | Ishihara et al. |
| 6,084,700 | A | 7/2000 | Knapp et al. | 6,181,387 B1 | 1/2001 | Rosen |
| 6,086,131 | A | 7/2000 | Bingle et al. | 6,182,006 B1 | 1/2001 | Meek |
| 6,086,229 | A | 7/2000 | Pastrick | 6,183,119 B1 | 2/2001 | Desmond et al. |
| 6,087,012 | A | 7/2000 | Varaprasad et al. | 6,184,679 B1 | 2/2001 | Popovic et al. |
| 6,087,953 | A | 7/2000 | DeLine et al. | 6,184,781 B1 | 2/2001 | Ramakesavan |
| 6,091,343 | A | 7/2000 | Dykema et al. | 6,185,492 B1 | 2/2001 | Kagawa et al. |
| 6,093,976 | A | 7/2000 | Kramer et al. | 6,185,501 B1 | 2/2001 | Smith et al. |
| 6,094,618 | A | 7/2000 | Harada | 6,188,505 B1 | 2/2001 | Lomprey et al. |
| D428,842 | S | 8/2000 | Todd et al. | 6,191,704 B1 | 2/2001 | Takenaga et al. |
| D429,202 | S | 8/2000 | Todd et al. | 6,193,379 B1 | 2/2001 | Tonar et al. |
| D430,088 | S | 8/2000 | Todd et al. | 6,193,912 B1 | 2/2001 | Thieste et al. |
| 6,097,023 | A | 8/2000 | Schofield et al. | 6,195,194 B1 | 2/2001 | Roberts et al. |
| 6,097,316 | A | 8/2000 | Liaw et al. | 6,196,688 B1 | 3/2001 | Caskey et al. |
| 6,099,131 | A | 8/2000 | Fletcher et al. | 6,198,409 B1 | 3/2001 | Schofield et al. |
| 6,099,155 | A | 8/2000 | Pastrick et al. | 6,199,014 B1 | 3/2001 | Walker et al. |
| 6,102,546 | A | 8/2000 | Carter | 6,199,810 B1 | 3/2001 | Wu et al. |
| 6,102,559 | A | 8/2000 | Nold et al. | 6,200,010 B1 | 3/2001 | Anders |
| 6,104,552 | A | 8/2000 | Thau et al. | 6,201,642 B1 | 3/2001 | Bos |
| 6,106,121 | A | 8/2000 | Buckley et al. | 6,206,553 B1 | 3/2001 | Boddy et al. |
| 6,111,498 | A | 8/2000 | Jobes, I et al. | 6,207,083 B1 | 3/2001 | Varaprasad et al. |
| 6,111,683 | A | 8/2000 | Cammenga et al. | 6,210,008 B1 | 4/2001 | Hoekstra et al. |
| 6,111,684 | A | 8/2000 | Forgette et al. | 6,210,012 B1 | 4/2001 | Broer |
| 6,111,685 | A | 8/2000 | Tench et al. | 6,212,470 B1 | 4/2001 | Seymour et al. |
| 6,111,696 | A | 8/2000 | Allen et al. | 6,217,181 B1 | 4/2001 | Lynam et al. |
| 6,115,086 | A | 9/2000 | Rosen | 6,218,934 B1 | 4/2001 | Regan |
| 6,115,651 | A | 9/2000 | Cruz | 6,222,447 B1 | 4/2001 | Schofield et al. |
| 6,116,743 | A | 9/2000 | Hoek | 6,222,460 B1 | 4/2001 | DeLine et al. |
| 6,118,219 | A | 9/2000 | Okigami et al. | 6,222,689 B1 | 4/2001 | Higuchi et al. |
| 6,122,597 | A | 9/2000 | Saneyoshi et al. | 6,227,689 B1 | 5/2001 | Miller |
| 6,122,921 | A | 9/2000 | Brezoczky et al. | 6,232,937 B1 | 5/2001 | Jacobsen et al. |
| 6,124,647 | A | 9/2000 | Marcus et al. | 6,236,514 B1 | 5/2001 | Sato |
| 6,124,886 | A | 9/2000 | DeLine et al. | 6,239,851 B1 | 5/2001 | Hatazawa et al. |
| 6,127,919 | A | 10/2000 | Wylin | 6,239,898 B1 | 5/2001 | Byker et al. |
| 6,127,945 | A | 10/2000 | Mura-Smith | 6,239,899 B1 | 5/2001 | DeVries et al. |
| 6,128,576 | A | 10/2000 | Nishimoto et al. | 6,243,003 B1 | 6/2001 | DeLine et al. |
| 6,130,421 | A | 10/2000 | Bechtel et al. | 6,244,716 B1 | 6/2001 | Steenwyk et al. |

| | | | | | | |
|---|---|---|---|---|---|---|
| 6,245,262 B1 | 6/2001 | Varaprasad et al. | | 6,362,548 B1 | 3/2002 | Bingle et al. |
| 6,247,820 B1 | 6/2001 | Van Order | | 6,363,326 B1 | 3/2002 | Scully |
| 6,249,214 B1 | 6/2001 | Kashiwazaki | | 6,366,013 B1 | 4/2002 | Leenders et al. |
| 6,249,310 B1 | 6/2001 | Lefkowitz | | 6,366,213 B2 | 4/2002 | DeLine et al. |
| 6,249,369 B1 | 6/2001 | Theiste et al. | | 6,369,701 B1 | 4/2002 | Yoshida et al. |
| 6,250,148 B1 | 6/2001 | Lynam | | 6,370,329 B1 | 4/2002 | Teuchert |
| 6,250,766 B1 | 6/2001 | Strumolo et al. | | 6,371,636 B1 | 4/2002 | Wesson |
| 6,250,783 B1 | 6/2001 | Stidham et al. | | 6,379,013 B1 | 4/2002 | Bechtel et al. |
| 6,255,639 B1 | 7/2001 | Stam et al. | | 6,379,788 B2 | 4/2002 | Choi et al. |
| 6,257,746 B1 | 7/2001 | Todd et al. | | 6,382,805 B1 | 5/2002 | Miyabukuro |
| 6,259,412 B1 | 7/2001 | Duroux | | 6,385,139 B1 | 5/2002 | Arikawa et al. |
| 6,259,475 B1 | 7/2001 | Ramachandran et al. | | 6,386,742 B1 | 5/2002 | DeLine et al. |
| 6,260,608 B1 | 7/2001 | Kim | | 6,390,529 B1 | 5/2002 | Bingle et al. |
| 6,262,842 B1 | 7/2001 | Ouderkirk et al. | | 6,390,626 B2 | 5/2002 | Knox |
| 6,264,353 B1 | 7/2001 | Caraher et al. | | 6,390,635 B2 | 5/2002 | Whitehead et al. |
| 6,265,968 B1 | 7/2001 | Betzitza et al. | | 6,396,397 B1 | 5/2002 | Bos et al. |
| 6,268,803 B1 | 7/2001 | Gunderson et al. | | 6,396,408 B2 | 5/2002 | Drummond et al. |
| 6,268,837 B1 | 7/2001 | Kobayashi et al. | | 6,396,637 B2 | 5/2002 | Roest et al. |
| 6,269,308 B1 | 7/2001 | Kodaka et al. | | 6,407,468 B1 | 6/2002 | LeVesque et al. |
| 6,271,901 B1 | 8/2001 | Ide et al. | | 6,407,847 B1 | 6/2002 | Poll et al. |
| 6,274,221 B2 | 8/2001 | Smith et al. | | 6,408,247 B1 | 6/2002 | Ichikawa et al. |
| 6,276,821 B1 | 8/2001 | Pastrick et al. | | 6,411,204 B1 | 6/2002 | Bloomfield et al. |
| 6,276,822 B1 | 8/2001 | Bedrosian et al. | | 6,412,959 B1 | 7/2002 | Tseng |
| 6,277,471 B1 | 8/2001 | Tang | | 6,412,973 B1 | 7/2002 | Bos et al. |
| 6,278,271 B1 | 8/2001 | Schott | | 6,414,910 B1 | 7/2002 | Kaneko et al. |
| 6,278,377 B1 | 8/2001 | DeLine et al. | | 6,415,230 B1 | 7/2002 | Maruko et al. |
| 6,278,941 B1 | 8/2001 | Yokoyama | | 6,416,208 B2 | 7/2002 | Pastrick et al. |
| 6,280,068 B1 | 8/2001 | Mertens et al. | | 6,417,786 B2 | 7/2002 | Learman et al. |
| 6,280,069 B1 | 8/2001 | Pastrick et al. | | 6,418,376 B1 | 7/2002 | Olson |
| 6,281,804 B1 | 8/2001 | Haller et al. | | 6,419,300 B1 | 7/2002 | Pavao et al. |
| 6,286,965 B1 | 9/2001 | Caskey et al. | | 6,420,036 B1 | 7/2002 | Varaprasad et al. |
| 6,286,984 B1 | 9/2001 | Berg | | 6,420,800 B1 | 7/2002 | LeVesque et al. |
| 6,289,332 B2 | 9/2001 | Menig et al. | | 6,420,975 B1 | 7/2002 | DeLine et al. |
| 6,290,378 B1 | 9/2001 | Buchalla et al. | | 6,421,081 B1 | 7/2002 | Markus |
| 6,291,905 B1 | 9/2001 | Drummond et al. | | 6,424,272 B1 | 7/2002 | Gutta et al. |
| 6,291,906 B1 | 9/2001 | Marcus et al. | | 6,424,273 B1 | 7/2002 | Gutta et al. |
| 6,294,989 B1 | 9/2001 | Schofield et al. | | 6,424,786 B1 | 7/2002 | Beeson et al. |
| 6,296,379 B1 | 10/2001 | Pastrick | | 6,424,892 B1 | 7/2002 | Matsuoka |
| 6,297,781 B1 | 10/2001 | Turnbull et al. | | 6,426,492 B1 | 7/2002 | Bos et al. |
| 6,299,333 B1 | 10/2001 | Pastrick et al. | | 6,426,568 B2 | 7/2002 | Turnbull et al. |
| 6,300,879 B1 | 10/2001 | Ragan et al. | | 6,427,349 B1 | 8/2002 | Blank et al. |
| 6,301,039 B1 | 10/2001 | Tench | | 6,428,172 B1 | 8/2002 | Hutzel et al. |
| 6,304,173 B2 | 10/2001 | Pala et al. | | 6,433,676 B2 | 8/2002 | DeLine et al. |
| 6,305,807 B1 | 10/2001 | Schierbeek | | 6,433,680 B1 | 8/2002 | Ho |
| 6,310,611 B1 | 10/2001 | Caldwell | | 6,433,914 B1 | 8/2002 | Lomprey et al. |
| 6,310,714 B1 | 10/2001 | Lomprey et al. | | 6,437,688 B1 | 8/2002 | Kobayashi |
| 6,310,738 B1 | 10/2001 | Chu | | 6,438,491 B1 | 8/2002 | Farmer |
| 6,313,454 B1 | 11/2001 | Bos et al. | | 6,439,755 B1 | 8/2002 | Fant, Jr. et al. |
| 6,314,295 B1 | 11/2001 | Kawamoto | | 6,441,872 B1 | 8/2002 | Ho |
| 6,315,440 B1 | 11/2001 | Satoh | | 6,441,943 B1 | 8/2002 | Roberts et al. |
| 6,317,057 B1 | 11/2001 | Lee | | 6,441,963 B2 | 8/2002 | Murakami et al. |
| 6,317,180 B1 | 11/2001 | Kuroiwa et al. | | 6,441,964 B1 | 8/2002 | Chu et al. |
| 6,317,248 B1 | 11/2001 | Agrawal et al. | | 6,445,287 B1 | 9/2002 | Schofield et al. |
| 6,318,870 B1 | 11/2001 | Spooner et al. | | 6,447,128 B1 | 9/2002 | Lang et al. |
| 6,320,176 B1 | 11/2001 | Schofield et al. | | 6,449,082 B1 | 9/2002 | Agrawal et al. |
| 6,320,282 B1 | 11/2001 | Caldwell | | 6,452,533 B1 | 9/2002 | Yamabuchi et al. |
| 6,320,612 B1 | 11/2001 | Young | | 6,452,572 B1 | 9/2002 | Fan et al. |
| 6,324,295 B1 | 11/2001 | Valery et al. | | 6,456,438 B1 | 9/2002 | Lee et al. |
| 6,326,613 B1 | 12/2001 | Heslin et al. | | 6,462,795 B1 | 10/2002 | Clarke |
| 6,326,900 B2 | 12/2001 | DeLine et al. | | 6,463,369 B2 | 10/2002 | Sadano et al. |
| 6,329,925 B1 | 12/2001 | Skiver et al. | | 6,466,701 B1 | 10/2002 | Ejiri et al. |
| 6,330,511 B2 | 12/2001 | Ogura et al. | | 6,471,362 B1 | 10/2002 | Carter et al. |
| 6,331,066 B1 | 12/2001 | Desmond et al. | | 6,472,977 B1 | 10/2002 | Pöchmüller |
| 6,333,759 B1 | 12/2001 | Mazzilli | | 6,472,979 B2 | 10/2002 | Schofield et al. |
| 6,335,680 B1 | 1/2002 | Matsuoka | | 6,473,001 B1 | 10/2002 | Blum |
| 6,336,737 B1 | 1/2002 | Thau | | 6,474,853 B2 | 11/2002 | Pastrick et al. |
| 6,340,850 B2 | 1/2002 | O'Farrell et al. | | 6,476,731 B1 | 11/2002 | Miki et al. |
| 6,341,523 B2 | 1/2002 | Lynam | | 6,476,855 B1 | 11/2002 | Yamamoto |
| 6,344,805 B1 | 2/2002 | Yasui et al. | | 6,477,460 B2 | 11/2002 | Kepler |
| 6,346,698 B1 | 2/2002 | Turnbull | | 6,477,464 B2 | 11/2002 | McCarthy et al. |
| 6,347,880 B1 | 2/2002 | Fürst et al. | | 6,483,429 B1 | 11/2002 | Yasui et al. |
| 6,348,858 B2 | 2/2002 | Weis et al. | | 6,483,438 B2 | 11/2002 | DeLine et al. |
| 6,351,708 B1 | 2/2002 | Takagi et al. | | 6,483,613 B1 | 11/2002 | Woodgate et al. |
| 6,353,392 B1 | 3/2002 | Schofield et al. | | 6,487,500 B2 | 11/2002 | Lemelson et al. |
| 6,356,206 B1 | 3/2002 | Takenaga et al. | | 6,494,602 B2 | 12/2002 | Pastrick et al. |
| 6,356,376 B1 | 3/2002 | Tonar et al. | | 6,498,620 B2 | 12/2002 | Schofield et al. |
| 6,356,389 B1 | 3/2002 | Nilsen et al. | | 6,501,387 B2 | 12/2002 | Skiver et al. |
| 6,357,883 B1 | 3/2002 | Strumolo et al. | | 6,512,203 B2 | 1/2003 | Jones et al. |
| 6,362,121 B1 | 3/2002 | Chopin et al. | | 6,512,624 B2 | 1/2003 | Tonar et al. |

| | | |
|---|---|---|
| 6,513,252 B1 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,552,653 B2 | 4/2003 | Nakaho et al. |
| 6,553,308 B1 | 4/2003 | Uhlmann et al. |
| 6,559,761 B1 | 5/2003 | Miller et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B1 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,935 B2 | 12/2003 | Yeon et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsberg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |

| Patent No. | Date | Inventor |
|---|---|---|
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,001 B2 | 6/2005 | Okamoto et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,923,080 B1 | 8/2005 | Dobler et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wong |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,074,486 B2 | 7/2006 | Boire et al. |
| 7,081,810 B2 | 7/2006 | Henderson et al. |
| 7,085,633 B2 | 8/2006 | Nishira et al. |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,221,365 B1 | 5/2007 | Lévesque et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,232,594 B2 | 6/2007 | Miroshin et al. |

| | | |
|---|---|---|
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 | 7/2007 | Takagi et al. |
| 7,248,305 B2 | 7/2007 | Ootsuta et al. |
| 7,249,860 B2 | 7/2007 | Kulas et al. |
| 7,251,079 B2 | 7/2007 | Capaldo et al. |
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,637 B2 | 8/2008 | Weiss |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Schofield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,047 B2 | 3/2009 | Yoshimura |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |

| | | |
|---|---|---|
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,911,547 B2 | 3/2011 | Brott et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,031,225 B2 | 10/2011 | Watanabe et al. |
| 8,040,376 B2 | 10/2011 | Yamada et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | DeLine et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | DeLine et al. |
| 8,106,347 B2 | 1/2012 | Drummond et al. |
| 8,121,787 B2 | 2/2012 | Taylor et al. |
| 8,134,117 B2 | 3/2012 | Heslin et al. |
| 8,144,033 B2 | 3/2012 | Chinomi et al. |
| 8,154,418 B2 | 4/2012 | Hook et al. |
| 8,162,493 B2 | 4/2012 | Skiver et al. |
| 8,164,817 B2 | 4/2012 | Varaprasad et al. |
| 8,169,307 B2 | 5/2012 | Nakamura et al. |
| 8,177,376 B2 | 5/2012 | Weller et al. |
| 8,179,236 B2 | 5/2012 | Weller et al. |
| 8,179,437 B2 | 5/2012 | Schofield et al. |
| 8,179,586 B2 | 5/2012 | Schofield et al. |
| 8,194,132 B2 | 6/2012 | Dayan et al. |
| 8,194,133 B2 | 6/2012 | De Wind et al. |
| 8,217,887 B2 | 7/2012 | Sangam et al. |
| 8,228,588 B2 | 7/2012 | McCabe et al. |
| 8,237,909 B2 | 8/2012 | Ostreko et al. |
| 8,282,224 B2 | 10/2012 | Anderson et al. |
| 8,294,975 B2 | 10/2012 | Varaprasad et al. |
| 8,304,711 B2 | 11/2012 | Drummond et al. |
| 2001/0026316 A1 | 10/2001 | Senatore |
| 2001/0035853 A1 | 11/2001 | Hoelen et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittelmann et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0187378 A1 | 8/2006 | Bong et al. |
| 2006/0279522 A1 | 12/2006 | Kurihara |
| 2007/0064108 A1 | 3/2007 | Haler |
| 2007/0080585 A1 | 4/2007 | Lyu |
| 2007/0086097 A1 | 4/2007 | Motomiya et al. |
| 2007/0183037 A1 | 8/2007 | De Boer et al. |
| 2007/0262732 A1 | 11/2007 | Shen |
| 2008/0042938 A1 | 2/2008 | Cok |
| 2008/0068520 A1 | 3/2008 | Minikey, Jr. et al. |
| 2009/0002491 A1 | 1/2009 | Haler |
| 2009/0040778 A1 | 2/2009 | Takayanagi et al. |
| 2009/0052003 A1 | 2/2009 | Schofield et al. |
| 2009/0096937 A1 | 4/2009 | Bauer et al. |
| 2009/0201137 A1 | 8/2009 | Weller et al. |
| 2009/0258221 A1 | 10/2009 | Diehl et al. |
| 2009/0262192 A1 | 10/2009 | Schofield et al. |
| 2009/0296190 A1 | 12/2009 | Anderson et al. |
| 2010/0045899 A1 | 2/2010 | Ockerse |
| 2010/0195226 A1 | 8/2010 | Heslin et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2010/0289995 A1 | 11/2010 | Hwang et al. |

FOREIGN PATENT DOCUMENTS

| | | |
|---|---|---|
| DE | 941408 | 4/1956 |
| DE | 944531 | 7/1956 |
| DE | 7323996 | 11/1973 |
| DE | 2808260 | 8/1979 |
| DE | 3248511 A1 | 7/1984 |
| DE | 3301945 | 7/1984 |
| DE | 3614882 | 11/1987 |
| DE | 3720848 | 1/1989 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| DE | 102005000650 | 7/2006 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1193773 | 3/2002 |
| EP | 1256833 | 11/2002 |
| EP | 0899157 | 10/2004 |
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-102602 | 6/1982 |
| JP | 57-208530 | 12/1982 |
| JP | 58-020954 | 2/1983 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61-127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62-131232 | 6/1987 |
| JP | 63-02753 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01-130578 | 5/1989 |
| JP | 02-122844 | 10/1990 |
| JP | 03-028947 | 3/1991 |
| JP | 03-28947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-146467 | 6/1995 |
| JP | 07-175053 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-097116 | 4/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-182454 | 3/2003 |
| JP | 2003-267129 | 9/2003 |
| JP | 2004-182156 | 7/2004 |
| JP | 2005-148119 | 6/2005 |
| JP | 2005-280526 | 10/2005 |
| JP | 2005-327600 | 11/2005 |
| JP | 38-46073 | 11/2006 |
| JP | 2008-083657 | 4/2008 |

| | | |
|---|---|---|
| KR | 20060038856 | 5/2006 |
| KR | 100663930 | 1/2007 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO 03/078941 | 9/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/a_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publising Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

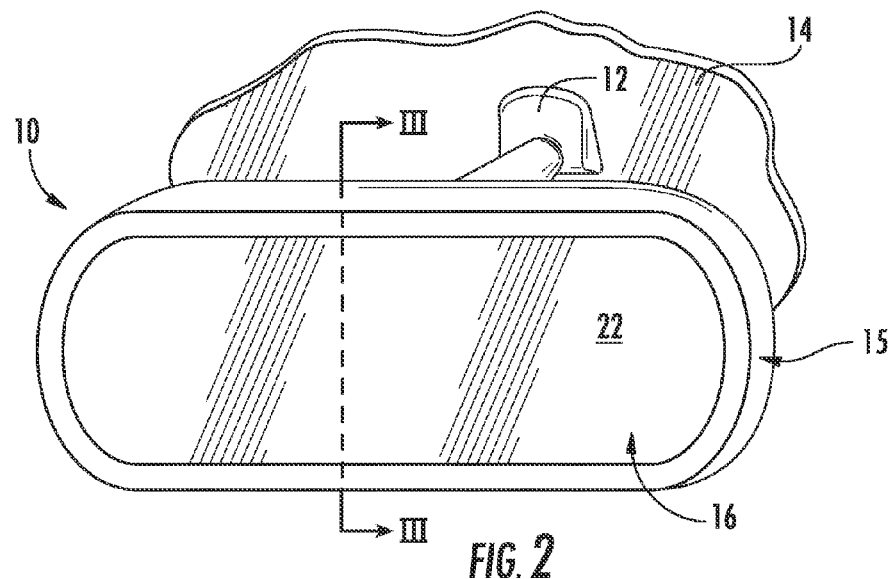
FIG. 2
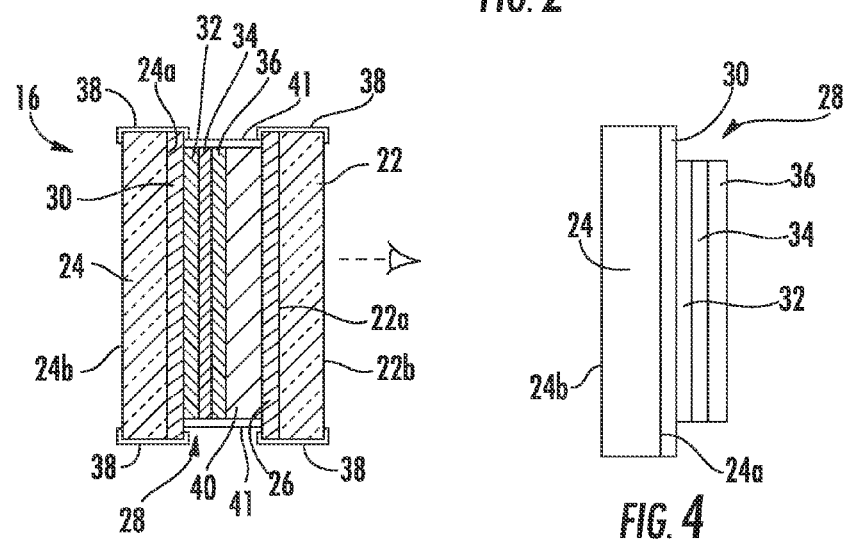
FIG. 3
FIG. 4
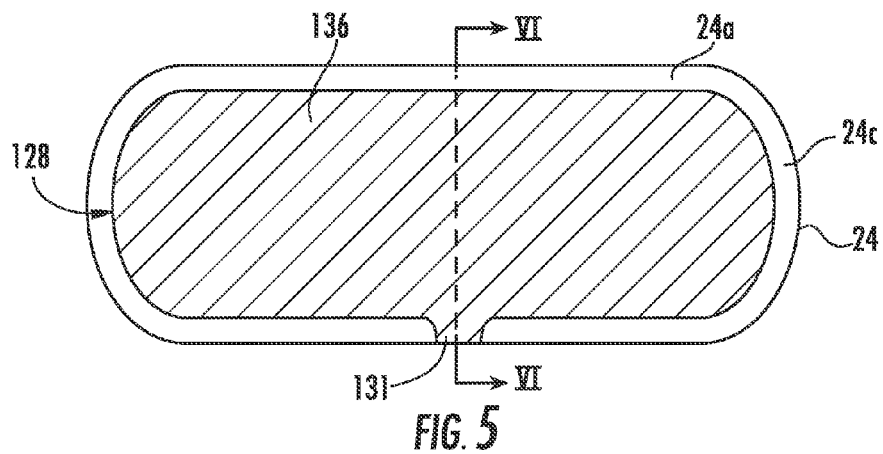
FIG. 5

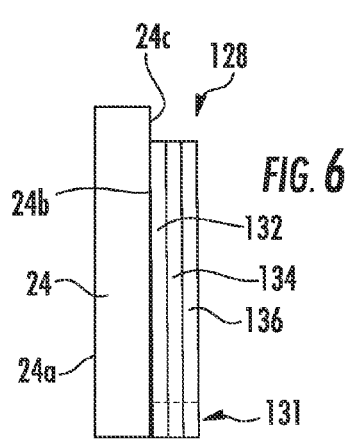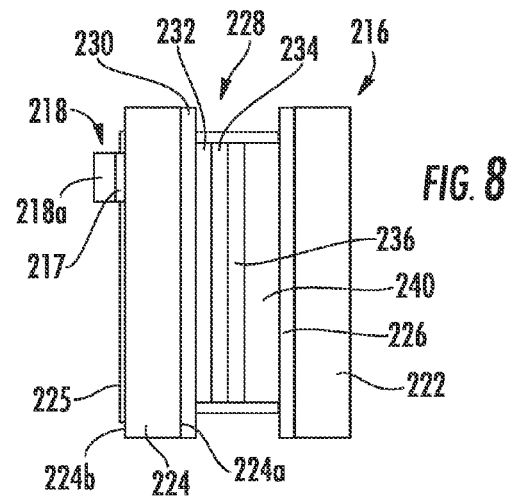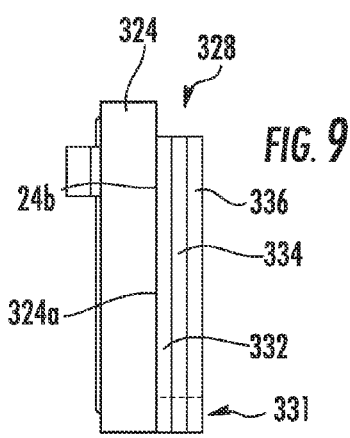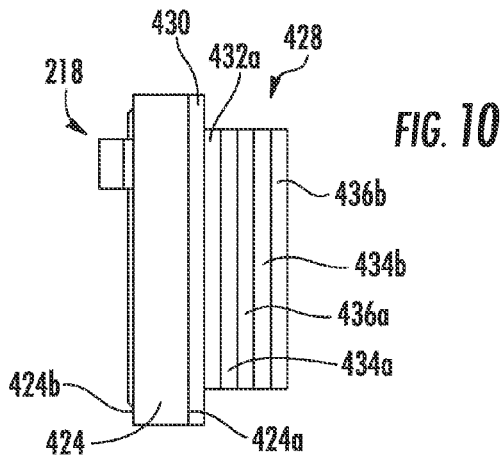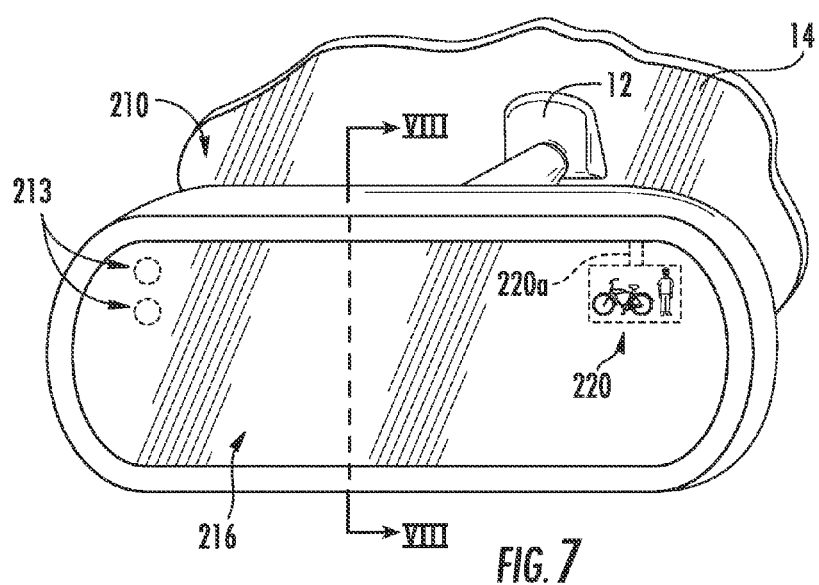

IMPROVED DOD, TUNED TO ORANGE VF DISPLAY

BLUE-GREEN VF DISPLAY: EMISSION SPECTRUM
IMPROVED DOD TUNED TO BLUE-GREEN VF DISPLAY

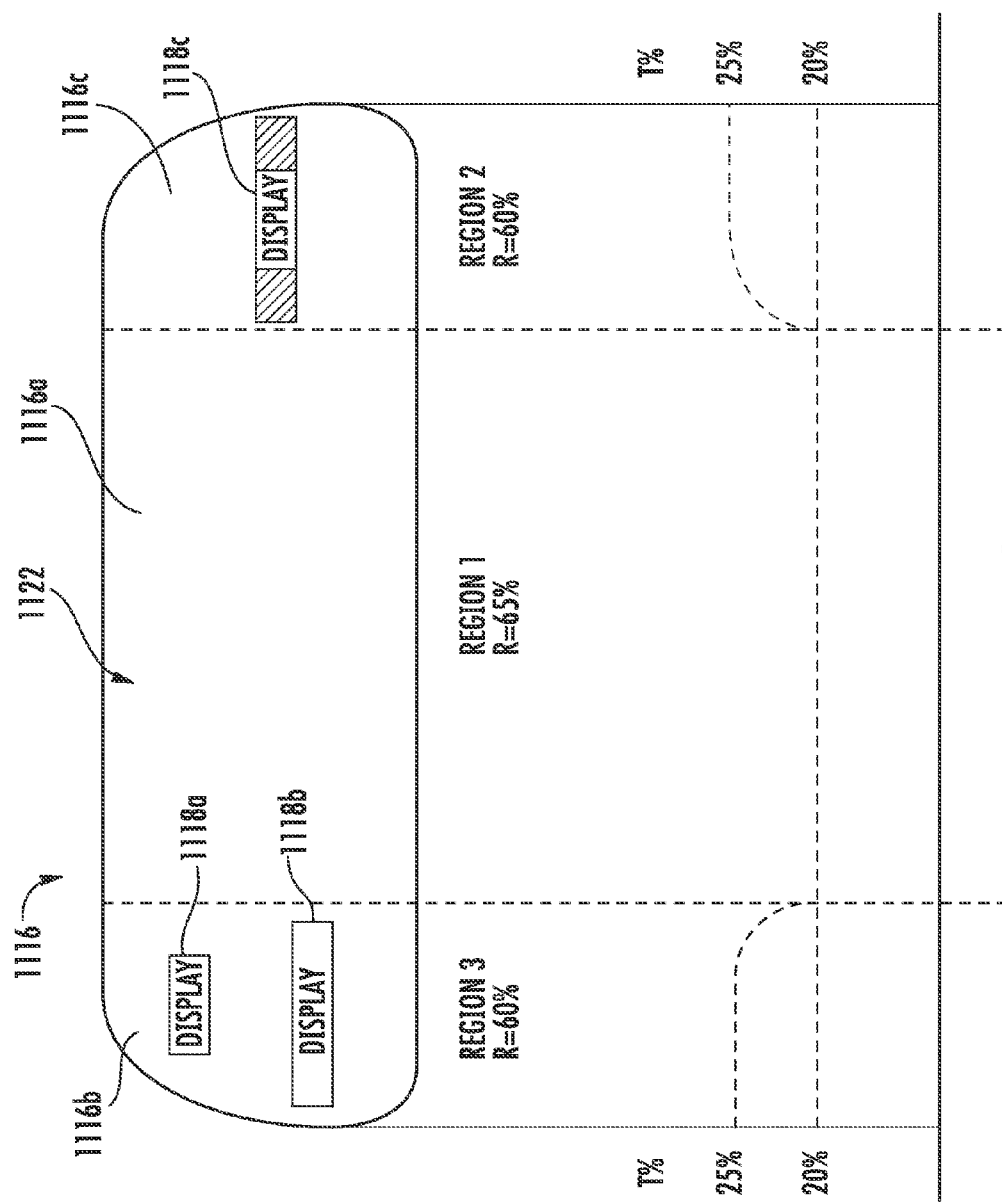

INTERIOR REARVIEW MIRROR SYSTEM FOR A VEHICLE

CROSS REFERENCE TO RELATED APPLICATIONS

The present application is a continuation of U.S. patent application Ser. No. 12/965,052, filed Dec. 10, 2010, now U.S. Pat. No. 8,228,588, which is a continuation of U.S. patent application Ser. No. 12/555,276, filed Sep. 8, 2009, now U.S. Pat. No. 7,859,737, which is a continuation of U.S. patent application Ser. No. 12/342,452, filed Dec. 23, 2008, now U.S. Pat. No. 7,586,666, which is a continuation of U.S. patent application Ser. No. 11/860,223, filed Sep. 24, 2007, now U.S. Pat. No. 7,471,438, which is a continuation of U.S. patent application Ser. No. 10/528,269, filed Mar. 17, 2005, now U.S. Pat. No. 7,274,501, which is a 371 application of PCT Application No. PCT/US2003/029776, filed Sep. 19, 2003, which claims priority of U.S. provisional applications, Ser. No. 60/412,275, filed Sep. 20, 2002; Ser. No. 60/424,116, filed Nov. 5, 2002; and Ser. No. 60/489,816, filed Jul. 24, 2003, which are all hereby incorporated herein by reference in their entireties.

FIELD OF THE INVENTION

The present invention relates to a mirror reflective element assembly for a vehicle, such as an electro-optic mirror reflective element assembly, such as an electrochromic interior or exterior rearview mirror reflective element assembly, and, more particularly, to a rearview mirror reflective element assembly which provides transmission of display information or illumination or radiant energy through the reflective element of the mirror reflective element assembly, while providing sufficient reflectance of the reflective element. Aspects of the present invention are equally applicable to interior and exterior mirror reflective element assemblies, as well as to prismatic mirror reflective element assemblies or other mirror reflective element assemblies having a single glass substrate.

BACKGROUND OF THE INVENTION

Variable reflectivity mirror assemblies, such as electrochromic mirror assemblies are known and are widely implemented in vehicles. The reflective element of the mirror assemblies often include two substrates or glass elements. The back or outer surface of the second substrate (commonly referred to as the "fourth surface" of the reflective element) may include a silvered coating to provide reflectance of an image. In embodiments where the mirror assembly may include a display, a window may be formed, such as by sand blasting, laser etching or the like, through the silvered coating, such that display information may be transmitted through the window for viewing by the driver. The window provides a highly transmissive, generally spectrally neutral window for the display. However, the window defines an area of the reflective element that no longer has the reflective coating, such that reflectivity is lost in the window area. Therefore, the size and the quantity of displays that can be provided at the mirror reflective element is limited.

It is known to provide a metallic reflective layer on an inward surface of the second substrate of the electrochromic reflective element (commonly known in the art as a "third surface" of the reflective element), such as disclosed in U.S. Pat. No. 3,280,701, which is hereby incorporated herein by reference. An electrochromic medium may be positioned between the metallic layer and a transparent electrically conductive layer on the inward surface of the first substrate (i.e., the "second surface" of the reflective element). However, there are concerns with the electrochromic medium of such mirror assemblies contacting the metallic layer, since chemical and/or electro-chemical attack on the metallic layer may result in corrosion of the metallic layer.

As disclosed in U.S. Pat. No. 5,724,187, which is hereby incorporated herein by reference, a metallic conductive layer may be disposed on the third surface, with a protective layer, such as a transparent semi-conductive layer of indium tin oxide, disposed on the metallic layer. The electrochromic medium is then positioned between the protective layer and a conductive layer on the inward surface of the first substrate. It is preferable for such designs to include an adhesion layer, such as a second transparent semi-conductive layer, such as indium tin oxide, or another metallic layer between the metallic layer and the inward surface of the second substrate, in order to enhance adhesion of the metallic layer to the second substrate.

In electrochromic mirror assemblies which include a display that may transmit through the substrates of the reflective element, the metallic layer or coating must be thin enough to be transmissive to allow viewing of the display through the metallic coating. It is known to provide a thinner metallic coating in a display area to provide increased transmissivity (but with a consequently reduced reflectivity) only in the display area or areas of the reflective element, such as disclosed in U.S. Pat. No. 6,356,376, which is hereby incorporated herein by reference. However, such designs have layers or coatings that are relatively thin (often less than 150 Å or thereabouts in thickness) and so any variation in metallic layer thickness may lead to a significant variation in light transmission through such thin metallic coatings. Thus, such significantly thin metallic coatings or layers may have a substantially low variability tolerance for the thickness and may require a substantially uniform thickness coating, in order to provide the desired results. Such tolerances and uniformity may be difficult to achieve through sputter coating or other coating processes typically used in the manufacture of such reflective elements. Therefore, such significantly thin metallic coatings may be difficult and costly to manufacture.

An example of a known electrochromic reflective element is shown in FIG. 1. The reflective element includes an electrochromic (EC) medium layer and a metallic reflective layer sandwiched between conductive layers at the front and rear glass substrates. A display is positioned at a rear surface of the rear substrate (the fourth surface of the reflective element). The display emits light through the substrates and layers therebetween so as to be viewable by a person viewing the first surface of the reflective element. Such known reflective elements provide little or no spectrally selective transmission characteristics of visible light, as can be seen with reference to FIG. 1A (which shows the transmissivity of the ITO and silver layers at the rear substrate versus the wavelength of the radiant energy), and may be subject to chemical/electrochemical corrosion through contact with the EC medium.

Sometimes it is desired to have an illumination source and/or a camera or imaging device or sensor at an interior rearview mirror assembly for illuminating and/or capturing images of the interior cabin of the vehicle, such as part of a cabin monitoring system, a driver alertness/drowsiness detection system, an intrusion detection system, a seat occupancy detection system and/or the like. The illumination sources and imaging device, if provided at the interior rearview mirror assembly, are typically positioned around the bezel, chin or eyebrow portion of the mirror casing or at a pod or module associated with the mirror assembly or elsewhere in the vehicle. The illumination sources and imaging device cannot typically be positioned within the mirror casing due to the difficulties encountered in projecting light or illumination through the reflective element to the cabin and allowing light from within the cabin to pass through the reflective element to the imaging device. Typically, such transmissivity of light, even of infrared or near infrared light, through the reflective element may not be achieved utilizing reflective coatings that comprise a metallic layer, such as a thin silver or silver alloy or aluminum or aluminum alloy layer or the like. In such applications, the infrared or near infrared light emitted by the illumination source may reflect back into the cavity of the mirror casing, such that a desired amount of light may not reach the cabin and such that the imaging device may be adversely affected by the reflectant light.

Therefore, there is a need in the art for an electrochromic mirror assembly which provides sufficient reflectivity and sufficient transmissivity to allow for transmission of display information or illumination through the reflective element, and which overcomes the above disadvantages and shortcomings of the prior art.

SUMMARY OF THE INVENTION

The present invention provides an interior or exterior rearview mirror assembly that has a mirror reflective element that may be spectrally tuned to substantially transmit light having a particular wavelength or range of wavelengths, while substantially reflecting other light. The mirror reflective element may comprise a third surface reflective element having a particular combination or stack of at least partially conductive layers (such as semi-conductive layers formed of at least partially conducting inorganic oxides, such as doped or undoped indium oxide, doped or undoped tin oxide, doped or undoped zinc oxide, doped or undoped nickel oxide, and/or doped or undoped tungsten oxide or the like) and metallic layer(s) at the third surface. The mirror assembly is suitable for including a display element which emits and transmits viewable information through the reflective element of the mirror assembly. More particularly, the mirror assembly of the present invention is suitable for including a display on demand (DOD) type of display. The mirror assembly of the present invention provides a particular combination of reflector design or designs suitable for a display on demand type of display which are economical and which match and/or make most beneficial use of a particular light emitting display element and color thereof. The present invention thus provides a spectrally selective transmission of visible light characteristic to the reflective element of the mirror assembly, while maintaining a substantially non-spectrally selective, substantially untinted reflectant characteristic, and while maintaining a relatively high photopic reflectance, such as greater than approximately 60% photopic reflectivity, more preferably greater than approximately 70% photopic reflectivity, and most preferably greater than approximately 80% photopic reflectivity. The spectrally selective transmissivity of the reflective element may thus be selected or tuned to optimize transmission of a particular spectral band or range of light wavelengths at least primarily emitted by the display element.

According to an aspect of the present invention, a mirror assembly for a vehicle comprises a mirror element including at least one substrate having a forward surface facing towards a viewer of the mirror assembly and a rearward surface facing away from a viewer of the mirror assembly. The mirror element comprises at least one substantially reflective metallic layer sandwiched between a respective pair of substantially transparent non-metallic layers. Each of the substantially transparent non-metallic layers and the substantially reflective metallic layer have a selected refractive index and a selected physical thickness such that the reflective element is selectively spectrally tuned to substantially transmit at least one preselected spectral band of radiant energy therethrough while substantially reflecting other radiant energy. A radiant energy emitting element is disposed at or near the rearward surface of the at least one substrate. The radiant energy emitting element is operable to emit radiant energy towards the rearward surface and through the mirror element. The radiant energy emitting element is operable to emit radiant energy with a peak intensity within the at least one preselected spectral band.

Optionally, the at least one preselected spectral band may comprise a preselected band of visible light, while the radiant energy emitting element may be operable to emit visible radiant energy or light with a peak intensity within the preselected spectral band of visible light. The radiant energy emitting element thus may provide a display on demand type of display for viewing of displayed or emitted information through the reflective element.

Optionally, the at least one preselected spectral band may comprise first and second preselected bands of radiant energy, while the radiant energy emitting element comprises first and second radiant energy emitting elements. The first radiant energy emitting element may be operable to emit radiant energy with a peak intensity within the first preselected spectral band of radiant energy and the second radiant energy emitting element may be operable to emit visible radiant energy with a peak intensity within the second preselected spectral band of radiant energy.

Optionally, the at least one preselected spectral band may comprise a preselected band of near infrared radiant energy, while the radiant energy emitting element may be operable to emit near infrared radiant energy with a peak intensity within the preselected spectral band of near infrared radiant energy. The mirror assembly may include an imaging sensor at or near the rear surface that may be sensitive to near infrared radiant energy.

Optionally, the mirror reflective element may comprise an electro-optic or electrochromic mirror element, and may comprise an electrochromic medium sandwiched between a pair of substrates. The non-metallic and metallic layers may be disposed on a third surface (the surface of the rear substrate that opposes electrochromic medium and the front substrate).

Optionally, the mirror reflective element may comprise a prismatic mirror element. The alternating non-metallic and metallic layers may be disposed on a rear surface of the prismatic element or substrate. The radiant energy emitting element may be positioned at a rear layer of the alternating layers and operable to emit radiant energy or light through the layers and the prismatic substrate, such that the information displayed or emitted by the radiant energy emitting element is viewable through the prismatic reflective element by a driver or occupant of the vehicle, while the prismatic reflective element substantially reflects light having other wavelengths or spectral bands. The radiant energy emitting element thus may provide a display on demand type of display to the prismatic mirror element.

According to another aspect of the present invention, an electrochromic mirror assembly for a vehicle comprises an electrochromic mirror element comprising a first substrate having first and second surfaces and a second substrate having third and fourth surfaces. The first and second substrates are arranged so that the second surface opposes the third surface with an electrochromic medium disposed therebetween. The third surface of the second substrate comprises a transflective reflector comprising a first substantially transparent semi-conductive non-metallic layer contacting the electrochromic medium, a second substantially transparent semi-conductive non-metallic layer, and a substantially reflective metallic conductive layer sandwiched between (and electrically in contact/connection with) the first and second substantially transparent semi-conductive non-metallic layers. When the mirror element is viewed from outside the first surface (such as by a driver or passenger within the vehicle), the mirror element is substantially spectrally untinted (i.e., is substantially spectrally unselective in photopic reflectivity) when no voltage is applied across the electrochromic medium. The mirror element is at least partially spectrally selective in transmission (i.e., is at least partially tinted for transmittant light) and exhibits a spectrally selective transmission characteristic, which is established by the refractive indices and physical thicknesses of the first and second substantially transparent semi-conductive non-metallic layers and the substantially reflective metallic conductive layer. The mirror assembly includes a light emitting or display element disposed at the fourth surface of the second substrate which is operable to emit light having an emitted spectral characteristic through the mirror element. The transflective reflector is configured to exhibit a spectrally selective transmission characteristic so as to substantially transmit light having a spectral band in regions at or near the emitted spectral characteristic and to substantially reflect other light.

Optionally, the second substantially transparent semi-conductive non-metallic layer may contact the third surface of the second substrate. Optionally, the transflective reflector may comprise two or more substantially reflective metallic conductive layers. Each of the two or more substantially reflective metallic conductive layers may be sandwiched between a respective pair of substantially transparent semi-conductive non-metallic layers disposed between the electrochromic medium and the second substrate.

Optionally, the transflective reflector may substantially transmit light or radiant energy having a spectral band in the near infrared region of the spectrum, while the light emitting or display element may emit near infrared light or radiant energy through the transflective reflector. The mirror assembly may include an imaging sensor at the fourth surface that is operable to sense near infrared light.

Optionally, the transflective reflector may substantially transmit light having a first spectral band at a first visible region of the spectrum, and may also substantially transmit light having a second spectral band at a second visible region of the spectrum. The light emitting or display element may emit light that has a peak intensity at or near the first visible region, while the mirror assembly may include a second light emitting element at the fourth surface that may emit light that has a peak intensity at or near the second visible region.

According to another aspect of the present invention, an electro-optic mirror assembly, such as an electrochromic mirror assembly, for a vehicle comprises an electrochromic mirror element comprising a first substrate having first and second surfaces and a second substrate having third and fourth surfaces. The first and second substrates are arranged so that the second surface opposes the third surface, with an electrochromic medium disposed between the second substrate and the first substrate. The mirror element comprises a transflective reflector at the third surface, which comprises at least one conductive metallic reflective layer sandwiched between first and second substantially transparent semi-conductive non-metallic layers. The first substantially transparent semi-conductive non-metallic layer contacts the electrochromic medium. The mirror assembly includes a display element at the fourth surface of the second substrate. A refractive index and a physical thickness of each of the first and second substantially transparent semi-conductive non-metallic layers and the substantially reflective metallic conductive layer are selected such that the transflective reflector is selectively spectrally tuned to substantially transmit at least one preselected spectral band of visible light therethrough while substantially reflecting other visible light. The display element is configured to emit visible light with a peak intensity within the preselected spectral band.

According to another aspect of the present invention, a mirror assembly for a vehicle includes a mirror element and a radiant energy emitting element. The mirror element includes a substrate having a forward surface facing towards a viewer of the mirror assembly and a rearward surface facing away from a viewer of the mirror assembly. The mirror element includes at least one substantially reflective metallic layer sandwiched between a respective pair of substantially transparent non-metallic layers disposed at the rearward surface of the substrate. Each of the substantially transparent non-metallic layers and the substantially reflective metallic layer having a selected refractive index and a selected physical thickness such that the mirror element is selectively spectrally tuned to substantially transmit at least one preselected spectral band of radiant energy therethrough while substantially reflecting other radiant energy. The radiant energy emitting element is operable to emit radiant energy towards the rearward surface and through the mirror element. The radiant energy emitting element is operable to emit radiant energy with a peak intensity within the at least one preselected spectral band.

The substrate may comprises a single substrate. The single substrate may comprise a prismatic or wedge-shaped substrate. The radiant energy emitting element and alternating layers thus may provide for a display on demand type of display for a prismatic (or flat or curved) mirror assembly.

According to other aspects of the present invention, an electrochromic mirror assembly for a vehicle includes an electrically variable mirror element. The mirror element includes a first substrate having first and second surfaces and a second substrate having third and fourth surfaces. The first and second substrates are arranged so that the second surface opposes the third surface. The second substrate includes a conductive stack on the third surface. The conductive stack may comprise a first electrically conductive or semi-conductive layer deposited on the third surface, a reflective or metallic layer of reflective or metallic material on the first electrically semi-conductive layer, and a second electrically conductive or semi-conductive layer on the reflective layer. The mirror element includes an electrochromic medium disposed between the second electrically semi-conductive layer of the second substrate and the electrically semi-conductive coating on the second surface of the first substrate. The thicknesses and materials of the layers are selected to provide or exhibit a spectrally selective visible light transmission characteristic for a particular spectral band or range of wavelengths to provide enhanced transmissivity of the spectral band of light through the reflective element while providing sufficient reflectivity of other light.

In one form, the electrochromic mirror assembly may include a display element positioned at the fourth surface, wherein the display element is operable to emit light through the mirror element for viewing by a driver of the vehicle. The thicknesses of the particular layers of the conductive stack are selected such that the mirror element is spectrally tuned to transmit a predetermined spectral band of light therethrough.

The spectral band that is transmittable through the mirror element may be selected to match a spectral band or range of light wavelengths emitted by the display element, such that the mirror element is spectrally tuned for the particular display element positioned at the fourth surface of the mirror element. The mirror element thus may be spectrally tuned to match at least a portion of the transmissive band or range of wavelengths of the mirror element to a particular band or range of wavelengths of the light being emitted by the display element. In one form, the peak transmissivity of the transmissive band of the mirror element is selected to match the peak intensity of the spectral band emitted by the display element. The conductive stack preferably provides at least approximately 60 percent photopic reflectance (preferably as measured in accordance with Society of Automotive Engineers test procedure SAE J964a, which is hereby incorporated herein by reference in its entirety), more preferably at least approximately 70 percent photopic reflectance, and most preferably at least approximately 80 percent photopic reflectance, while providing at least approximately 10 percent transmission, preferably at least approximately 15 percent transmission, more preferably at least approximately 20 percent transmission, and most preferably at least approximately 30 percent transmission, of at least a particular spectral band of light. Preferably, the physical thicknesses of the layers are selected to limit tinting and/or color interference affects as seen in the mirror element (i.e. to provide a neutral reflector) and to spectrally tune the mirror element for a transmission characteristic for providing enhanced transmissivity through the mirror element for a particular spectral band or range of wavelengths, in order to match the transmissivity of the mirror element to the spectral band of emission of light from the display element.

The semi-conductive layers and metallic layer of the conductive stack may be deposited at the third surface via a sputter coating process. The present invention thus may provide a low cost reflective element which provides for sufficient transmission of a particular spectral band or bands of visible light and sufficient reflectance at the third surface of the mirror assembly (with at least 60% photopic reflectance preferred, more preferably, with at least 70% photopic reflectance, and most preferably, with at least 75% photopic reflectance). Preferably, the semi-conductive layers, such as indium tin oxide or the like, sandwiching the metallic layer are formed of the same material. Thus, for example, a conductive stack of alternating layers may comprise a metallic layer of silver sandwiched between two semi-conductive layers of indium tin oxide.

According to another aspect of the present invention, an electro-optic or electrochromic interior rearview mirror assembly comprises an electro-optic or electrochromic mirror reflective element. The electro-optic mirror element provides a substantially reflective mirror element having a first region having a first reflectivity and a first transmissivity and a second region having a second reflectivity and a second transmissivity. The electro-optic mirror element includes a display element positioned at or behind the second region and operable to transmit light through the second region. The first reflectivity is greater than the second reflectivity. Preferably, the second region provides at least approximately 25% transmissivity of light from the display.

Therefore, the present invention provides a mirror reflective element, such as a third surface reflective element or mirror element or a fourth surface reflective element or a prismatic reflective element or the like, which is sufficiently and spectrally selectively transmissive or spectrally tuned to allow a particular spectral range or band of light to pass therethrough from a display at the rear surface of the mirror reflective element. The layers of the reflective element are selected or spectrally tuned to match one or more predetermined or selected spectral bands or ranges of wavelengths and to thus pass the predetermined spectral bands of light therethrough, while being substantially reflective to other spectral bands or wavelengths of light, and do not require windows or apertures formed in the reflective metallic layer of the reflective element.

These and other objects, advantages, purposes, and features of the present invention will become more apparent from the study of the following description taken in conjunction with the drawings.

BRIEF DESCRIPTION OF THE DRAWINGS

FIG. 2 is a perspective view of an interior rearview mirror assembly in accordance with the present invention;

FIG. 3 is a sectional view of the mirror assembly taken along the line III-III in FIG. 2;

FIG. 4 is a sectional view of a second substrate and opaque conductive and reflective layers suitable for use in the mirror assembly of FIG. 2;

FIG. 5 is a front elevation of a second substrate of a reflective element in accordance with the present invention, with a tab-out portion to facilitate electrical connection with the conductive layers;

FIG. 6 is a sectional view of the second substrate taken along the line VI-VI in FIG. 5;

FIG. 7 is a perspective view of another interior rearview mirror assembly in accordance with the present invention, with a display;

FIG. 8 is a sectional view of a reflective element of the mirror assembly taken along the line VIII-VIII in FIG. 7;

FIG. 9 is a sectional view similar to FIG. 6 of a second substrate in accordance with the present invention, which is suitable for use in the mirror assembly of FIG. 7, and includes a tab-out portion to facilitate electrical connection with the conductive layers;

FIG. 10 is a sectional view of another second substrate and transmissive conductive and reflective layer or stack in accordance with the present invention suitable for use in a mirror assembly having a display;

FIG. 18 is a forward facing view of another electro-optic mirror reflective element in accordance with of the present invention;

DESCRIPTION OF THE PREFERRED EMBODIMENTS

Figure 1:
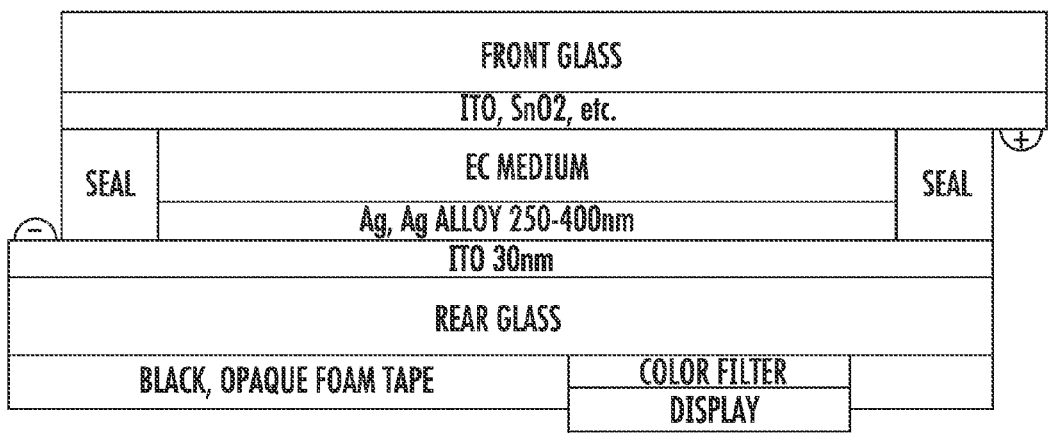
FIG. 1 is a sectional view of a conventional electrochromic mirror reflective element.
Figure 1A:
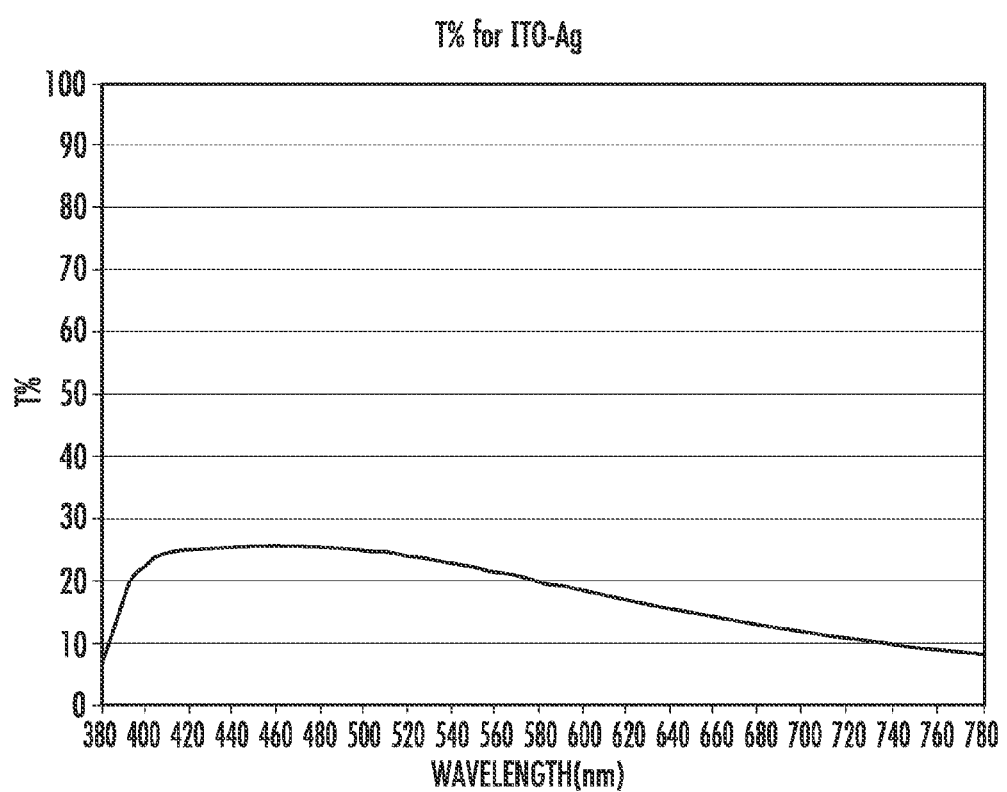
FIG. 1A is a graphical depiction of the transmissivity of visible light of the conventional electrochromic mirror reflective element of FIG. 1.

Referring now to the drawings and the illustrative embodiments depicted therein, an electrochromic interior rearview mirror assembly 10 is mounted to a mounting button 12 mounted at an interior surface of a windshield 14 of a vehicle (FIG. 2). Mirror assembly 10 includes a housing or casing 15 and an electrochromic reflective element or mirror element or cell 16 which has electrically variable reflectivity. Reflective element 16 includes first and second glass substrates 22, 24, and provides a third surface reflective element, whereby the reflective coating of the reflective element 16 is deposited on the third surface 24a of the substrates (FIG. 3). An electrochromic medium 40 and a plurality of metallic and non-metallic conductive or semi-conductive layers 28 are disposed between the electrochromic medium 40 and the second substrate 24. The refractive indices and physical thicknesses of the layers are selected to maximize transmission of a particular spectral band of light while substantially reflecting other light to provide a desired degree of photopic reflectance, while also providing the desired degree of conductivity across the layers.

Although shown and described herein as being implemented in an interior rearview mirror assembly of a vehicle, the reflective element or mirror element of the present invention is equally suitable for or applicable to other electro-optic reflective elements, or reflective elements for exterior rearview mirror assemblies for vehicles or for other mirror assemblies, without affecting the scope of the present invention. Also, although shown and described as an electrochromic reflective element, aspects of the present invention may be equally applicable to prismatic reflective elements (such as described below with respect to FIG. 32) or to exterior reflective elements, without affecting the scope of the present invention. Also, the mirror element of the present invention may comprise a substantially flat element or substrate or may comprise a curved element or substrate, such as a convex element or aspheric element or the like, without affecting the scope of the present invention.

Electrochromic reflective element 16 comprises a first or front substantially transparent substrate 22 and a second or rear substantially transparent substrate 24 (which may be glass substrates or the like). The first substrate 22 includes an electrically conductive or semi-conductive layer 26, such as a tin oxide (doped or undoped) or indium tin oxide (ITO) or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like), deposited on an inward surface 22a of first substrate 22 (i.e., the second surface 22a of the reflective element 16).

Also, the first (or forward or outermost) surface 22b of front substrate 22 (exposed to the atmosphere exterior of the mirror assembly) may be optionally coated with an anti-wetting property such as via a hydrophilic coating (or stack of coatings), such as is disclosed in U.S. Pat. Nos. 6,193,378; 5,854,708; 6,071,606; and 6,013,372, the entire disclosures of which are hereby incorporated by reference herein. Also, or otherwise, the first (outermost) surface 22b of front substrate 22 may be optionally coated with an anti-wetting property such as via a hydrophobic coating (or stack of coatings), such as is disclosed in U.S. Pat. No. 5,724,187, the entire disclosure of which is hereby incorporated by reference herein. Such hydrophobic property on the first/outermost surface of electrochromic mirror reflective elements (and on the first/outermost surface of non-electrochromic mirror, non-electro-optical conventional reflective elements) can be achieved by a variety of means, such as by use of organic and inorganic coatings utilizing a silicone moeity (for example, a urethane incorporating silicone moeities) or by utilizing diamond-like carbon coatings. For example, long-term stable water-repellent and oil-repellent ultra-hydrophobic coatings, such as described in PCT Application Nos. WO0192179 and WO0162682, the entire disclosures of which are hereby incorporated by reference herein, can be disposed on the first (outermost) surface 22b of front substrate 22. Such ultra-hydrophobic layers comprise a nano structured surface covered with a hydrophobic agent which is supplied by an underlying replenishment layer (such as is described in Classen et al., "Towards a True 'Non-Clean' Property: Highly Durable Ultra-Hydrophobic Coating for Optical Applications", ECC 2002 "Smart Coatings" Proceedings, 2002, 181-190, the entire disclosure of which is hereby incorporated by reference herein).

Second or rear substrate 24 includes at least three layers or coatings defining a reflective and conductive layer or stack or ISI layer or stack 28 (i.e., the combination or stack of a layer of: a semi-conducting coating, such as an ITO layer or the like; a metallic layer, such as a layer of silver, aluminum or an alloy of silver or an alloy of aluminum or other metal or metal alloy; and another layer of a semi-conducting coating, such as an ITO layer or the like, as discussed below, is referred to herein as an ISI stack or layer) on an inward surface 24a of second substrate 24 (or the third surface of the reflective element). Thus, an ISI stack 28 comprises a metallic layer sandwiched between two semi-conducting layers (both of which preferably are the same material, but either of which can be different from the other). In the illustrated embodiment of FIG. 4, ISI layer 28 comprises a first semi-conductive layer 30 disposed on inward surface 24a of second substrate 24, a second semi-conductive layer or adhesion layer 32 disposed on semi-conductive layer 30, a metallic layer or coating 34 disposed on semi-conductive layer 32, and a transparent semi-conductive layer or passivation layer 36 disposed on metallic layer 34. As shown in FIGS. 3 and 4, first semi-conductive layer 30 extends outwardly from the other ISI layers 32, 34 and 36, in order to provide for electrical connection with bus bars 38 of mirror assembly 10. Although referred to herein as an "ISI layer" or an "ISI stack", the conductive and reflective stack or layers of the present invention may comprise materials or coatings other than ITO, ICO, IO, IWO layers or coatings or the like and silver or silver alloy layers or coatings, without affecting the scope of the present invention. For example, a semi-conducting layer of doped zinc oxide, or a semi-conducting layer of cadmium stannate, or a semi-conducting layer of titanium nitride or other titanium compound or the like may be used in the stack, without affecting the scope of the present invention.

As shown in FIG. 3, the first and second substrates 22, 24 are positioned in spaced-apart relationship with one another with an electrochromic medium 40 disposed between semi-conductive layer 26 and semi-conductive layer 36. The electrochromic medium 40 changes color or darkens in response to electricity or voltage applied to or through the semi-conductive layers 26 and 30 at either side of the electrochromic medium. The electrochromic medium 40 disposed between the front and rear substrates 22, 24 may be a solid polymer matrix electrochromic medium, such as is disclosed in U.S. Pat. No. 6,154,306, which is hereby incorporated by reference herein, or other suitable medium, such as a liquid or solid medium or thin film or the like, such as the types disclosed in U.S. patent application Ser. No. 09/793,002, filed Feb. 26, 2001, now U.S. Pat. No. 6,690,268, and in U.S. Pat. Nos. 5,668,663 and 5,724,187, the entire disclosures of which are hereby incorporated by reference herein, without affecting the scope of the present invention. The electrochromic mirror element may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein, and in U.S. patent application Ser. No. 09/793, 002, filed Feb. 26, 2001, now U.S. Pat. No. 6,690,268, which is hereby incorporated herein by reference. Reflective element 16 may also include a seal 41 positioned around the outer portions of the layers 32, 34, 36 and the electrochromic medium 40 to seal the layers and avoid corrosion of the metallic layer 34.

During operation, a voltage may be applied to reflective element 16 via bus bars 38 positioned around and engaging the outer edges of the semi-conductive layers 26, 30 (FIG. 3). The voltage applied by bus bars 38 is bled from semi-conductive layer 30 and through the layers 32, 34, 36 to the electrochromic medium 40. The ISI layer 28 of the present invention preferably provides for reduced resistance through the layers, which provides for faster, more uniform coloration of the electrochromic medium 40, since the electrons applied via bus bars 38 at semi-conductive layer 30 may bleed through the semi-conductive layers 32, 36 faster due to the enhanced conductivity in the conductive layers 32, 36. Preferably, the ISI layer or stack 28 provides a sheet resistance of less than approximately 10 ohms per square, more preferably less than approximately 5 ohms per square, and most preferably less than approximately 2 ohms per square. Desirably, and particularly for larger area mirrors, the sheet resistance is less than approximately 1 ohm per square, such as in the range of approximately 0.1 to 0.7 ohms per square.

In order to provide enhanced performance of the electrochromic element, each of the layers of the ISI layer or stack has substantial conductivity and none of the layers significantly retard electron/electrical conductivity from one layer to the other throughout the stack, and, thus, do not impede the flow of electrons into the electrochromic (EC) medium. In this regard, it is desirable that one or more of the metallic layers comprises a metallic material (which is preferably a highly reflective material, such as silver or silver alloys or the like) having a specific resistivity of preferably less than approximately $5 \times 10^{-5}$ ohm·cm, more preferably less than approximately $1 \times 10^{-5}$ ohm·cm, and most preferably less than approximately $5 \times 10^{-6}$ ohm·cm. Preferably, such a highly conductive metallic layer or layers is/are sandwiched between two non-metallic, partially conducting layers, preferably formed of a non-metallic material (such as a semi-conducting oxide, such as indium oxide, tungsten oxide, tin oxide, doped tin oxide or the like) having a specific resistivity of less than approximately $1 \times 10^{-2}$ ohm·cm, more preferably less than approximately $1 \times 10^{-3}$ ohm·cm, and most preferably less than approximately $5 \times 10^{-4}$ ohm·cm.

In the illustrated embodiment of FIGS. 3 and 4, first semi-conductive layer 30 is deposited on inward surface 24a of second substrate 24. The semi-conductive layer 30 may be deposited on the glass or substrate 24 via any suitable process. The particular thickness of the conductive layer may vary depending on the particular application of reflective element 16, as discussed below. In the illustrated embodiments of FIGS. 2-4, the semi-conductive layer 30 need not be transparent and may comprise a chromium layer or the like. However, the semi-conductive layer 30 may comprise a generally transparent semi-conductive layer of coating, such as a tin oxide layer, an indium tin oxide (ITO) layer or the like, without affecting the scope of the present invention. In a preferred embodiment, semi-conductive layer 30 may comprise a chromium layer on surface 24a of second substrate 24.

The transparent semi-conductive layers 32 and 36 of ISI layer 28 on second substrate 24 may comprise non-metallic transparent electrically conducting or semi-conducting materials, such as tin oxide, indium oxide, indium cerium oxide, indium tungsten oxide, nickel oxide, tungsten oxide, indium tin oxide, half-wave indium tin oxide, full wave indium tin oxide, doped tin oxides, such as antimony-doped tin oxide and fluorine-doped tin oxide, doped zinc oxides; such as antimony-doped zinc oxide and aluminum-doped zinc oxide, and/or the like. Both of the semi-conductive layers 32, 36 may comprise the same type of material for ease of manufacturing, as discussed below.

Metallic layer or coating 34 comprises a thin film or layer of metal, such as silver, aluminum, or alloys thereof, or the like, with a selected thickness to provide sufficient reflectivity and/or transmissivity, as discussed below. The selected metallic material may comprise silver, but may otherwise comprise a material selected from aluminum, silver alloys, aluminum alloys (such as 6061 or 1100 aluminum alloys or the like), manganese, chromium or rhodium, or any other metallic material which is sufficiently reflective and/or transmissive at a selected thickness. The thickness of metallic layer 34 is preferably selected to be thick enough (such as approximately 60-100 nm or 600-1000 Å) to be substantially reflective and not transmissive, such that the ISI layer 28 is substantially opaque or non-transparent.

In a preferred embodiment, the semi-conductive layer 30 comprises indium tin oxide (ITO) and is deposited onto surface 24a of substrate 24 via a hot deposition process, involving, for example, sputter deposition onto a heated substrate, with the heated substrate often being heated to a temperature of greater than about 200° C., sometimes greater than 300° C., as is known in the art. The combination of the semi-conductive layer 30 on the substrate 24 defines a conductive substrate which may be used for various embodiments of the present invention, as discussed below.

The semi-conductive layer 32 of ISI layer 28 may be deposited onto semi-conductive layer 30 via a cold deposition process, such as sputter coating or the like onto an unheated substrate. Preferably, each of the layers 32, 34, 36 of ISI layer 28 is deposited on second substrate 24 by a sputter deposition process. More particularly, the substrate 24 (including the semi-conductive layer 30 already deposited thereon) may be positioned in one or more sputter deposition chambers with either planar or rotary magnetron targets, and with deposition of the layers being achieved by either reactive deposition of an oxide coating by sputtering from a metal target (or from a conductive, pressed oxide target) in an oxygen-rich atmosphere, or by DC sputtering from an oxide target, such as an IO, IWO, ITO or ICO target or the like. For example, the substrate 24 may be sputter coated with two targets in a single chamber, such as by depositing the ITO layer 32 on semi-conductive layer 30, turning or flipping the targets for sputter coating of the metallic layer 34, and then turning the targets back to deposit the second ITO layer or passivation layer 36 on the metallic layer 34. With such a process, it is important that the two ITO layers 30, 34 comprise the same conductive material. Alternately, two targets may be positioned in a row, such that the substrate 24 is moved from one target (for the first ITO coating) to the other (for the metallic coating) and then back to the first (for the second ITO coating). It is further envisioned that three targets may be positioned in a row, with each target depositing the layer in order on the substrate (in which case it would not be as important to have the semi-conductive or ITO layers 32, 36 comprise the same material). Other processes for applying or depositing layers of conductive material or layers and metallic material or layers may be implemented, without affecting the scope of the present invention. In the illustrated embodiment of FIGS. 2 and 3, semi-conductive layer 30 may be deposited or applied to substantially the entire surface 24a of substrate 24, while the outer region or edge of semi-conductive layer 30 and substrate 24 may be masked during the deposition process so that layers 32, 34, 36 do not cover the outer edge of substrate 24, and semi-conductive layer 30.

Because the embodiment of the reflective element of the present invention illustrated in FIG. 4 does not include a display on demand or other type of display transmitting or projecting through the electrochromic reflective element, it is desirable to have a thick metallic or silver layer 34, such as in a range of approximately 60-100 nm (600-1000 Å), because the metallic layer does not have to be transmissive of any light therethrough. It is also unnecessary for the second substrate to be transparent. However, it is desirable to avoid tinting or color interference affects as seen in reflection from the reflector (which may arise when stacking layers of conductive coatings and/or metallic coatings on top of one another), because it is desirable to have a neutral or non-colored/non-tinted reflector when no voltage is applied across the electrochromic medium.

Optionally, the metallic layer may be absent or removed at portions, such as to create a local window for placement therebehind of a light emitting display, such as a compass display or PSIR display or other informational display or the like, such as a display of the type disclosed in commonly assigned U.S. Pat. Nos. 6,222,460 and 6,326,900, which are hereby incorporated herein by reference in their entireties, but while maintaining at least the underlying semi-conducting ITO layer at the local window region so that electrical connection through the electrochromic medium at that local region is sustained. In this regard, it is preferable to have an ITO underlayer with a sheet resistance of less than approximately 80 ohms per square, more preferably less than approximately 25 ohms per square, and most preferably less than approximately 15 ohms per square.

In order to avoid such undesirable tinting or color interference affects, such as yellow tinting or other color tinting of the compound or stacked reflective element, as seen in the reflection when the electrochromic reflective element is unpowered, the physical thicknesses of the conductive layers and the metallic layer are selected to provide a desired combination of layer thicknesses to achieve the desired results. For example, the ISI layer 28 may include an adhesion layer or undercoating semi-conductive layer 32 of approximately 100 Å +/−50 Å of ITO or the like, a silver layer 34 of approximately 800 Å+/−200 Å and a passivation semi-conductive layer 36 of approximately 120 Å +/−25 Å of ITO or the like, which provides a desired result with minimal yellow tinting or other color tinting or color interference affects as seen in the reflection.

The range of thicknesses of the layers may be selected to provide a desired untinted affect in the reflection, such that the reflective element may be spectrally tuned to provide a desired reflectant untinted appearance. Testing of various embodiments has shown that the thicknesses of the layers may vary by approximately 25 percent or more from a desired or targeted dimension, yet will still provide the desired results. Such tolerances significantly ease the processing of the ISI layer, since this is well within the capability of typical sputter coating equipment. The layers of the reflective element and ISI stack may be selected such that the reflective element provides a substantially spectrally untinted reflection when viewed by a driver or passenger in the vehicle when no voltage is applied across the electrochromic medium. Also, the layers may be selected and combined to exhibit a spectrally selective transmissive characteristic, which is established by the refractive indices and physical thicknesses of the layers disposed between the electrochromic medium and the third surface of the second substrate.

Although the above embodiment provides a desired neutral color/tint for the reflector, if the passivation layer 36 is increased in thickness, the reflector may become tinted or yellowed. However, if the passivation layer is further increased in thickness to approximately 680 Å, then the non-tinting is approximately the same as when the passivation layer has a thickness of approximately 120 Å. This periodic change in tinting affect in response to the thicknesses of the layers or coatings of the ISI layer of the present invention allows for selection of different thicknesses of the layers depending on the particular application and desired result of the electrochromic reflective element of the present invention.

Referring now to FIGS. 5 and 6, a reflective element 116 may have alternating layers or an ISI stack or layer 128 comprising a first semi-conductive layer or adhesion layer 132 deposited or sputter coated directly onto surface 24a of second substrate 24, a metallic layer 134 deposited on semi-conductive layer 132, and a second semi-conductive layer or passivation layer 136 deposited on metallic layer 134. The second or rear substrate 24 is masked around substantially the entire outer region 24c of surface 24a during the deposition process, such that the ISI layer 128 is not deposited in the masked region 24c. However, the substrate is not masked over the entire outer edge or region of substrate 24, in order to allow deposition of the ISI layer at a particular area, such that a tab-out portion or area 131 is formed in the ISI layer 128. The tab out area 131 facilitates electrical connection with the conductive coatings 132, 134, 136, such that the first semi-conductive layer 30 of reflective element 16 is not required. In a preferred embodiment of the present invention, the reflective element 116 may include a semi-conductive layer 132 of an ITO coating which has a thickness of approximately 100 Å +/−25 Å, a silver layer 134 having a thickness of approximately 900 Å +/−100 Å, and a second semi-conductive layer 136 of ITO or the like having a thickness of approximately 120 Å +/−25 Å. Such an arrangement of semi-conductive layers and a sandwiched metallic layer provides a neutral reflectance with minimal tinting or color interference affects as seen in reflectance and with the electrochromic medium unpowered.

The opaque ISI layer 28, 128 and the third surface reflective element of the present invention therefore provides an economical, low cost electrochromic reflective element, which provides a neutral color reflection. Typically, for a sputter coating operation, a range of within +/−5% of a nominal target for uniformity of coating is desired. However, in the present invention, the uniformity tolerance is approximately +/−25% for each of the coatings or layers from cell to cell. The ISI layer on the second substrate thus may be easy and fast to manufacture due to the thicknesses and the tolerances for the thickness of each particular coating.

Referring now to FIGS. 7 and 8, a mirror assembly 210 in accordance with the present invention (shown as an interior rearview mirror assembly in FIG. 7; however, the reflective element 216 may be implemented at an exterior mirror assembly or other mirror assembly, without affecting the scope of the present invention) may include a display system or element 218 which is operable to provide, emit or display information or light through a mirror element or reflective element 216 of the mirror assembly. The light is emitted through the reflective element 216 at a display area 220 of mirror assembly 210, such that the display information or light is viewable by a driver of the vehicle. The reflective element 216 includes first (or front) and second (or rear) substrates 222, 224, and a conductive and transmissive ISI stack or layer or DOD stack or layer 228 disposed on the inward surface 224a of the second substrate (or the third surface of the reflective element). The second substrate 224 and ISI layer 228 comprise a transflective one way mirror, such as disclosed in commonly assigned U.S. patent application Ser. No. 10/054,633, filed Jan. 22, 2002, now U.S. Pat. No. 7,195,381, which is hereby incorporated herein by reference. Preferably, the mirror reflective element (behind which the display is disposed so that the information displayed is visible by viewing through the mirror reflective element) of the mirror assembly comprises a transflective mirror reflector, such that the mirror reflective element is significantly transmitting to visible light incident from its rear (i.e., the portion furthest from the driver in the vehicle), while simultaneously the mirror reflective element is substantially reflective to visible light incident from its front (i.e. the position closest to the driver when the interior mirror assembly is mounted in the vehicle). The transflective electrochromic reflective mirror element (such as is disclosed in U.S. patent application Ser. No. 09/793,002, filed Feb. 26, 2001, now U.S. Pat. No. 6,690,268, and in U.S. Pat. Nos. 5,668,663 and 5,724,187, the entire disclosures of which are hereby incorporated by reference herein) comprises an electrochromic medium sandwiched between the first and second substrates.

The ISI stack or layer 228 includes a conductive metallic layer 234, which is thin enough to be sufficiently transparent or transmissive to allow, the display information to be transmitted through the ISI or DOD layer 228 and through reflective element 216 for viewing by the driver of the vehicle. As the thickness of the metallic layer 234 decreases, the transmissivity increases, but the reflectivity decreases. Therefore, a desired thickness of the metallic layer (along with a desired thickness of the other layers of the ISI stack or layer) must be selected to provide sufficient reflectivity and transmissivity, as discussed below. Because the metallic layer 234 is at least partially transmissive, it is desirable to provide an opaque coating or tape or the like 225 on an outer surface 224b of second substrate 224 (or the fourth surface of the reflective element 216). The coating or tape 225 may be a black tape or other color tape or coating.

Display system 218 preferably comprises a display on demand type of display and includes a display element or light emitting device 218a positioned at the back surface 224b of second substrate 224. Display element 218a is operable to emit light, such as in the form of indicia, alphanumeric characters, images, or the like, in response to a control or input. Display element 218a may be a vacuum fluorescent (VF) display element, a light emitting diode (LED) display element, an organic light emitting diode (OLED) display element, a gas discharge display element, a plasma display element, a cathode ray tube display element, a backlit active matrix LCD screen, an electroluminescent display element, a field emission display element or the like, without affecting the scope of the present invention. The particular display element may be selected to provide a desired color to the display. For example, a VF display element may provide a blue-green color or other colors to the information displayed (depending on the phosphor selected for the display), while a light emitting diode display element may provide other colors, such as reds, ambers, or other colors to the information displayed.

Preferably, the display is a display-on-demand type of display, such as of the type disclosed in commonly assigned U.S. Pat. Nos. 5,668,663 and 5,724,187, and/or in U.S. patent application Ser. No. 10/054,633, filed Jan. 22, 2002, now U.S. Pat. No. 7,195,381; and Ser. No. 09/793,002, filed Feb. 26, 2001, now U.S. Pat. No. 6,690,268, which are all hereby incorporated herein by reference. With such a display, it is not only desirable to adjust the display brightness according to ambient lighting conditions, but it is also desirable to adjust the display brightness such that a sufficient contrast ratio is maintained against the variable background brightness of the reflected scene. Also, it may be desirable to compensate for changes in transmission of the electrochromic device effected to control rearward glare sources, so that the display brightness appears to be maintained at a generally constant level.

It is envisioned that the display 218 may include a filter or spectral element 217 positioned between the illumination source or display element 218a of the display 218 and the outer or fourth surface 224b of second substrate 224. The filter 217 may function to filter out light having a wavelength outside of the desired band of light being emitted by the display element or, in other words, the filter or spectral element 217 may transmit a band width of light that substantially matches the particular spectral output of the display or that substantially matches a desired color for the display information. By transmitting only the spectral band which at least generally matches the spectral output of the display device, the filter functions to filter out ghost images of the display, where ambient light may enter the display, such that the display characters may be visible through the reflective element when the display is off.

Because the reflectivity of the metallic layer 234 provides sufficient reflectance over its entire surface (i.e., there are no "windows" formed in or through the metallic layer), mirror assembly 210 may include other displays or multiple display on demand type displays, or other types of displays, such as one or more "display on need" type displays or the like. For example, one or more display on need type displays 213 (FIG. 7) may be provided, such as to indicate to the driver of the vehicle that a door of the vehicle is ajar, or that the driver's seat belt is not fastened, or any other condition or status that may be important to the driver or occupant of the vehicle. The display on need type display or displays may provide indicia, alphanumeric characters, symbols, or the like via one or more light emitting sources (not shown) behind the second substrate in a similar manner as display system 218 discussed above, and may include a filter (also not shown) for filtering out light that is not within the desired spectral band of the particular display system.

In the illustrated embodiment of FIG. 8, ISI or DOD layer or stack 228 includes a first semi-conductive layer 230, a second semi-conductive layer or adhesion layer 232, a reflective and transmissive metallic layer 234 and a semi-conductive or passivation layer 236. Similar to ISI layer 28, discussed above, semi-conductive layer 230 may be deposited or applied to substantially the entire surface 224a of substrate 224, while the outer region or edge of semi-conductive layer 230 and substrate 224 may be masked during the deposition process so that the layers 232, 234, 236 do not cover the outer edge of substrate 224 and semi-conductive layer 230.

Preferably, the physical thicknesses and materials of the metallic layer 234 and the semi-conductive layers 230, 232 and 236 are selected to provide sufficient transmissivity of at least a particular spectral band or range of wavelengths of light which generally matches the peak intensity spectral band of light being emitted by the display. Such spectral tuning or matching of the layers to the display allows the display information to transmit through the reflective element for viewing of the display information by the driver of the vehicle, while also providing sufficient reflectivity over the entire reflective element, and while minimizing the tinting or color interference affects on the reflected image (or targeting such tinting affects toward a desired color). Preferably, the light transmission of the particular spectral band through the reflective element is greater than approximately 15 percent and the reflectivity of the reflective element to other wavelengths of light is greater than approximately 80 percent. More preferably, the light transmission of the particular spectral band is greater than approximately 20 percent, and most preferably greater than approximately 25 percent.

The reflective element 216 is spectrally tuned to maximize transmissivity of a particular desired or targeted range or ranges of wavelengths or spectral bands and to substantially reflect or not transmit other wavelengths of light. The particular choices or thicknesses/materials of the layers is influenced by the spectral emission of the display being used in the mirror assembly. In one exemplary embodiment of the present invention, a transmissive ISI or DOD layer or stack 228 includes a metallic layer 234 of approximately 350 Å sandwiched between a semi-conductive passivation layer 236 of approximately 68 nm (680 Å) and a semi-conductive adhesion layer 232 of approximately 41 nm (410 Å). The adhesion layer 232 is deposited on a semi-conductive layer 230 having a thickness of approximately 30 nm (300 Å). In this embodiment, the ISI layer 228 is spectrally tuned for transmission of an orange light (having a peak intensity wavelength in the range of approximately 600 nm) emitting from display device 218a.

In certain conditions, the ambient light intensity within the cabin of the vehicle may be sufficiently high so that reflected light from the mirror reflective element and, in particular, from the display region 220, tends to "wash-out" the display. It is envisioned that this glare may be reduced by taking advantage of the electrochromic function of the mirror assembly. More particularly, the electrochromic medium 240 of the electrochromic mirror reflective element 216 may be colored or darkened in the area of the display by constructing a locally addressable region across the display (as shown at 220, 220a of FIG. 7). This may be achieved by creating a deletion line in the second surface semi-conductive layer 226 at the second surface of the first or front substrate 222 (FIG. 8) and/or in the third surface semi-conductive layer 230 (or a third surface semi-conductive layer of the type shown in FIG. 9 and described below at 332), hence breaking electrical continuity from the rest of the electrochromic cell. An ambient light sensor (not shown) may be used to detect the critical ambient light levels at which "wash-out" is a problem. The addressable region may then be separately colored or darkened to the appropriate level to reduce the glare from the display area in response to the ambient light sensor. Although such a glare problem could be solved by coloring the entire mirror, by localizing the region of coloration to only the display area, the electrochromic mirror assembly of the present invention allows the rest of the mirror reflective area, which does not incorporate the display, to retain full reflectivity while the display area is colored or darkened (such as may be useful when driving by day).

In another exemplary embodiment of the present invention, a transmissive ISI or DOD layer includes a metallic layer 234 of approximately 40 nm (400 Å) sandwiched between a semi-conductive passivation layer 236 of approximately 43 nm (430 Å) and a semi-conductive adhesion layer 232 of approximately 10 nm (100 Å). The semi-conductive adhesion layer 232 is deposited on an adhesion or semi-conductive layer 230 having a thickness of approximately 30 nm (300 Å). In this embodiment, the ISI or DOD layer 228 is spectrally tuned for spectrally selective transmission of a blue-green light (having a peak intensity wavelength of approximately 505 nm) emitting from display device 218*a*.

The thickness of the first semi-conductive layer 230 may be the same for each embodiment described above (and for the particular embodiments discussed below, such as with respect to FIGS. 10-17), in order to provide a common conductive substrate (including the semi-conductive layer 230 already deposited or coated on the surface of the substrate) for the different particular applications of the substrate and ISI layers of the present invention. This may ease the manufacturing of the reflective elements, since the same hot ITO coating or the like may be applied to common substrates for various applications, and then the conductive substrates may be coated with different thickness layers of conductive and metallic coatings for different applications of the reflective element (such as for mirrors having different colored displays).

As discussed above with respect to ISI layer 128, and with reference now to FIG. 9, a second substrate 324 may have an ISI or DOD layer 328 on its inward or forward surface 324*a* which may include layers 332, 334, 336 which may have a tab-out portion 331 for electrical connections, so as to not require the first conductive layer, without affecting the scope of the present invention. Because the metallic layer 334 is thin and not as conductive as the metallic layer 134, discussed above, the tab-out portion 331 of ISI layer 328 is preferably substantially larger in size or width than the tab-out portion 131 may have been for ISI layer 128. In a particular exemplary embodiment of the substrate 324 and ISI layer 328 of a reflective element as shown in FIG. 9, where the conductive layer 332 is deposited directly on the surface 324*a* of substrate 324, the ISI layer 328 may include a metallic layer 334 of approximately 35 nm (350 Å) sandwiched between a passivation layer 336 of approximately 70 nm (700 Å) and an adhesion layer 332 of approximately 70 nm (700 Å). This combination or stack of layers on the glass or substrate 324 provides a transflective reflective element which is at least approximately 20 percent transmissive and which is spectrally tuned to pass a particular band of light being emitted by display device 218*a* of display system 218. In this particular embodiment, the transflective reflective element is spectrally tuned to pass light having a peak intensity wavelength of approximately 605 nanometers, while substantially reflecting other light.

Other thicknesses and materials of the layers may be selected for different displays having different colors or wavelengths of emitted light, without affecting the scope of the present invention. The thicknesses and particular materials of the layers of the ISI or DOD stack and transflective reflector are selected such that their combination provides enhanced or substantial transmissivity of the spectral band or bands corresponding to the spectral band of light emitted by the particular display implemented in the reflective element, while providing substantial reflectance of other visible light.

Referring now to FIG. 10, a second substrate 424 of a reflective element may have multiple layers or a double ISI or DOD layer or stack 428 applied to inward surface 424*a*. Double ISI layer 428 includes a first semi-conductive layer 430 applied to or deposited on inward surface 424*a*, a second semi-conductive or adhesion layer 432*a* deposited on semi-conductive layer 430, a first metallic layer 434*a* deposited on semi-conductive layer 432*a* and another semi-conductive layer 436*a* deposited on metallic layer 434*a*. Double ISI layer 428 further includes a second metallic layer 434*b* deposited on semi-conductive layer 436*a* with another semi-conductive layer 436*b* deposited on second metallic layer 434*b*. Therefore, the ISI stack or layer 428 is an alternating stack or combination of dielectric or transparent semi-conductive layers and metallic layers, whereby each metallic layer is sandwiched between a respective pair of conductive or semi-conductive non-metallic layers.

Such an arrangement may be used to provide a desired amount or increased amount of spectrally selective transmission of one or more particular spectral bands of light through the ISI or DOD layers, while increasing the reflectivity or maintaining the reflectivity of the ISI or DOD layers with respect to other spectral bands of light over the single ISI or DOD stack designs discussed above. More particularly, the double stack arrangement (or more layers if desired) provides for increased transmission of a narrower spectral band of light, which allows the reflective element to transmit a high percentage (such as greater than approximately 50 percent transmissivity) of a selected narrow spectral band of light. The narrow spectral band is selected so as to be substantially pinpointed or targeted at the particular peak intensity wavelength or wavelengths of light being emitted by the display device. Such an arrangement is particularly suitable for use with display devices incorporating light emitting diodes, which may emit light within a particular, narrow spectral band. The particular thickness and material for each layer or coating may be selected depending on the particular application and desired results.

For example, in a single ISI or DOD stack design which provides approximately 20-25 percent transmissivity of a particular spectral band or range, the reflectance of the ISI layer may be approximately 60-70 percent with respect to other light. If it is desired that the mirror have approximately 70 percent photopic reflectance or higher and increased transmissivity of a desired spectral band of light, a double ISI or DOD stack may be implemented. One particular embodiment of such a double ISI stack provides a semi-conductive layer (430 and/or 432) of approximately 71 nm (such as a layer 430 of approximately 30 nm (300 Å) and a layer 432*a* of approximately 41 nm (410 Å) or other combinations) of ITO or the like, a first metallic layer 434*a* of approximately 41 nm (410 Å), a semi-conductive layer 436*a* of approximately 101 nm (1010 Å) of ITO or the like, a second metallic layer 434*b* of approximately 36 nm (360 Å) and a semi-conductive layer 436*b* of approximately 10 nm (100 Å) of ITO or the like. This embodiment provides increased reflectivity of the reflective element to most wavelengths of light, while achieving the desired amount of transmissivity of the particular, targeted spectral band or bands. This is because the two metallic layers 434*a*, 434*b*, which are generally planar and parallel to each other, are separated by a distance of the order of approximately 100 nm (1000 Å), which gives rise to multiple beam interference of the incident light, resulting in constructive interference at certain wavelengths and destructive interference at other wavelengths. This particular example provides a reflective element which is spectrally tuned to substantially transmit light with a wavelength of approximately 602 nanometers, while substantially reflecting other visible light.

Figure 17:
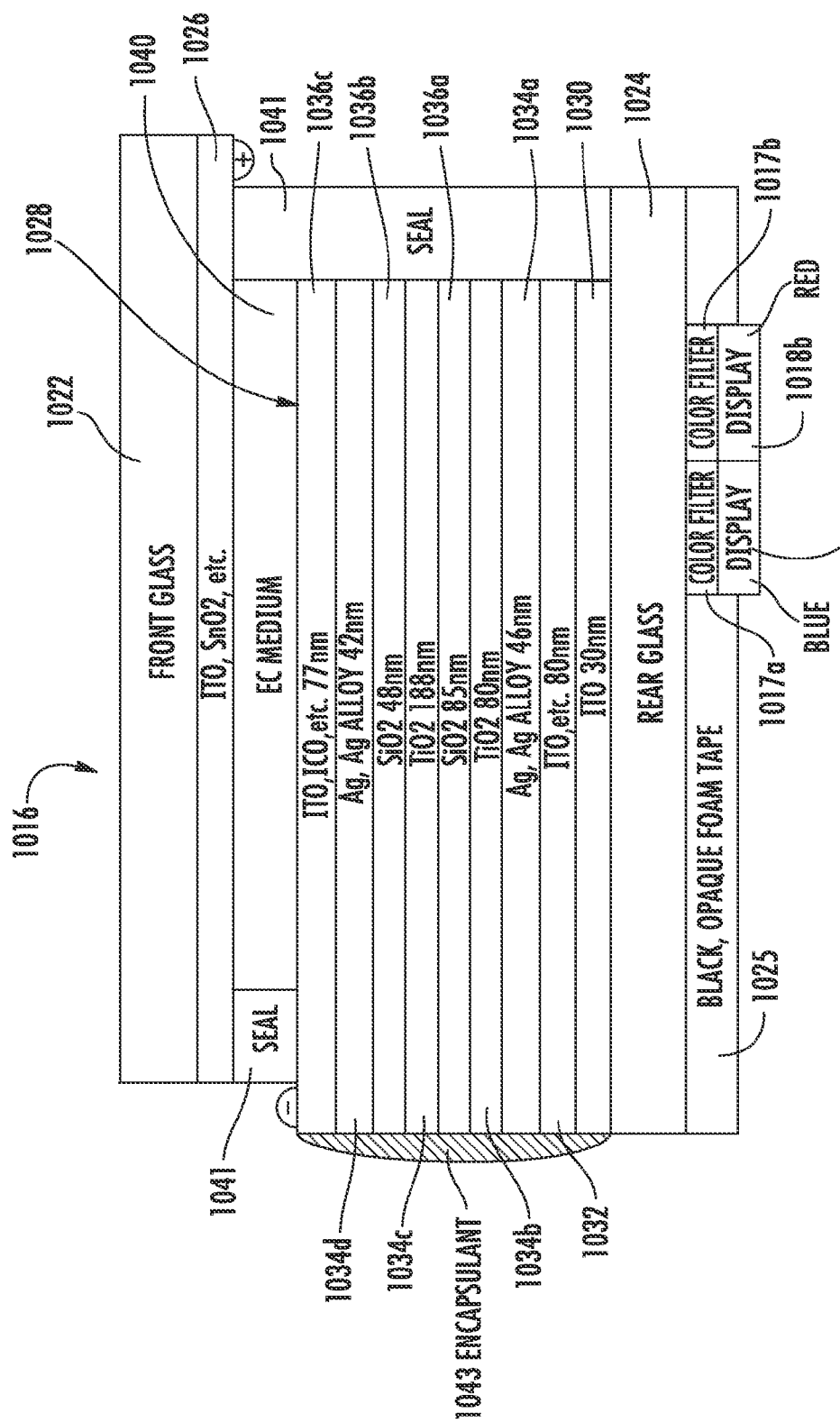
FIG. 17 a sectional view of another particular embodiment of a multiple stack reflective element of the present invention.

Other materials (with other refractive indices) and other physical thicknesses for the layers may be selected to transmit other desired wavelengths or ranges of wavelengths, without affecting the scope of the present invention. Also, additional repeating layers may be added to form a multiple stack, such as an additional metallic conducting layer and an additional semi-conductive ITO layer (or the like), in order to achieve the desired affect. The repeating and alternating layers form a narrow band ISI stack (which may have seven or nine or more layers of conductive layers and metallic layers), which functions to pass or transmit only such light which corresponds to one or more particular, substantially narrow spectral bands or ranges of wavelengths. The additional layers may provide enhanced performance of the reflective element with only an incremental increase in cost, since the additional layers are preferably deposited onto the other layers as part of the sputter coating process. With each additional set or stack of layers, each of the reflective, metallic layers may be reduced in thickness, which may provide increased transmissivity through the stack for a targeted spectral band, while still providing the desired amount of reflectivity over the reflective element. For example, a nine layer ISI or DOD stack (such as shown in FIG. 17 and discussed below) may provide a reflective element that has a greater than approximately 60 percent transmissivity of one or more particular, narrow spectral bands, and which is tuned or substantially pinpointed to match the emission spectrum from a particular display device (such as a display device including a light emitting diode).

Referring now to FIGS. 11-17, several particular examples of a reflective element or mirror element in accordance with the present invention are shown. The reflective elements of FIGS. 11-17 incorporate the design and functional aspects of the reflective elements discussed above, and are provided as specific examples or embodiments of the present invention. The materials and physical thicknesses of the layers are selected to provide different refractive indices and thicknesses to provide different beam interference of the incident light, thereby resulting in the desired transmissive range for a particular display element. In each embodiment of FIGS. 11-17, the various layers and substrates are given similar reference numbers as shown with respect to the reflective elements shown in FIGS. 2-10, but with each embodiment adding 100 to the reference numbers of the previous embodiment. Clearly, the scope of the present invention includes other combinations of layers that may be implemented to provide for enhanced transmissivity of one or more particular spectral bands of light, while providing substantial reflectance of other light.

Figure 11:
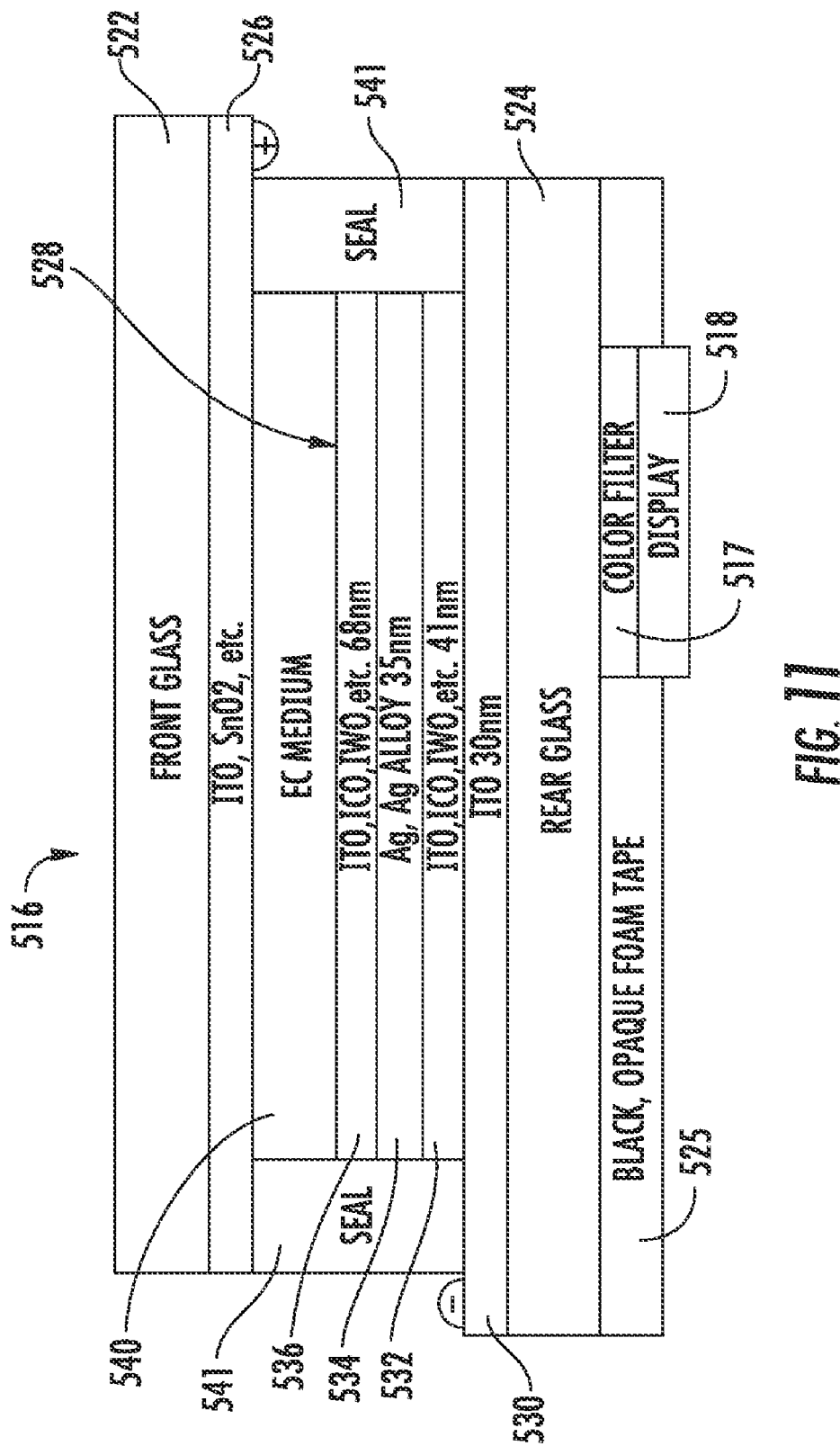
FIG. 11 is another sectional view of a particular embodiment of a reflective element of the present invention.
Figure 11A:
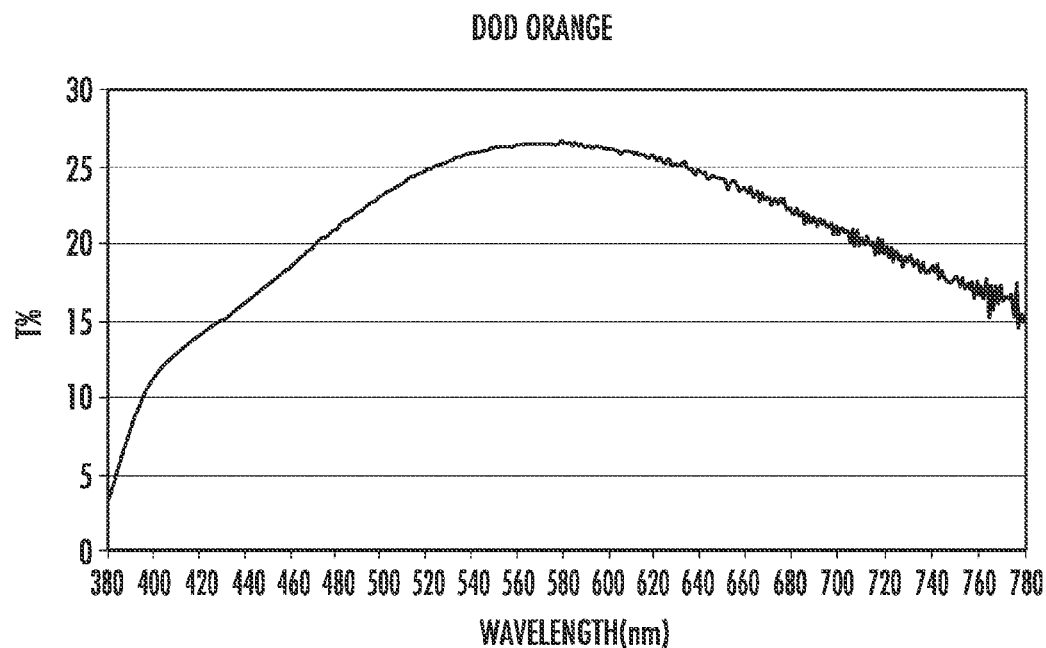
FIG. 11A is a graphical depiction of the transmissivity of the reflective element of FIG. 11.
Figure 11B:
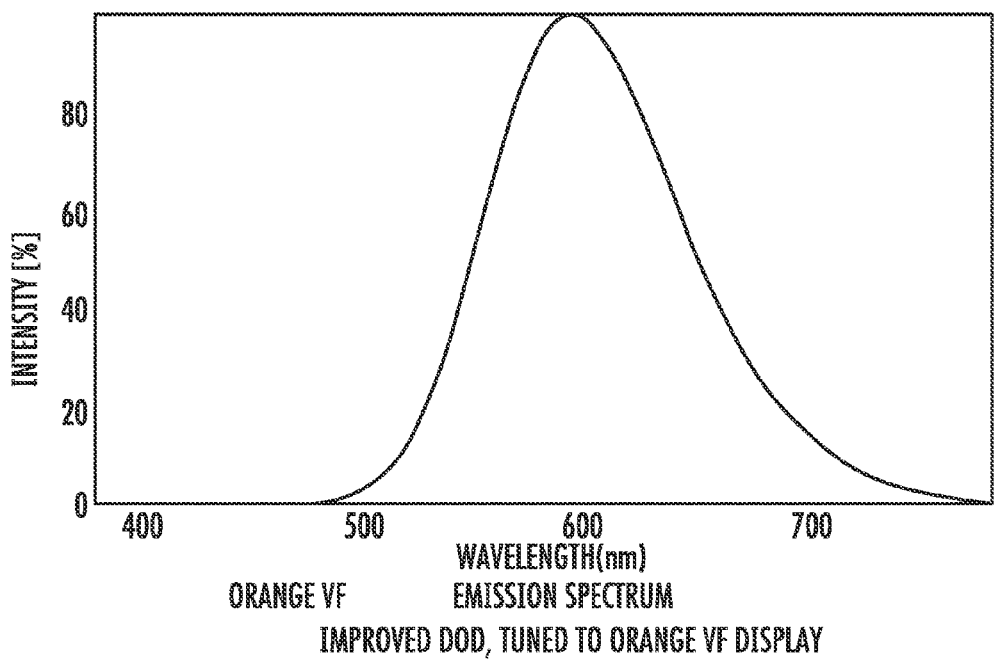
FIG. 11B is a graphical depiction of the emission spectrum of the display element for the reflective element of FIG. 11.

With reference to FIG. 11, a reflective element 516 has a front substrate 522 and a rear substrate 524 and a display element 518 at a rear or fourth surface of rear substrate 524. A semi-conductive ITO layer (or the like) 530 of approximately 30 nm is deposited on the forward or third surface of rear substrate 524, while a semi-conductive layer 526 (such as ITO, tin oxide or the like) is deposited on the rear or second surface of front substrate 522. An ISI or DOD stack or layer 528 and an electrochromic (EC) medium 540 and seal 541 are provided between the semi-conductive layers 526, 530. ISI layer 528 comprises a substantially transparent semi-conducting non-metallic adhesion layer 532 of approximately 41 nm of ITO, ICO, IWO or the like, a metallic conducting layer 534 of approximately 35 nm of silver or silver alloy or the like, and a substantially transparent semi-conducting non-metallic passivation layer 536 of approximately 68 nm of ITO, ICO, IWO or the like. As shown in FIG. 11A, such a configuration provides a transmissivity of light through reflective element 516 with a peak transmissivity of light having a wavelength of approximately 580 nm. The transflective reflector of the reflective element 516 is thus spectrally tuned to transmit orange light, such as light emitted from an orange vacuum fluorescent display 518, which emits light having a peak intensity of approximately 580 nm, as shown in FIG. 11B. The display 518 may also include a color filter 517, such as discussed above with respect to display 218.

In another particular embodiment similar to that of FIG. 11, an automotive DOD electrochromic mirror cell may include a transparent conductive layer, such as an ITO layer or the like (having, for example, approximately 12 ohms per square resistivity, which is commercially available as an ITO coated substrate), at the innermost, second surface of the front substrate, and a three layer coating or stack deposited on a transparent conductive layer, such as an ITO layer, at the rear substrate, itself deposited on the inner facing third surface of the rear substrate in a front/rear twin substrate laminate cell construction. The ITO layer at the rear substrate layer may have, for example, approximately 80 ohms per square resistivity, and the rear substrate may be a commercially available ITO coated substrate. The three layer stack or layers may be applied to the appropriate ITO coated surface of the rear substrate, such as via sputter coating or the like. For example, the rear glass element or substrate may be placed in a coating mask fixture to mask the perimeter and may be placed in a vacuum deposition system. The transflective third surface reflector/conductor may be made on or applied to the intended surface of the rear substrate (or to the ITO layer on the "third surface") by sequentially depositing first approximately 41 nm of ITO, second approximately 40 nm of silver metal and third approximately 65 nm of ITO onto the ITO layer at the third surface of the rear substrate.

The front and rear substrates are spaced apart using an epoxy perimeter seal (as is known and practiced in the electrochromic mirror art) with the conductive surfaces facing each other and preferably with an offset for the purpose of attaching an electrode clip or busbar. The spacing between the conductive planar surfaces is, for example, approximately 90 μm. After curing of the epoxy seal, the reflective element may be vacuum filled with an electrochromic medium, such as an electrochromic monomer material or the like. After filling the reflective element with the electrochromic monomer, the filling port of the reflective element or cell may be plugged with a UV curable adhesive which may then be cured by exposure to UV radiation. The reflective element or cell may then be cured in an oven to form a solid polymer matrix electrochromic medium.

When such an embodiment was formed and tested, a voltage of approximately 1.2 volts was applied to the reflective element and it was observed to color rapidly and uniformly. The photopic reflectance of the reflective element was initially approximately 67%, with a neutral silvery appearance, and decreased to approximately 7% in less than approximately 8 seconds with the voltage applied. The transmittance of the reflective element in its bleached state was approximately 19% for light having wavelengths between approximately 600 nm and 620 nm. When the voltage was disconnected or stopped, the reflectance of the reflective element substantially uniformly returned to its original value of approximately 67% within about 10 seconds. The DOD stack of the present invention thus may provide for enhanced transmittance of light having a preselected wavelength or range or band of wavelengths, even when in the bleached or colored or darkened state.

It is further envisioned that one or more adhesion enhancement layers or passivation layers, such as a layer or layers of nichrome (NiCr), palladium (Pd), platinum (Pt) or the like, may be applied or disposed at one or both sides of the metallic or silver layer 534, in order to increase the corrosion resistance of the metallic layer and to enhance the adhesion and the mechanical stability of the metallic layer. For example, an adhesion or passivation layer may be applied or disposed between metallic layer 534 and semi-conductive layer 532, and another adhesion or passivation layer may be applied or disposed between metallic layer 534 and semi-conductive layer 536. The adhesion or passivation layer or layers may have a thickness of approximately 0.5 nm to approximately 10 nm or thereabouts. The adhesion or passivation layers may be disposed at one or both sides or surfaces of the metallic layer or layers of any of the reflective element embodiments described herein or of other types of electrochromic reflective elements, without affecting the scope of the present invention. Such adhesion or passivation layers may be applied at the metallic layer or layers of other stacks or layers of the present invention described herein.

Figure 12:
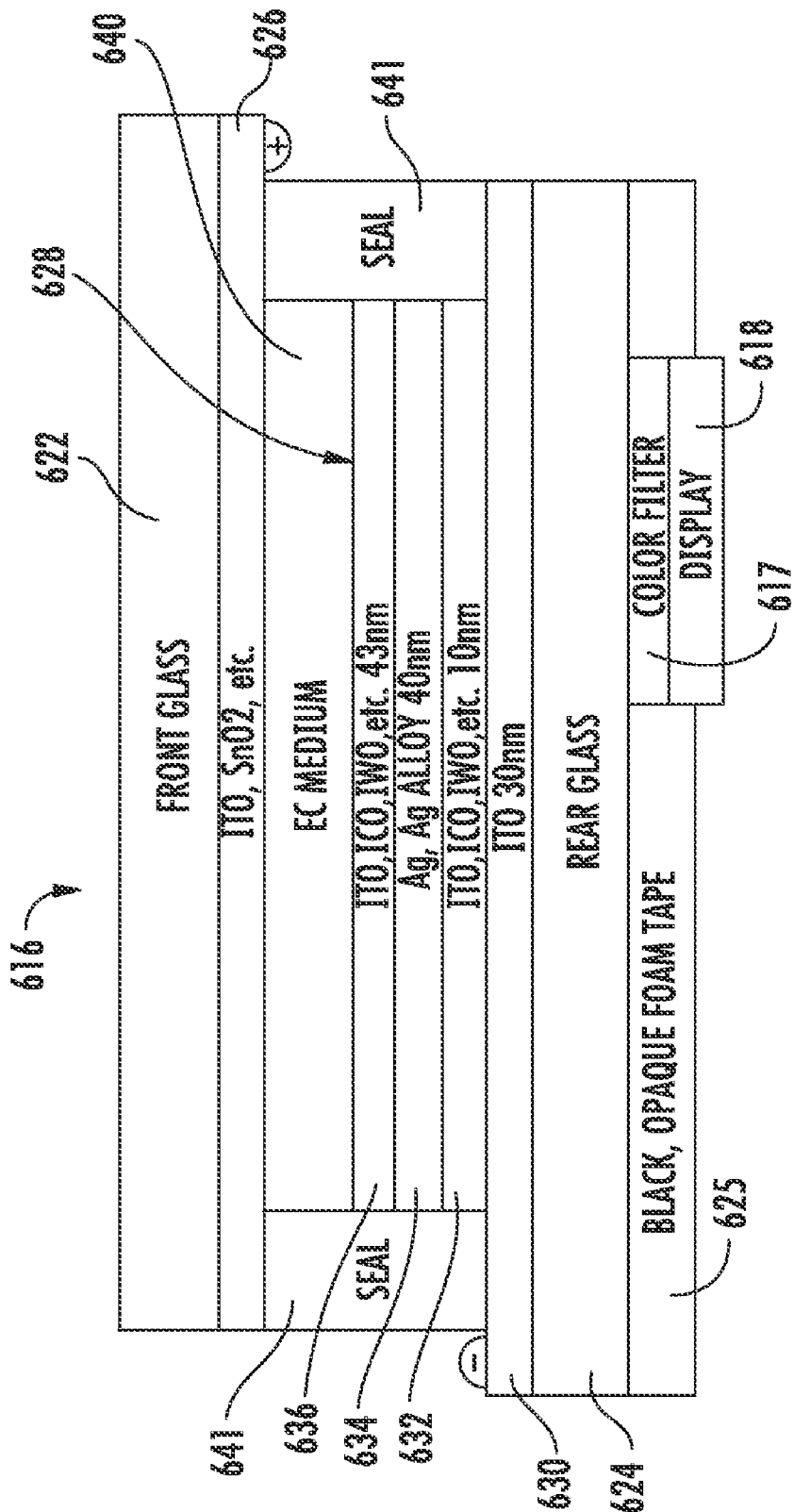
FIG. 12 is a sectional view of another particular embodiment of a reflective element of the present invention.
Figure 12A:
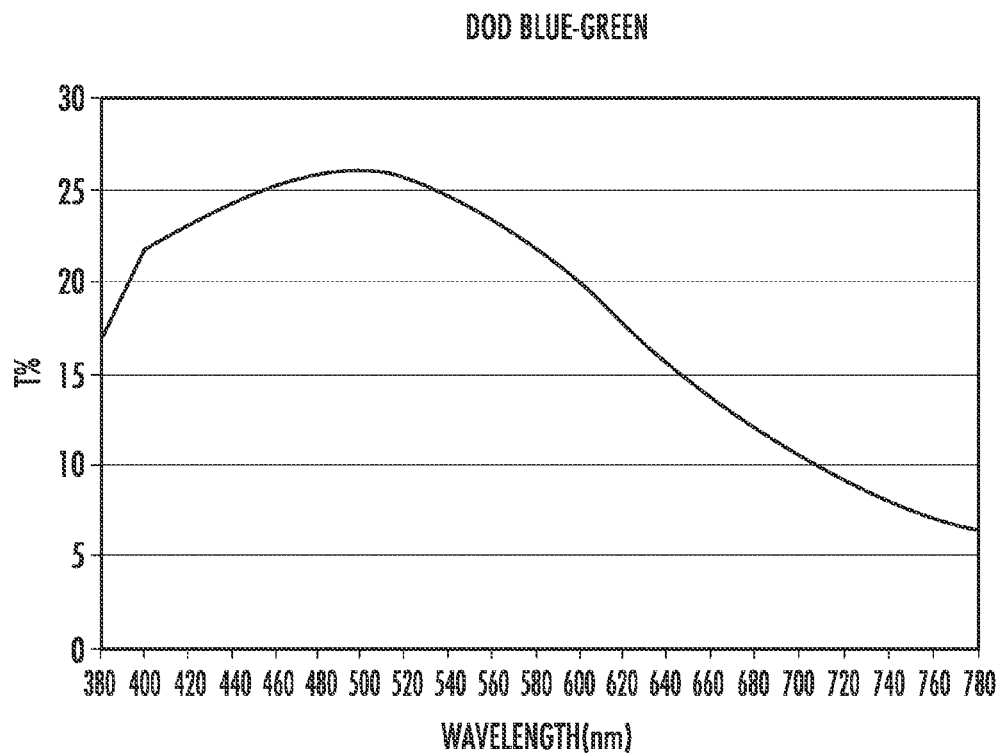
FIG. 12A is a graphical depiction of the transmissivity of the reflective element of FIG. 12.
Figure 12B:
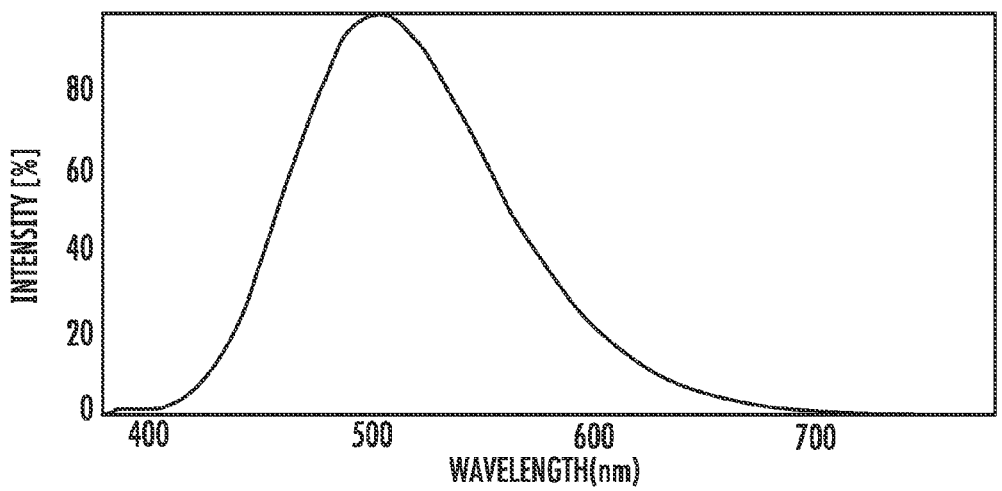
FIG. 12B is a graphical depiction of the emission spectrum of the display element for the reflective element of FIG. 12.

With reference to FIG. 12, a reflective element 616 has a front substrate 622 and a rear substrate 624 and a display element 618 at a rear or fourth surface of rear substrate 624. A semi-conductive ITO layer (or the like) 630 of approximately 30 nm is deposited on the forward or third surface of rear substrate 624, while a semi-conductive layer 626 (such as ITO, tin oxide or the like) is deposited on the rear or second surface of front substrate 622. An ISI or DOD stack or layer 628 and EC medium 640 and seal 641 are provided between the semi-conductive layers 626, 630. ISI layer 628 comprises an adhesion layer 632 of approximately 10 nm of ITO, ICO, IWO or the like, a metallic layer 634 of approximately 40 nm of silver or silver alloy or the like, and a passivation layer 636 of approximately 43 nm of ITO, ICO, IWO or the like. As shown in FIG. 12A, such a configuration provides a transmissivity of light through the reflective element with a peak transmissivity of light having a wavelength of approximately 500 nm. The reflective element 616 is thus spectrally tuned to transmit light emitted from a blue-green vacuum fluorescent display 618, which may emit light having a peak intensity of approximately 500 nm, as shown in FIG. 12B.

Figure 13:
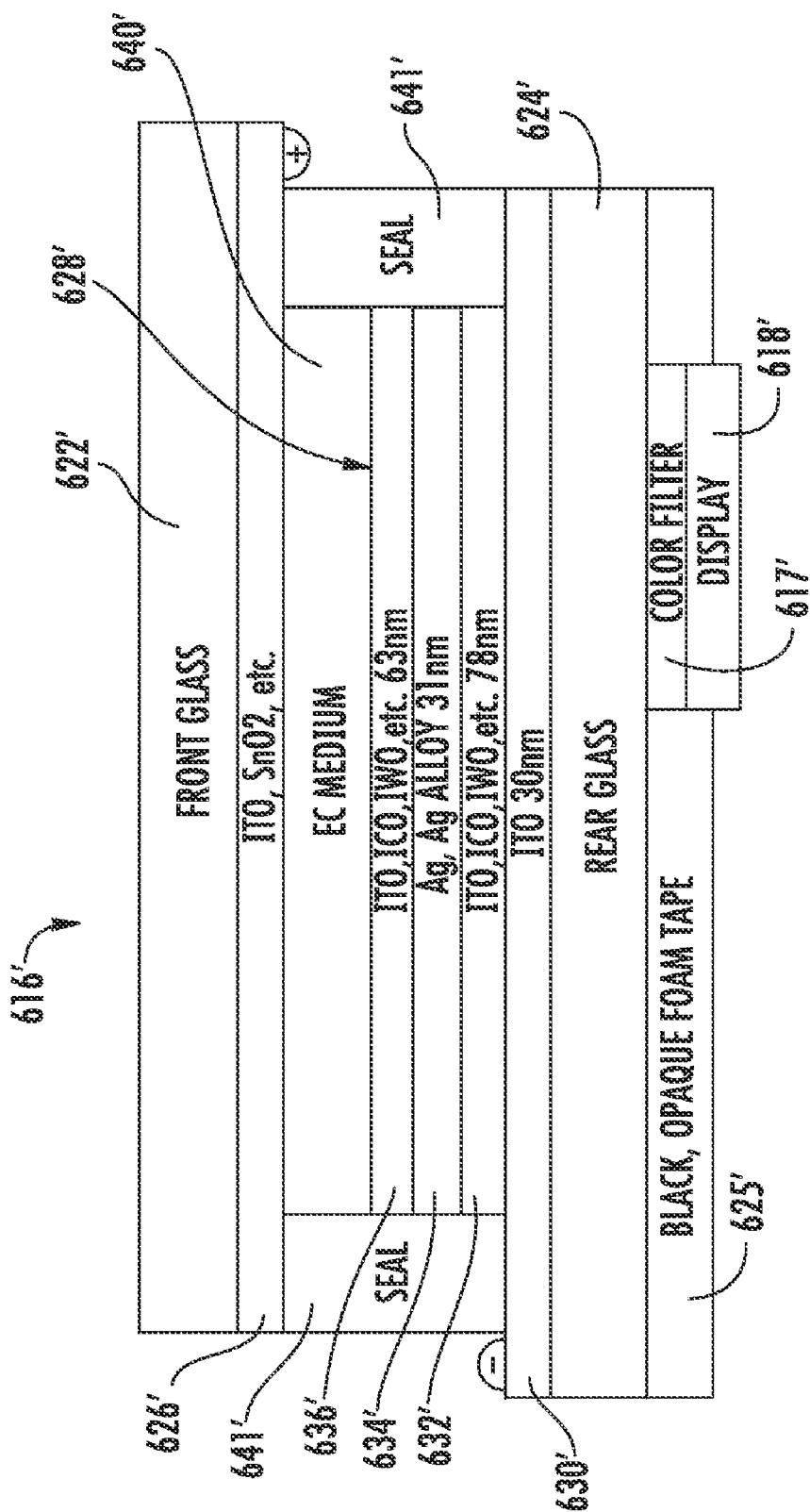
FIG. 13 is a sectional view of another particular embodiment of a reflective element of the present invention.
Figure 13A:
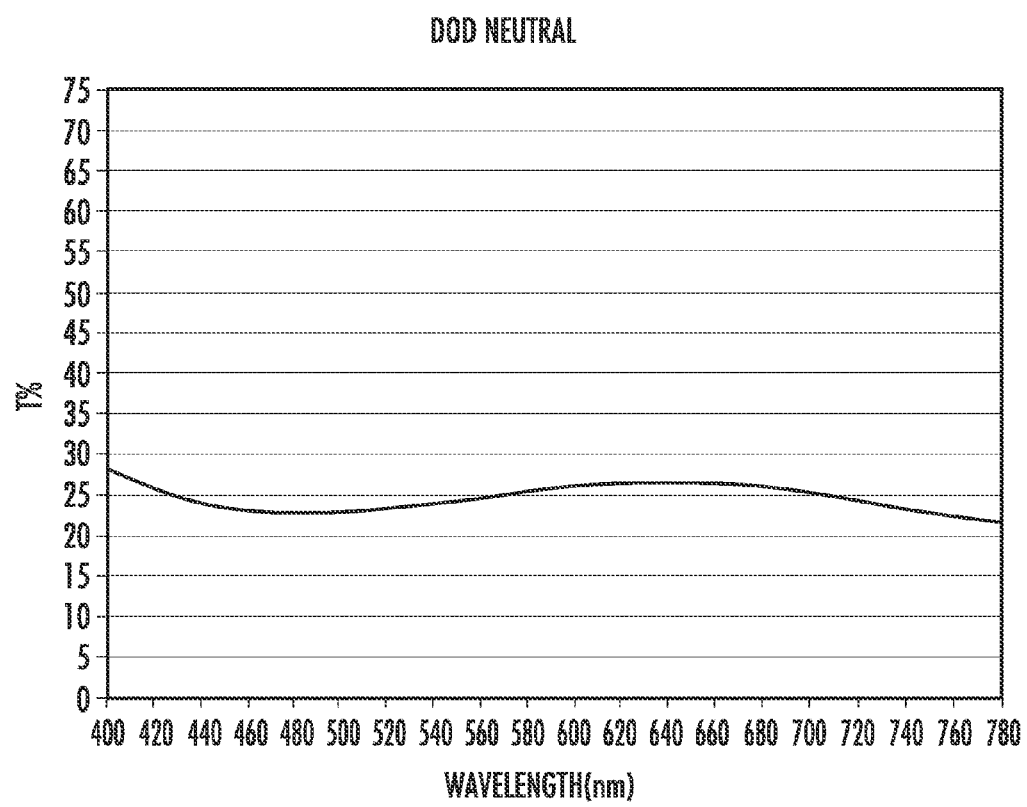
FIG. 13A is a graphical depiction of the transmissivity of the reflective element of FIG. 13.

With reference to FIG. 13, a reflective element 616' provides a substantially spectrally neutral transmission characteristic and has a front substrate 622' and a rear substrate 624' and a display element 618' at a rear or fourth surface of rear substrate 624'. A semi-conductive ITO layer (or the like) 630' of approximately 30 nm is deposited on the forward or third surface of rear substrate 624', while a semi-conductive layer 626' (such as ITO, tin oxide or the like) is deposited on the rear or second surface of front substrate 622'. An ISI or DOD stack or layer 628' and EC medium 640' and seal 641' are provided between the semi-conductive layers 626', 630'. ISI layer 628' comprises an adhesion layer 632' of approximately 78 nm of ITO, ICO, IWO or the like, a metallic layer 634' of approximately 31 nm of silver or silver alloy or the like, and a passivation layer 636' of approximately 63 nm of ITO, ICO, IWO or the like. As shown in FIG. 13A, such a configuration provides a generally neutral transmission of light through the transflective reflective element for most wavelengths of visible light.

Figure 14:
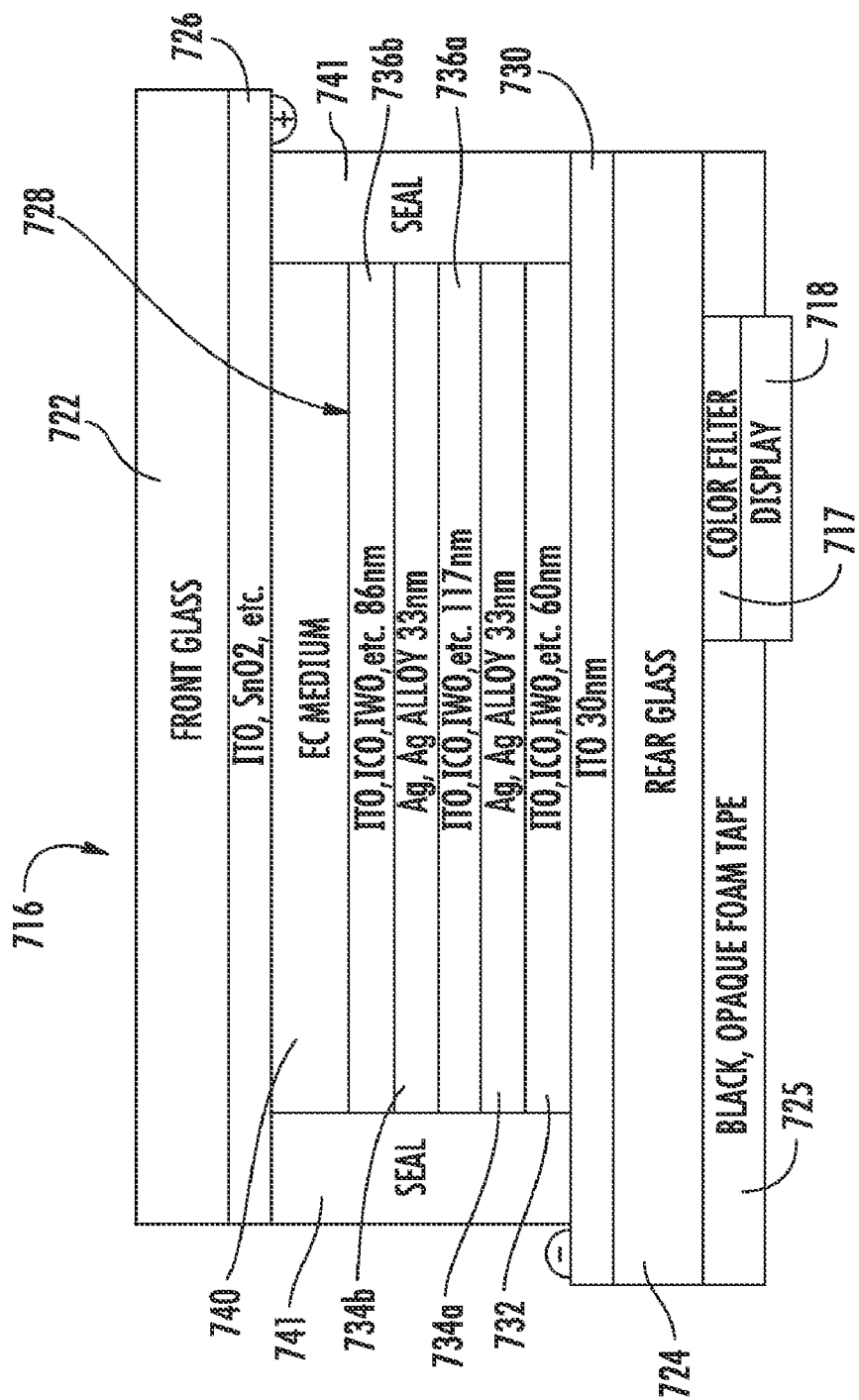
FIG. 14 a sectional view of a particular embodiment of a double stack reflective element of the present invention.
Figure 14A:
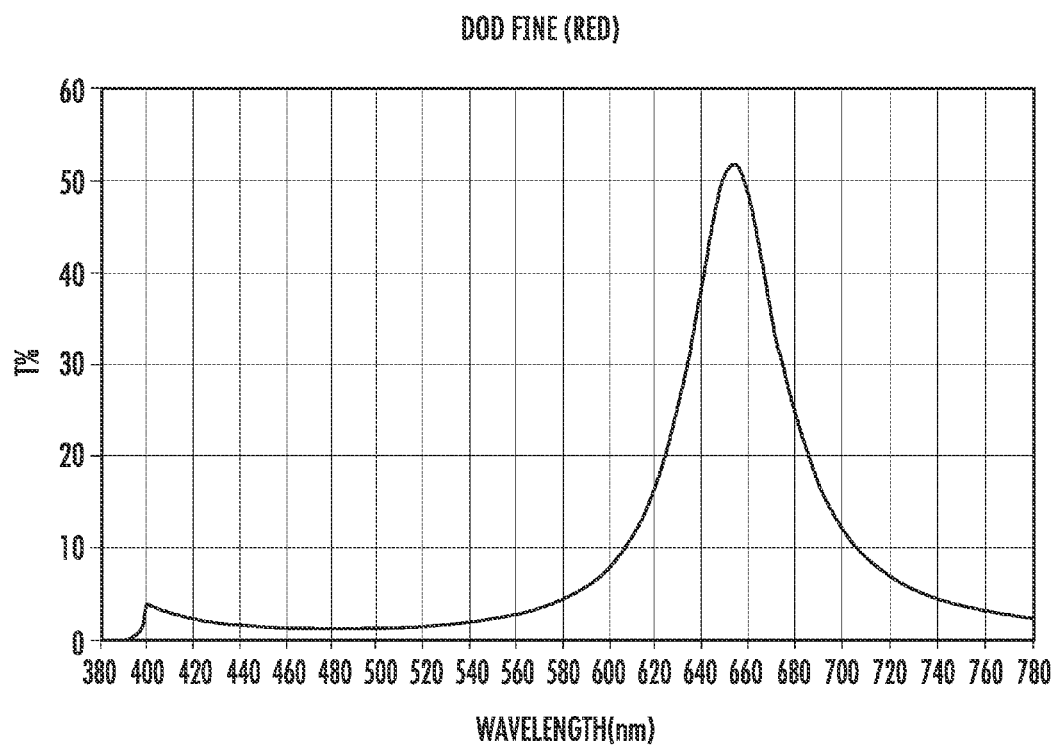
FIG. 14A is a graphical depiction of the transmissivity of the double stack reflective element of FIG. 14.
Figure 14B:
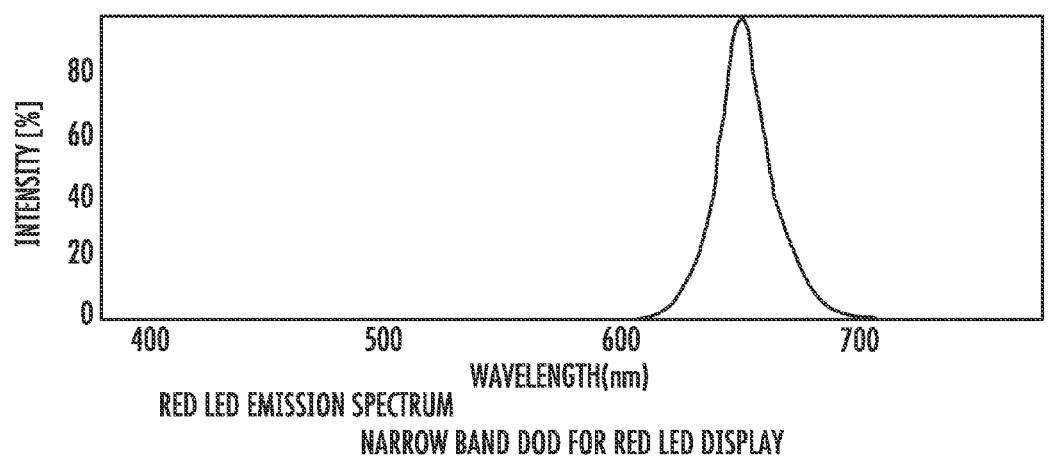
FIG. 14B is a graphical depiction of the emission spectrum of the display element for the double stack reflective element of FIG. 14.

With reference to FIG. 14, a reflective element 716 has a front substrate 722 and a rear substrate 724 and a display element 718 at a rear or fourth surface of rear substrate 724. A semi-conductive ITO layer (or the like) 730 of approximately 30 nm is deposited on the forward or third surface of rear substrate 724, while a semi-conductive layer 726 (such as ITO, tin oxide or the like) is deposited on the rear or second surface of front substrate 722. A double stack ISI or DOD stack or layer 728 and EC medium 740 and seal 741 are provided between the semi-conductive layers 726, 730. Double stack ISI layer 728 comprises a semi-conductive adhesion layer 732 of approximately 60 nm of ITO, ICO, IWO or the like, a first metallic layer 734a of approximately 33 nm of silver or silver alloy or the like, a semi-conductive layer 736a of approximately 117 nm of ITO, ICO, IWO or the like, a second metallic layer 734b of approximately 33 nm of silver, silver alloy or the like, and a semi-conductive layer 736b of approximately 86 nm of ITO, ICO, IWO or the like. As shown in FIG. 14A, such a configuration provides a transmissivity of light through the reflective element with a peak transmissivity of light having a wavelength of approximately 650 nm. The reflective element 716 is thus spectrally tuned to transmit red light, such as light emitted from a red light emitting diode display 718, which may emit light having a peak intensity of approximately 650 nm, as shown in FIG. 14B. As can be seen with reference to FIGS. 14A and 11A, the transflective reflector and double stack ISI or DOD layer 728 provide a narrower band of transmissivity for the desired spectral band or range of wavelengths being emitted by the display. Such a configuration thus may provide enhanced reflectivity of light outside of the targeted spectral band.

Figure 15:
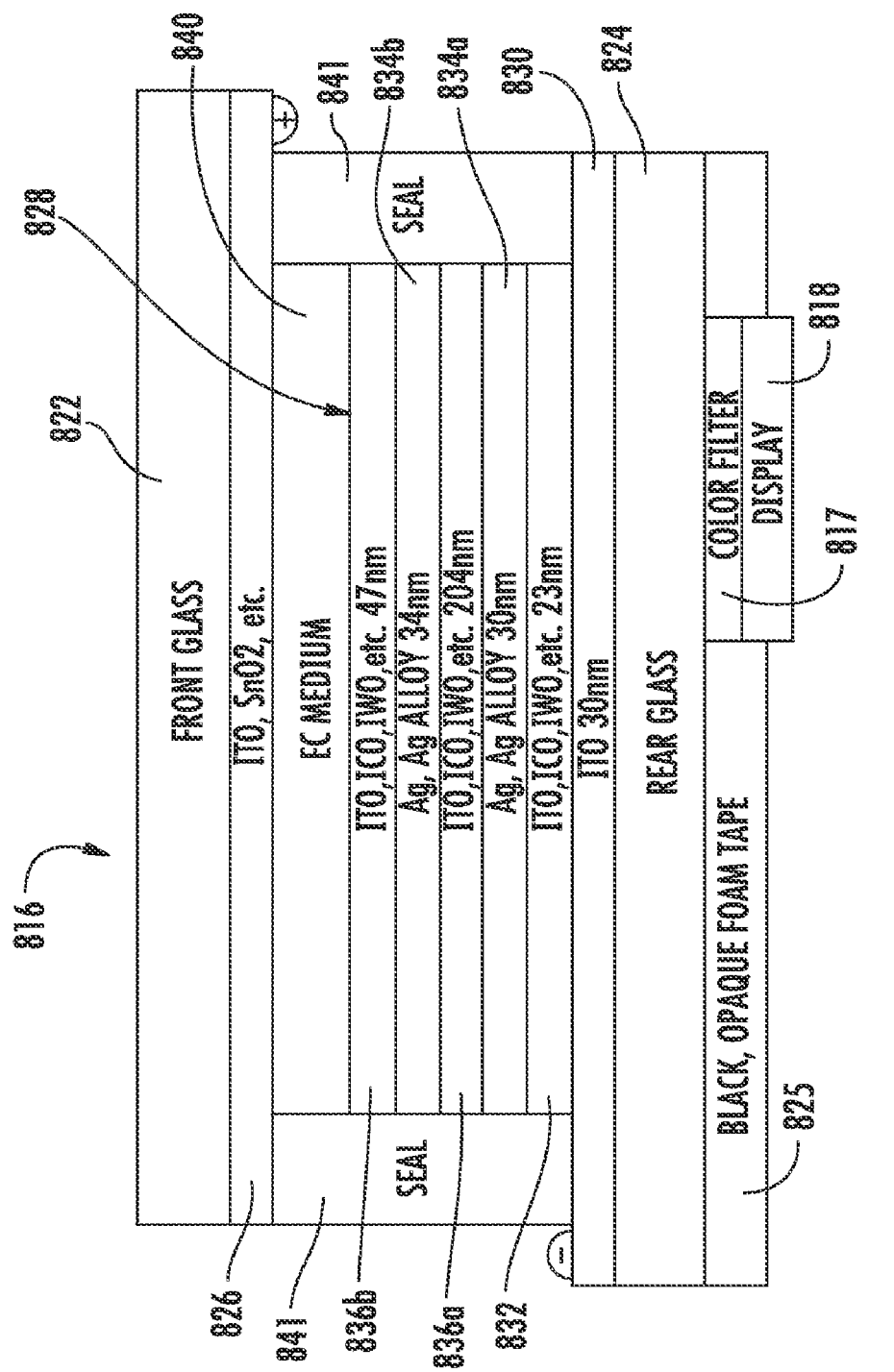
FIG. 15 a sectional view of another particular embodiment of a double stack reflective element of the present invention.
Figure 15A:
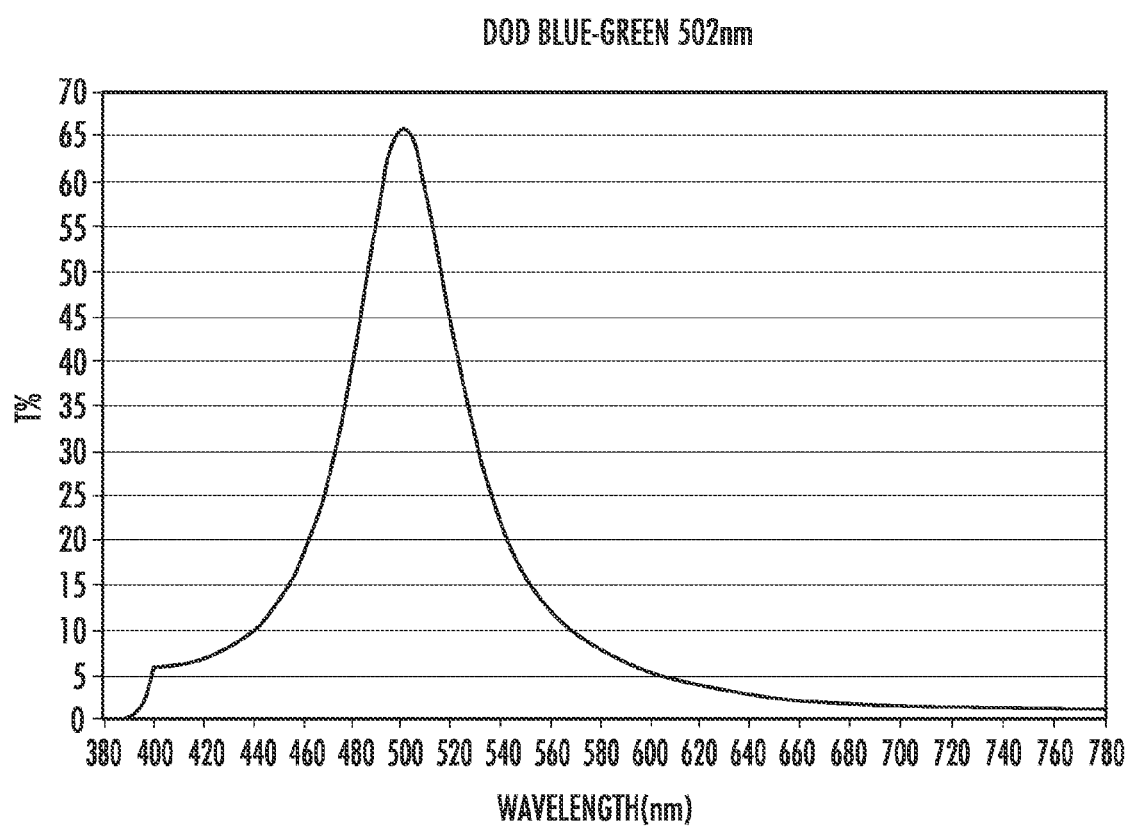
FIG. 15A is a graphical depiction of the transmissivity of the double stack reflective element of FIG. 15.

With reference to FIG. 15, a reflective element 816 has a front substrate 822 and a rear substrate 824 and a display element 818 at a rear or fourth surface of rear substrate 824. A semi-conductive ITO layer (or the like) 830 of approximately 30 nm is deposited on the forward or third surface of rear substrate 824, while a semi-conductive layer 826 (such as ITO, tin oxide or the like) is deposited on the rear or second surface of front substrate 822. A double stack ISI or DOD stack or layer 828 and EC medium 840 and seal 841 are provided between the semi-conductive layers 826, 830. Double stack ISI layer 828 comprises a semi-conductive adhesion layer 832 of approximately 23 nm of ITO, ICO, IWO or the like, a first metallic layer 834a of approximately 30 nm of silver or silver alloy or the like, a semi-conductive layer 836a of approximately 204 nm of ITO, ICO, IWO or the like, a second metallic layer 834b of approximately 34 nm of silver, silver alloy or the like, and a semi-conductive layer 836b of approximately 47 nm of ITO, ICO, IWO or the like. As shown in FIG. 15A, such a configuration provides a transmissivity of light through the reflective element with a peak transmissivity of light having a wavelength of approximately 500 nm. The reflective element 816 is thus spectrally tuned to transmit blue-green light, such as light emitted from a blue-green light emitting diode display 818, which may emit light having a peak intensity of approximately 500 nm. Similar to double stack ISI layer 728 discussed above, the transflective reflector and double stack ISI layer 828 provide a narrower band of transmissivity for the desired spectral band or range of wavelengths being emitted by the display. Such a configuration thus may provide enhanced transmissivity of the preselected or targeted spectral band and enhanced reflectivity of light outside of the targeted spectral band.

Figure 16:
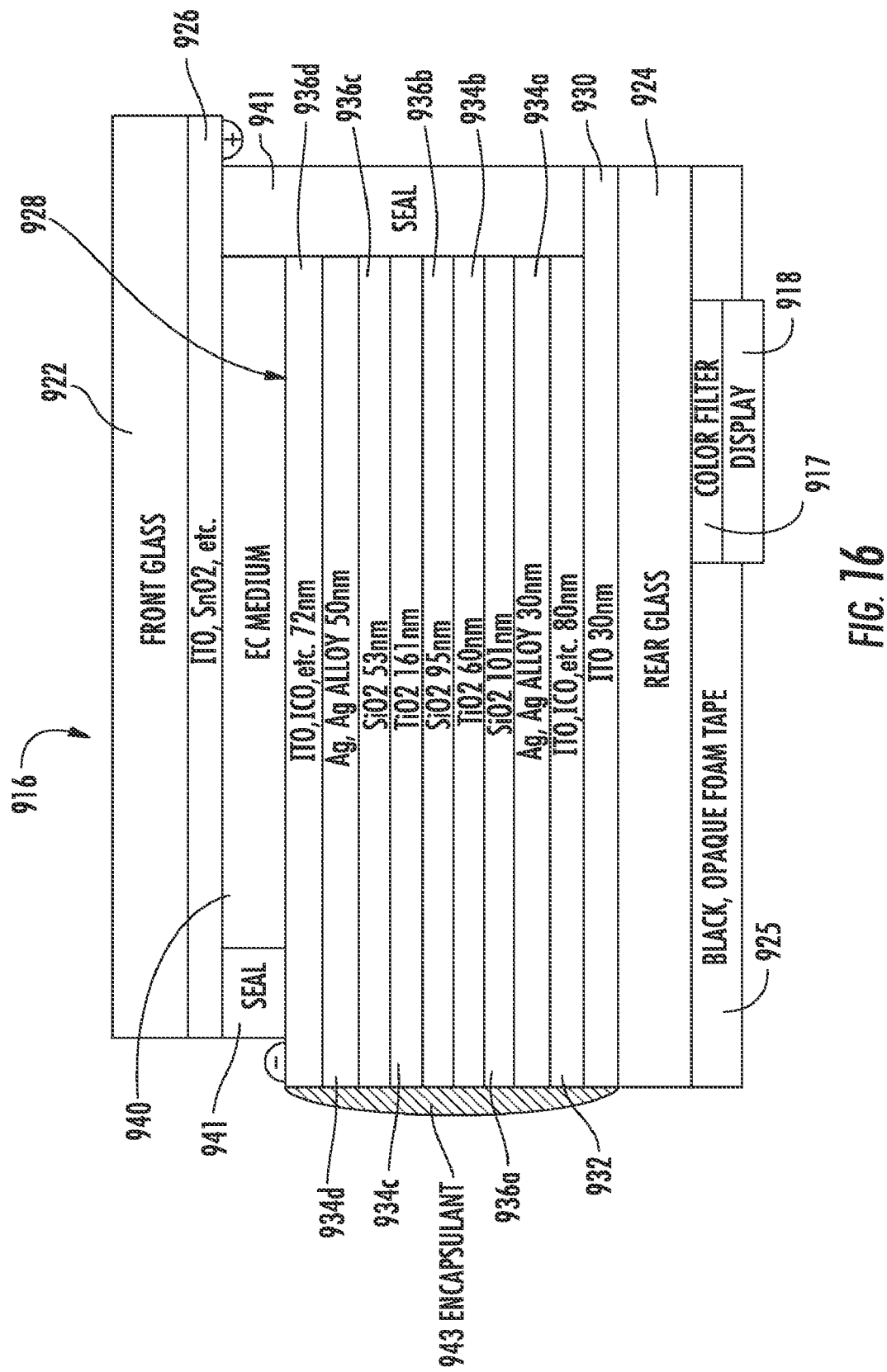
FIG. 16 a sectional view of a particular embodiment of a multiple stack reflective element of the present invention.

With reference to FIG. 16, a reflective element 916 has a front substrate 922 and a rear substrate 924 and a display element 918 at a rear or fourth surface of rear substrate 924. A semi-conductive ITO layer (or the like) 930 of approximately 30 nm is deposited on the forward or third surface of rear substrate 924, while a semi-conductive layer 926 (such as ITO, tin oxide or the like) is deposited on the rear or second surface of front substrate 922. A multiple stack ISI or DOD stack or layer 928, EC medium 940, seal 941 and encapsulant 943 are provided between the semi-conductive layers 926, 930. The ISI or DOD stack or layer 928 may be provided on ITO layer 930 so as to have a tab out portion as discussed above with respect to ISI layer 328. The encapsulant 943 is provided along the edges of the tab out portion of reflective element 916, and the seal 941 is provided between the tab out portion and the ITO layer 926 on front substrate 922 and between the ITO layers 924, 926 around ISI layer 928 where there is no tab out portion.

Figure 16A:
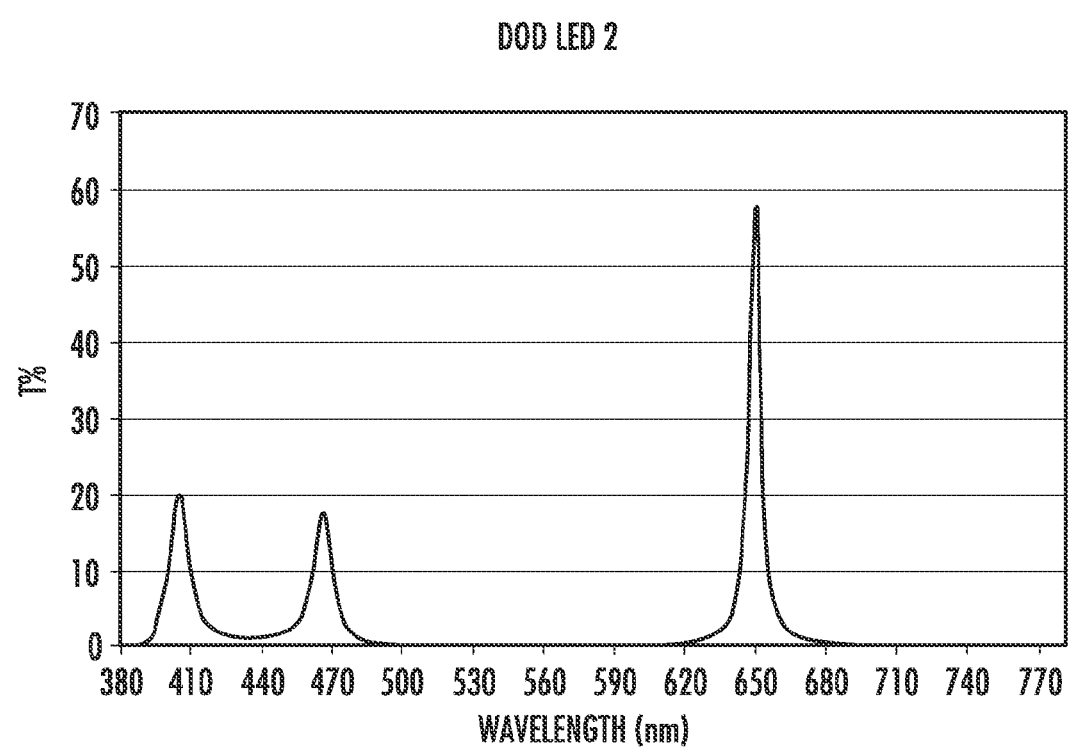
FIG. 16A is a graphical depiction of the transmissivity of the multiple stack reflective element of FIG. 16.

Multiple ISI or DOD stack or layer 928 comprises an adhesion layer 932 of approximately 80 nm of ITO, ICO, IWO or the like, a first metallic layer 934a of approximately 30 nm of silver or silver alloy or the like, a layer 936a of approximately 101 nm of silicon oxide or the like, a layer 934b of approximately 60 nm of titanium oxide or the like, a layer 936b of approximately 95 nm of silicon oxide or the like, a layer 934c of approximately 161 nm of titanium oxide or the like, a layer 936c of approximately 53 nm of silicon oxide or the like, a metallic layer 934d of approximately 50 nm of silver or silver alloy or the like, and a layer 936d of approximately 72 nm of ITO, ICO or the like. As shown in FIG. 16A, such a configuration provides a transmissivity of light through the reflective element with a peak transmissivity of light having a wavelength of approximately 650 nm. The reflective element 916 is thus spectrally tuned to transmit red light, such as light emitted from a red light emitting diode display 918, which may emit light having a peak intensity of approximately 650 nm. The transflective reflector and multiple stack ISI layer 928 provide an extra narrow band of transmissivity for the desired spectral band or range of wavelengths being emitted by the display. Such a configuration thus may provide enhanced reflectivity of light outside of the targeted spectral band. As can be seen in FIG. 16A, reflective element 916 may also transmit spectral bands of light at certain other wavelengths or ranges of wavelengths as well, such as at approximately 410 nm and 470 nm.

With reference to FIG. 17, a reflective element 1016 has a front substrate 1022 and a rear substrate 1024 and a display element 1018 at a rear or fourth surface of rear substrate 1024. A semi-conductive ITO layer (or the like) 1030 of approximately 30 nm is deposited on the forward or third surface of rear substrate 1024, while a semi-conductive layer 1026 (such as ITO, tin oxide or the like) is deposited on the rear or second surface of front substrate 1022. A multiple stack ISI or DOD stack or layer 1028, EC medium 1040, seal 1041 and encapsulant 1043 (around a tab out portion of the ISI layer, as discussed above) are provided between the semi-conductive layers 1026, 1030.

Figure 17A:
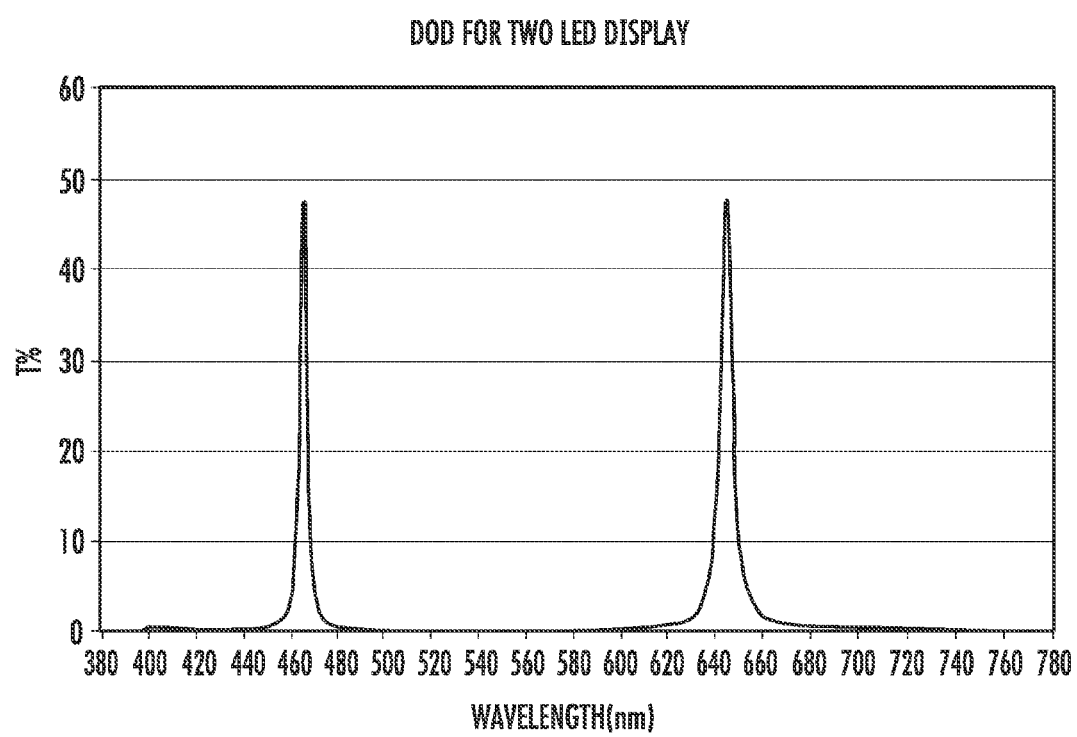
FIG. 17A is a graphical depiction of the transmissivity of the multiple stack reflective element of FIG. 17.

Multiple stack ISI or DOD layer 1028 comprises an adhesion layer 1032 of approximately 80 nm of ITO, ICO, IWO or the like, a first metallic layer 1034a of approximately 46 nm of silver or silver alloy or the like, a layer 1034b of approximately 80 nm of titanium oxide or the like, a layer 1036a of approximately 85 nm of silicon oxide or the like, a layer 1034c of approximately 188 nm of titanium oxide or the like, a layer 1036b of approximately 48 nm of silicon oxide or the like, a metallic layer 1034d of approximately 42 nm of silver or silver alloy or the like, and a layer 1036c of approximately 77 nm of ITO, ICO or the like. As shown in FIG. 17A, such a configuration provides a transmissivity of light through the reflective element with two peak transmission bands, namely, a first spectral band having a peak transmissivity of light having a wavelength of approximately 465 nm and a second spectral band having a peak transmissivity of light having a wavelength of approximately 645 nm. The reflective element 1016 is thus spectrally tuned to substantially transmit both blue light, such as light emitted from a blue light emitting diode display 1018a, which may emit light having a peak intensity of approximately 465 nm, and red light, such as light emitted from a red light emitting diode display 1018b, which may emit light having a peak intensity of approximately 645 nm. The transflective reflector and multiple stack ISI layer 1028 provide an extra narrow band of transmissivity for each of the desired spectral bands or ranges of wavelengths being emitted by the displays. Such a configuration thus may facilitate the implementation of different colored display elements, while providing enhanced reflectivity of light outside of the targeted spectral bands.

Referring now to FIG. 18, an electro-optic or electrochromic mirror element 1116 comprises a pair of substrates (a front substrate 1122 is shown in FIG. 18), with an electrochromic medium (not shown in FIG. 18) sandwiched therebetween. Electrochromic mirror element 1116 may comprise a reflective metallic layer or layers and transparent, at least partially conductive layers, such as discussed above, to provide a transflective mirror element. The electrochromic mirror element 1116 includes one or more display elements, such as the three display elements 1118a, 1118b, 1118c shown in FIG. 18, positioned behind the rear substrate and operable to emit or transmit light through the substrates and layers and electrochromic medium for viewing at the front substrate 1122.

The electrochromic mirror element 1116 comprises at least two regions, such as the three regions 1116a, 1116b, 1116c shown in FIG. 18. A central or principle viewing region 1116a provides a respective reflectivity and transmissivity, such as via layers or coatings as described above. One or both side regions 1116b, 1116c also provide a respective reflectivity and transmissivity. In the illustrated embodiment, the display element or elements 1118a, 1118b, 1118c are positioned at the side or display regions 1116b, 1116c. The conductive metallic and semiconductive non-metallic layers may be selected and adjusted so that the transmissivity in the side regions 1116b, 1116c may be greater than the transmissivity in the central region 1116a, while the reflectivity in the central region 1116a may be greater than the reflectivity in the side or display regions 1116b, 1116c, The present invention thus provides greater transmissivity in the display regions to enhance viewing of the displays, while providing greater reflectivity in the central or main region of the mirror element to provide enhanced reflectivity in the principle viewing area.

In the illustrated embodiment, the transmissivity at the display regions may be approximately 25%, while the transmissivity in the central or principle viewing region may be approximately 20%. Likewise, the reflectivity in the central or principle viewing region may be approximately 65%, while the reflectivity in the display regions may be approximately 60%. Other reflective and transmissive characteristics may be achieved without affecting the scope of the present invention.

The difference in the reflectivity and transmissivity between the regions is achieved by selecting different combinations of vapor source and masking of the regions to achieve the desired effect. For example, the thicknesses of different layers of the conductive metallic layer or layers and of the transparent, at least partially conductive layers may be selected or adjusted across the mirror element to achieve a desired amount of transmissivity at the display regions, while maintaining sufficient reflectivity in these regions, and to achieve a desired or optimum or maximum reflectivity at the central or principle viewing area or region of the mirror element. For example, a reflective metallic coating or layer may be thicker at the principle viewing region than at the display region or regions, while a transparent layer or coating may be thinner at the principle viewing region than at the display region or regions. Although shown as having display regions at the side regions of the mirror element, clearly displays and associated display regions providing enhanced transmissivity may be positioned elsewhere around the mirror element, without affecting the scope of the present invention.

Therefore, the reflective element or mirror element of the present invention allows for a display element to be positioned behind the reflective layer and transmits light from the display element through the mirror element, while providing sufficient reflectivity across the entire mirror element and not requiring any windows or thinned areas of reduced reflectivity in the display region. The present invention thus provides a mirror assembly which may include multiple display-on-demand type displays or display-on-need type displays, without adversely affecting the reflective nature of the reflective element. Furthermore, the transmissivity of the ISI or DOD stack or layer or the multiple stack 151 or DOD layers of the transflective reflector of the present invention may match or pinpoint the particular spectral band corresponding to the light emitted by the display element or device, in order to provide improved transmission of the display information or light through the stack (and thus through the reflective element), while providing a desired neutral reflectance over the entire surface of the reflector. The present invention thus may provide a reflective element which has a transmissivity level of greater than at least approximately 20 percent, more preferably at least approximately 30 percent, and most preferably at least approximately 50 percent, for light within a particular narrow spectral band or range of wavelengths, while providing substantial reflectance of light outside of the particular, selected spectral band or range of wavelengths. The reflective element of the present invention also provides for generally uniform thickness of the ISI or DOD layers, since none of the layers have to be etched or masked or reduced in thicknesses to allow for the display to transmit therethrough, thereby enhancing the manufacturing processing of the reflective element.

Optionally, the mirror assembly may include an illumination source for providing illumination, such as near infrared and/or infrared illumination, within the cabin of the vehicle. For example, the illumination source may be directed toward the head of the driver of the vehicle (or the area or location where a typical driver's head would be), and may be used in conjunction with a camera device or imaging device or the like. The imaging device or imaging system may comprise a cabin monitoring system, such as a monitoring system utilizing the principles disclosed in U.S. Pat. Nos. 6,523,964; and 6,302,545, and U.S. patent application Ser. No. 10/372,873, filed Feb. 24, 2003, now U.S. Pat. No. 6,802,617; Ser. No. 09/793,002, filed Feb. 26, 2001, now U.S. Pat. No. 6,690,268; and Ser. No. 10/054,633, filed Jan. 22, 2002, now U.S. Pat. No. 7,195,381, which are hereby incorporated by reference herein. Optionally, the illumination source may be operable to illuminate the head of the driver while the imaging device is operable to capture images of the driver's head, such as for a video conferencing function, a driver alertness detection function (which may detect drowsiness issues, such as unorthodox head movement, nodding, glazed eyes, dilating eyes or other characteristics which may be indicative of driver fatigue or reduced alertness), a seat occupancy detection function, an intrusion detection function or any other desired functions. The illumination source or sources may comprise infrared or near infrared emitting sources, such as light emitting diodes (LEDs) or the like, to minimize the affect on or visibility to the driver of the vehicle, such as disclosed in U.S. Pat. Nos. 6,523,964; and 6,302,545, and U.S. patent application Ser. No. 10/372,873, filed Feb. 24, 2003, now U.S. Pat. No. 6,802,617, which are hereby incorporated herein by reference. The imaging device thus may be capable of sensing infrared light, and may be particularly sensitive to infrared or near infrared light, and may comprise a CMOS imaging array or the like, such as disclosed in U.S. Pat. Nos. 5,550,677; 5,670,935; 5,760,962; 5,796,094 and 5,877,897, which are hereby incorporated herein by reference.

The interior rearview mirror assembly may provide the illumination source or sources at the bezel or chin or eyebrow of the mirror assembly, or at a module or pod or the like associated with the mirror assembly. Optionally, the mirror assembly may include the illumination source or sources within the mirror casing and behind the electrochromic cell of the mirror assembly, whereby the illumination source may emit near infrared light or radiant energy and project the light through a transflective electrochromic element, which may have sufficient transmissivity in the near infrared range of the spectrum, while limiting transmissivity of light in the visible range and providing a desired amount of untinted photopic reflectance, as discussed below. The illumination source thus may be positioned behind the rear substrate of the electrochromic cell and may project the near infrared illumination through both substrates of the reflective element or cell to sufficiently illuminate or bathe or flood the targeted area with near infrared illumination. The imaging device may also be positioned within the mirror casing and behind the transflective electrochromic element to capture images of the scene illuminated by the near infrared illumination source or sources.

The transflective display on demand type reflective element preferably maintains an untinted, high photopic reflectance of visible light, while also providing sufficient transmissivity of near infrared light or radiant energy (such as within the range of approximately 750 nm to approximately 1100 nm). Preferably, the transflective display on demand element provides at least approximately 30% transmissivity of near infrared light, preferably at least approximately 40%, more preferably at least approximately 60% and most preferably at least approximately 80% transmissivity of near infrared light. Typically, such near infrared transmissivity may not be achieved utilizing reflective coatings or stacks of coatings that comprise or include a metallic layer, such as a thin silver or silver alloy or aluminum or aluminum alloy layer or the like. In such applications, the infrared or near infrared light emitted by the illumination source may reflect back into the cavity of the mirror casing. The present invention overcomes this by providing an infrared or near infrared transmitting stack of dielectric layers or coatings which substantially transmit near infrared light while the transflective element also provides high photopic reflectance of visible light. The transflective element may provide high photopic reflectance and may meet the specifications set forth in SAE J964A, which is hereby incorporated herein by reference. Preferably, the transflective element provides greater than approximately 55%, more preferably greater than approximately 65% and most preferably greater than approximately 75%, of such photopic reflectance.

Figure 19:
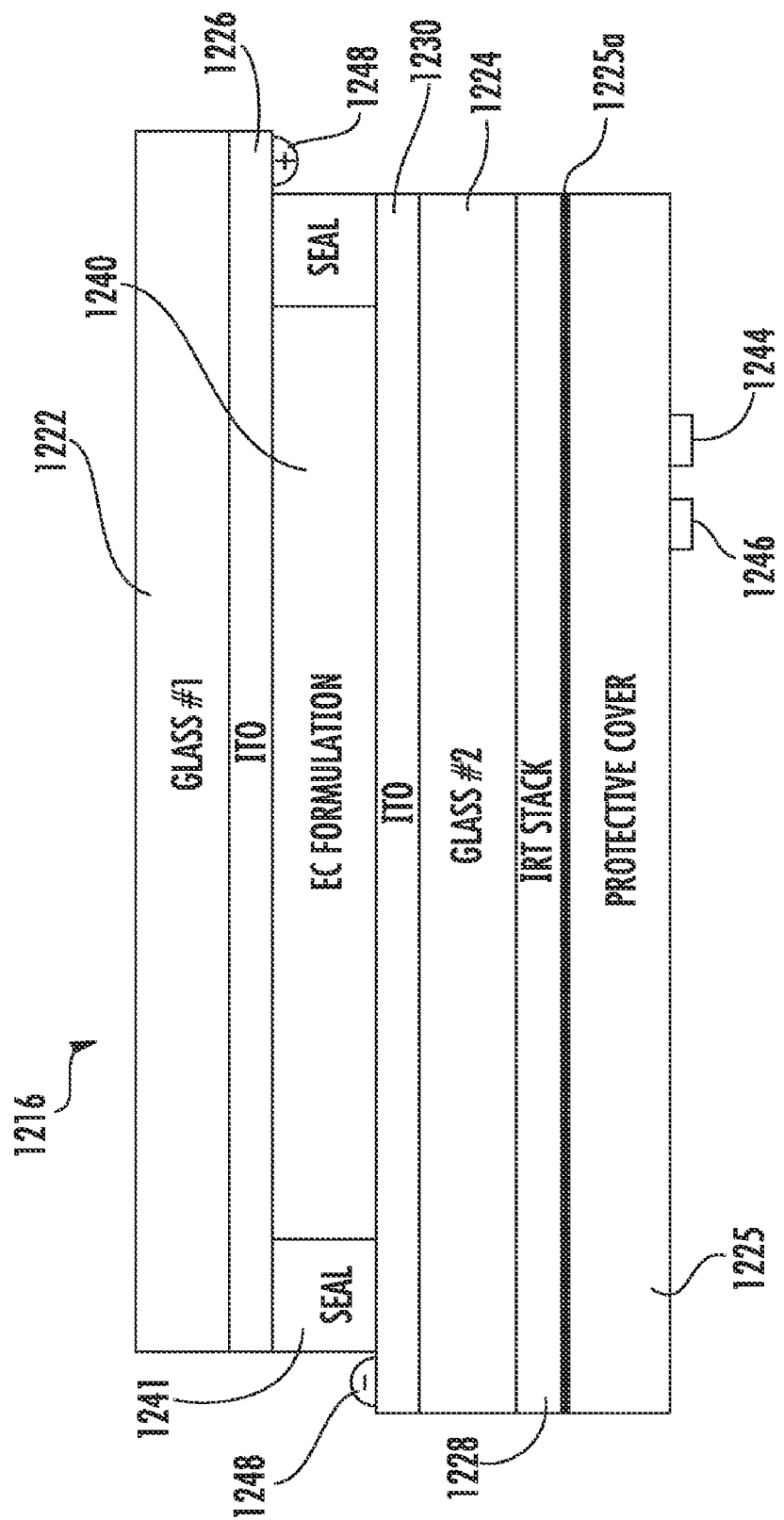
FIG. 19 is a sectional view of another reflective element in accordance with the present invention, which is capable of transmitting near infrared illumination therethrough.

Referring now to FIGS. 19-22, a transflective electrochromic element or cell 1216 includes a front substrate 1222 and a rear substrate 1224, and an illumination source 1244 and an imaging device 1246 at a rear or fourth surface of rear substrate 1224. A semi-conductive layer or coating (such as ITO, tin oxide or the like) 1230 is deposited on the forward or third surface of rear substrate 1224, while a semi-conductive layer 1226 (such as ITO, tin oxide or the like) is deposited on the rear or second surface of front substrate 1222. An electrochromic medium 1240 and seal 1241 are provided or sandwiched between the semi-conductive layers 1226, 1230, with an electrical connector 1248 positioned at least partially along at least one edge of each of the semi-conductive layers 1226, 1230. The transflective cell 1216 further includes an infrared or near infrared transmitting (IRT) stack or layers 1228, which, in the illustrated embodiment of FIG. 19, is positioned or stacked on the rear surface of the rear substrate 1224. A protective cover or glass sheet 1225 is adhered or secured to the rear surface of the IRT stack 1228, such as via an adhesive layer 1225*a*, which preferably is an index matching adhesive that matches the index of the protective cover or sheet. The protective cover may comprise glass, or may comprise other transparent or substantially clear materials, such as plastic, polycarbonate, acrylic or the like, without affecting the scope of the present invention.

IRT stack 1228 comprises multiple layers of dielectric layers or coatings across the rear surface of rear substrate 1224 which function as a cold mirror stack that allows near infrared and infrared light or radiant energy to pass therethrough while substantially reflecting visible light. The IRT stack 1228 may comprise layers of titanium oxide alternating with silicon oxide layers. The titanium oxide layers provide a higher refractive index while the silicon oxide layers provide a lower refractive index. The alternating combination of the lower and higher refracting indices of alternating layers provides enhanced near infrared transmissivity, while providing reflectivity of visible light.

In an exemplary embodiment, IRT stack 1228 comprises nineteen such alternating layers having: a first titanium oxide layer approximately 72 nm thick on the rear surface of substrate 1224, a first silicon oxide layer approximately 32 nm thick on the first titanium oxide layer, a second titanium oxide layer approximately 94 nm thick on the first silicon oxide layer, a second silicon oxide layer approximately 110 nm thick on the second titanium oxide layer, a third titanium oxide layer approximately 64 nm thick on the second silicon oxide layer, a third silicon oxide layer approximately 85 nm thick on the third titanium oxide layer, a fourth titanium oxide layer approximately 62 nm thick on the third silicon oxide layer, a fourth silicon oxide layer approximately 128 nm thick on the fourth titanium oxide layer, a fifth titanium oxide layer approximately 60 nm thick on the fourth silicon oxide layer, a fifth silicon oxide layer approximately 98 nm thick on the fifth titanium oxide layer, a sixth titanium oxide layer approximately 57 nm thick on the fifth silicon oxide layer, a sixth silicon oxide layer approximately 94 nm thick on the sixth titanium oxide layer, a seventh titanium oxide layer approximately 54 nm thick on the sixth silicon oxide layer, a seventh silicon oxide layer approximately 77 nm thick on the seventh titanium oxide layer, an eighth titanium oxide layer approximately 36 nm thick on the seventh silicon oxide layer, an eighth silicon oxide layer approximately 83 nm thick on the eighth titanium oxide layer, a ninth titanium oxide layer approximately 58 nm thick on the eighth silicon oxide layer, a ninth silicon oxide layer approximately 97 nm thick on the ninth titanium oxide layer, and a tenth titanium oxide layer approximately 28 nm thick on the ninth silicon oxide layer. Clearly, other thicknesses and combinations of layers may be implemented to achieve the desired levels of transmissivity and reflectivity, without affecting the scope of the present invention. The transflective element thus provides a fourth surface transflective mirror element, with multiple alternating layers of silicon oxide and titanium oxide to enhance the near infrared transmissivity through the ITO layers and substrates.

Figure 22:
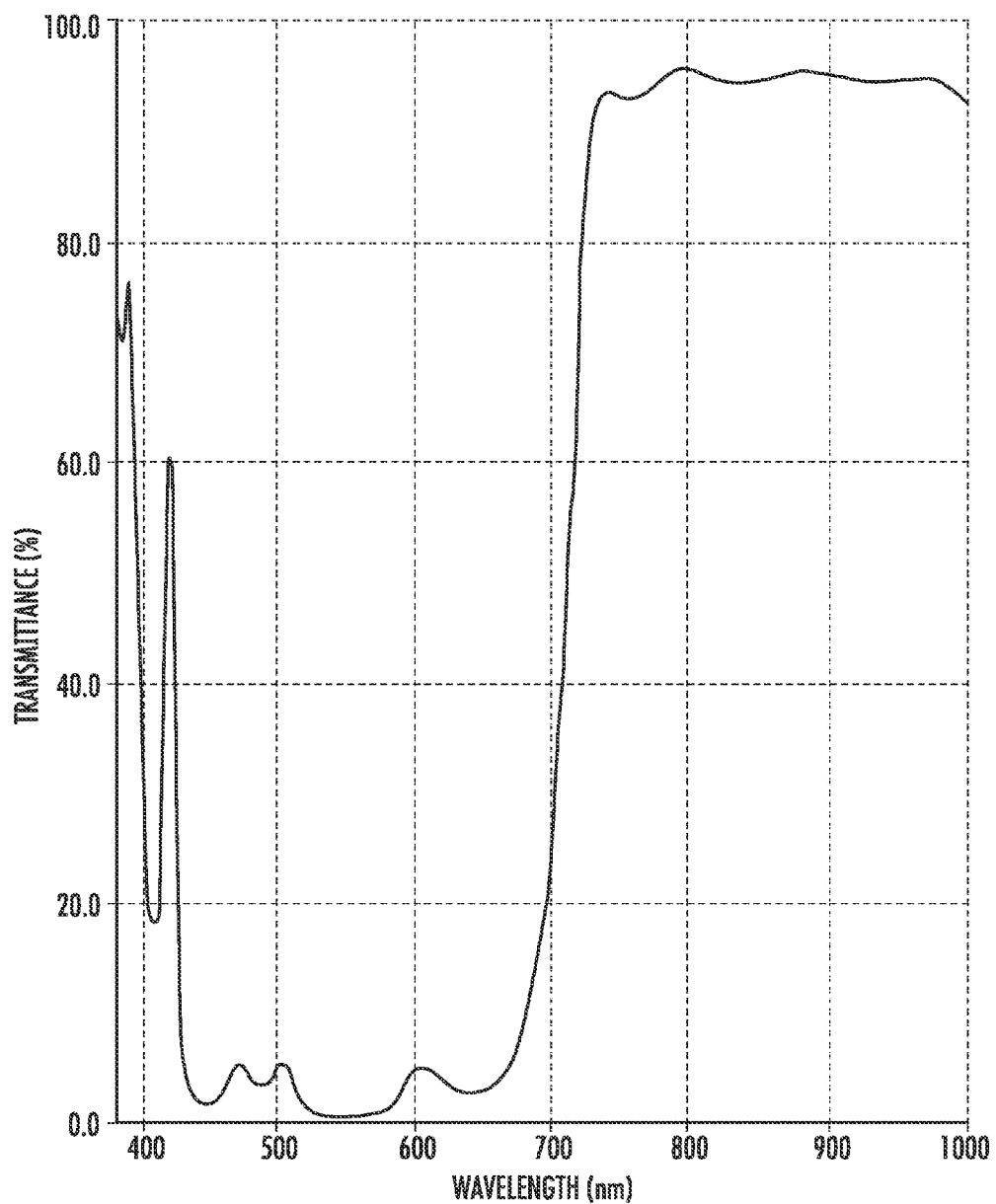
FIG. 22 is a graphical depiction of the transmissivity of light through the cover and rear substrate of the reflective elements of FIGS. 19-21.

The transmissivity percentage of such a substrate versus the light wavelength is shown in FIG. 22. As can be seen in FIG. 22, the substrate 1224 and IRT stack 1228 transmit more than 90% of near infrared light, while substantially not transmitting light in the visible range of the spectrum. The transflective element 1216 is thus spectrally tuned to transmit near infrared light emitted from illumination source 1244, and may transmit the near infrared light from the scene back to the imaging sensor 1246. As can be seen in FIG. 22, the transmission is generally constant or flat for the desired wavelengths at an angle of incidence of the light source relative to the substrate between approximately 0 degrees and approximately 50 degrees.

The arrangement shown in FIG. 19 may allow the mirror manufacturer to purchase the rear substrate sheet or material, which may be purchased from a glass or substrate supplier or vendor with the front ITO layer or coating and the cold mirror stack or IRT stack already applied thereto or deposited thereon. The ITO layers and alternating silicon oxide and titanium oxide layers may be deposited on the respective surfaces or layers via any known manner, such as vacuum deposition or the like, and such as disclosed in U.S. Pat. Nos. 5,668,663; 5,724,187; and 6,002,511, which are hereby incorporated herein by reference. This allows the mirror manufacturer to select an appropriate rear substrate, depending on the desired function or application of the mirror assembly, and to assemble the transflective element with the selected substrate. The mirror manufacturer may purchase the substrates, cut out the desired shape for the mirror reflective element and glue or adhere or otherwise join the substrates (with coatings thereon) together (and sandwich the electrochromic medium between the front and rear substrate) to form the desired transflective element.

Prior to deposition, it is desirable/beneficial to clean the substrate using a plasma source or an ion source, such as a linear ion source or the like, which may result in enhanced adhesion of the thin films to the substrate. It is preferable that the substrate cleaning is accomplished in one single pump down cycle of the vacuum coating process. For example, glass substrates can enter a vacuum chamber via a load-lock, and pass under a plasma source, such as a linear ion source or the like, where the surface-to-be-coated is activated/cleaned by exposure to a plasma and/or by ion bombardment or the like. The now plasma activated/ion-bombardment cleaned surface is then coated with an ITO layer, followed by a metallic layer (such as silver), followed by an ITO layer such as described herein. Optionally, and preferably, a three-sided target assembly is used, for example, one side may be a linear ion source, another side may be an ITO target, and the third side may be a silver target. The three-sided target assembly can, for example, rotate (such as clockwise) to first ion clean the substrate, then rotate clockwise again to deposit ITO, then rotate clockwise again to deposit silver, and then rotate counterclockwise to deposit ITO again. Suitable ion sources for such a cleaning purpose include Anode Layer Sources (ALS), Kaufmann sources, gridded sources, non-gridded sources, RF sources and DC glow discharge sources and the like. The most preferred are the linear ion sources of the ALS type, such as are available from Veeco Instruments, Inc. of Colorado and Advanced Energy (AE) of Colorado.

Optionally, and desirably, the substrates 1222, 1224 may have a low absorption characteristic in the near infrared range or band of the energy spectrum, whereby the substrates provide low absorption of near infrared radiant energy, such as at wavelengths of around 880 nm or thereabouts. The substrates thus may provide enhanced transmissivity of such near infrared radiant energy through the transflective electrochromic element or cell. Such low absorption characteristics may be accomplished by selecting a material for the substrates that provides the desired results. For example, the substrates may comprise a borosilicate material, such as the type that is commercially available from Schott Glass Corp. under the name BOROFLOAT™, or may comprise a B270 material or SUPERWHITE™, also commercially available from Schott Glass Corp., or may comprise other materials, such as fused silica or quartz materials or the like, that may also or otherwise provide the desired degree of low absorption of near infrared radiant energy. Other materials may be selected for the substrates of the transflective electrochromic cell, without affecting the scope of the present invention.

Figure 20:
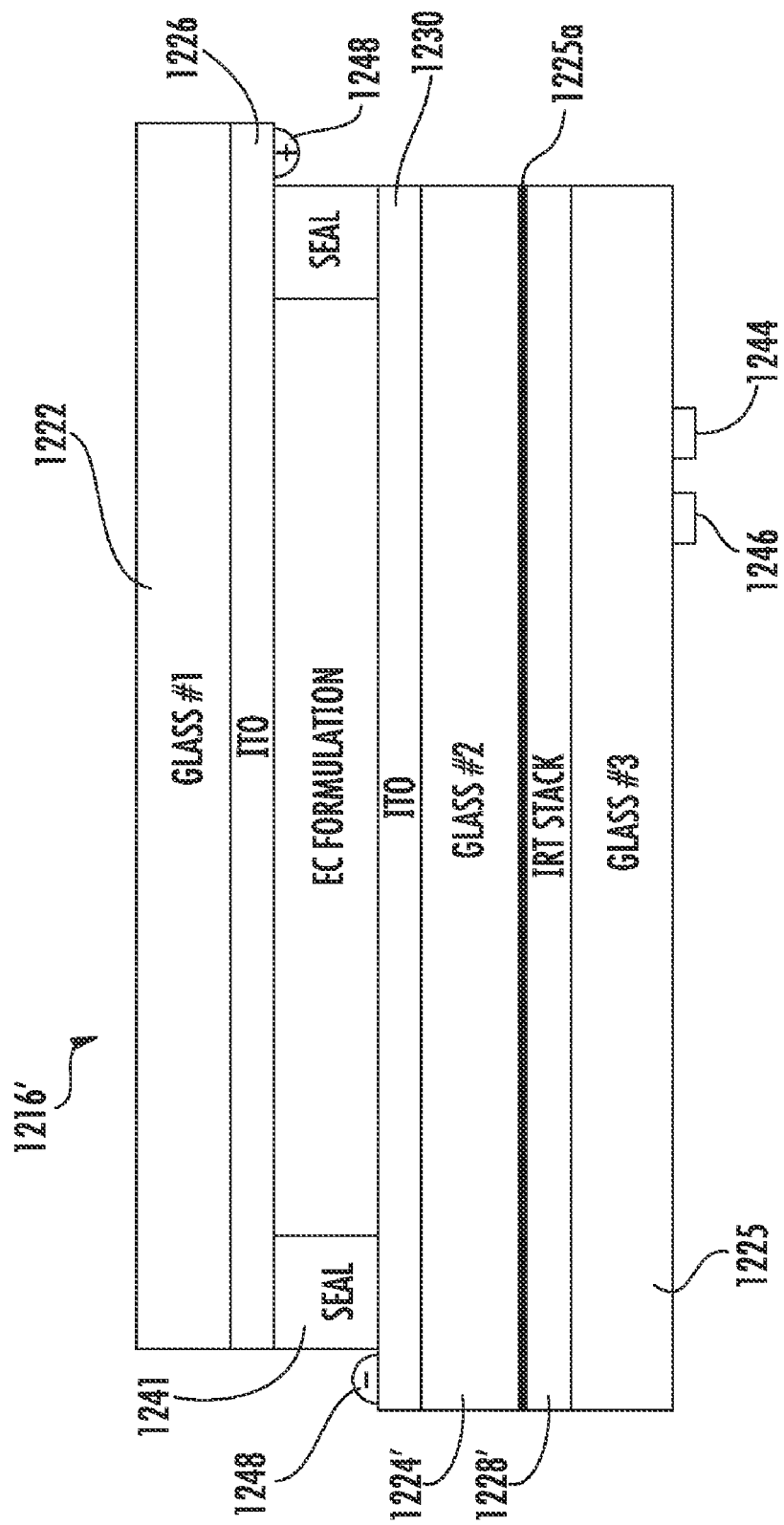
FIG. 20 is a sectional view of another reflective element in accordance with the present invention.

Optionally, and with reference to FIG. 20, a transflective element 1216' may provide the IRT stack 1228' on a front surface of the protective cover or glass substrate or sheet 1225. In such an embodiment, the IRT stack 1228' and cover 1225 are adhered or secured to the rear surface of rear substrate 1224' via the index matching adhesive 1225a or the like. The arrangement shown in FIG. 20 allows the IRT stack to be manufactured on a separate glass sheet or protective cover, whereby the mirror manufacturer may purchase the front and rear substrates or sheets (with the ITO layers already applied thereto or deposited thereon) and the third glass sheet or protective cover with the IRT stack already deposited thereon. The protective cover may comprise glass, or may comprise other transparent or substantially clear materials, such as plastic, polycarbonate, acrylic or the like, without affecting the scope of the present invention. The IRT stack and other components of transflective element 1216' may be substantially similar to the IRT stack and components of transflective element 1216 discussed above, such that a detailed discussion of these elements will not be repeated herein.

Figure 21:
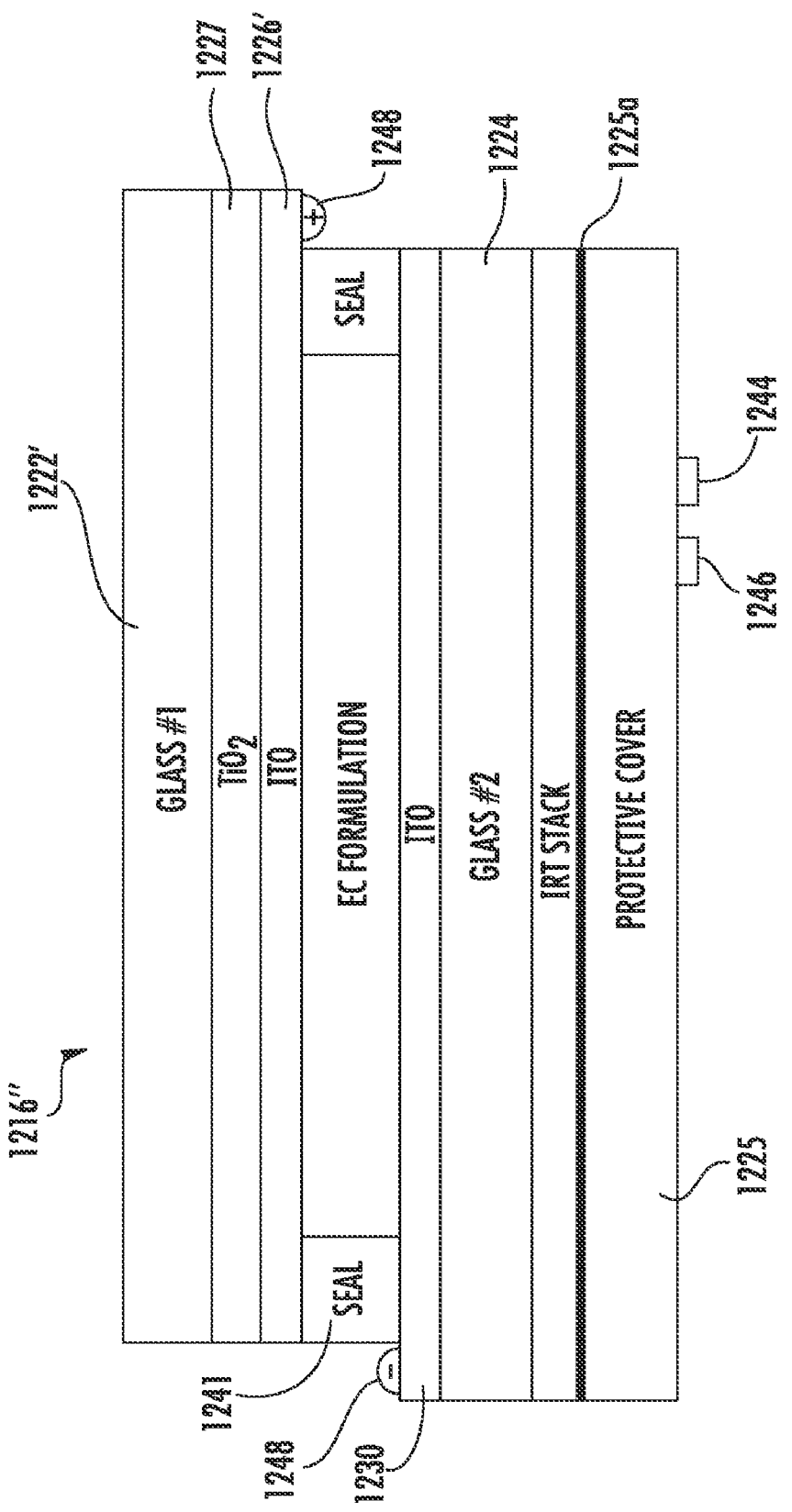
FIG. 21 is a sectional view of another reflective element in accordance with the present invention.

Optionally, and with reference to FIG. 21; a transflective element 1216" may be substantially similar to transflective element 1216 of FIG. 19, discussed above, and may include a titanium oxide layer or coating 1227 on the rear surface of the front substrate 1222' and between the front substrate 1222' and the ITO layer or coating 1226'. The titanium oxide layer 1227 may function to partially cancel out or compensate for any near infrared reflectivity by the ITO layers of the cell or element to further enhance the performance of the transflective element.

Figure 23:
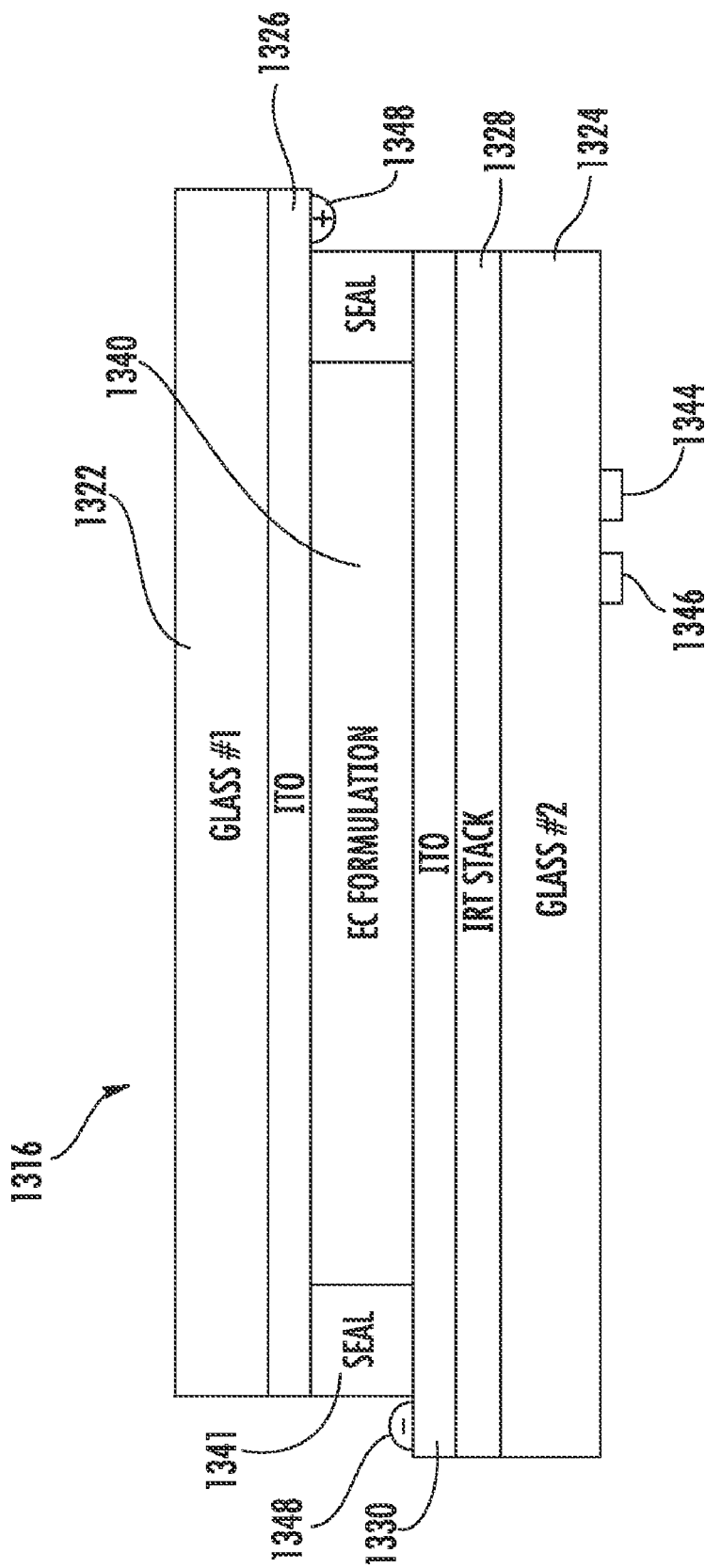
FIG. 23 is a sectional view of another reflective element in accordance with the present invention, which is capable of transmitting near infrared illumination therethrough.

Referring now to FIG. 23, a transflective electrochromic element or cell 1316 includes a front substrate 1322 and a rear substrate 1324, and an illumination source 1344 and an imaging device 1346 at a rear or fourth surface of rear substrate 1324. A semi-conductive layer or coating 1326 (such as ITO, tin oxide or the like) is deposited on the rear or second surface of front substrate 1322. An IRT stack 1328 is applied to or deposited on the front surface of rear substrate 1324, and a semi-conductive layer or coating 1330 (such as ITO, tin oxide or the like) is deposited on IRT stack 1328. An electrochromic medium 1340 and seal 1341 are provided or sandwiched between the semi-conductive layers 1326, 1330, with an electrical connector 1348 positioned at least partially along at least one edge of each of the semi-conductive layers 1326, 1330.

Similar to IRT stack 1228 discussed above, IRT stack 1328 comprises multiple layers of dielectric layers or coatings. IRT stack or cold mirror stack 1328 is deposited on the front surface of rear substrate 1324 and may comprise alternating layers of titanium oxide alternating with silicon oxide layers. The titanium oxide layers provide a higher refractive index while the silicon oxides provide a lower refractive index. The combination of the lower and higher refractive indices of the alternating layers provides enhanced near infrared transmissivity, while providing reflectivity of visible light.

In an exemplary embodiment, IRT stack 1328 comprises nineteen such alternating layers with a twentieth layer of ITO deposited on the outermost IRT stack layer. For example, the IRT stack may comprise a first titanium oxide layer approximately 53 nm thick on the rear surface of substrate 1324, a first silicon oxide layer approximately 57 nm thick on the first titanium oxide layer, a second titanium oxide layer approximately 84 nm thick on the first silicon oxide layer, a second silicon oxide layer approximately 103 nm thick on the second titanium oxide layer, a third titanium oxide layer approximately 58 nm thick on the second silicon oxide layer, a third silicon oxide layer approximately 96 nm thick on the third titanium oxide layer, a fourth titanium oxide layer approximately 64 nm thick on the third silicon oxide layer, a fourth silicon oxide layer approximately 108 nm thick on the fourth titanium oxide layer, a fifth titanium oxide layer approximately 63 nm thick on the fourth silicon oxide layer, a fifth silicon oxide layer approximately 93 nm thick on the fifth titanium oxide layer, a sixth titanium oxide layer approximately 44 nm thick on the fifth silicon oxide layer, a sixth silicon oxide layer approximately 70 nm thick on the sixth titanium oxide layer, a seventh titanium oxide layer approximately 37 nm thick on the sixth silicon oxide layer, a seventh silicon oxide layer approximately 61 nm thick on the seventh titanium oxide layer, an eighth titanium oxide layer approximately 58 nm thick on the seventh silicon oxide layer, an eighth silicon oxide layer approximately 102 nm thick on the eighth titanium oxide layer, a ninth titanium oxide layer approximately 31 nm thick on the eighth silicon oxide layer, a ninth silicon oxide layer approximately 55 nm thick on the ninth titanium oxide layer, and a tenth titanium oxide layer approximately 49 nm thick on the ninth silicon oxide layer. The semi-conductive layer 1330 may comprise an ITO layer approximately 130 nm thick. Clearly, other thicknesses and combinations of layers may be implemented to achieve the desired levels of transmissivity and reflectivity, without affecting the scope of the present invention. The transflective element thus provides a third surface transflective mirror element, with multiple layers of silicon oxide and titanium oxide to enhance the near infrared transmissivity through the ITO layers and substrates.

Figure 26:
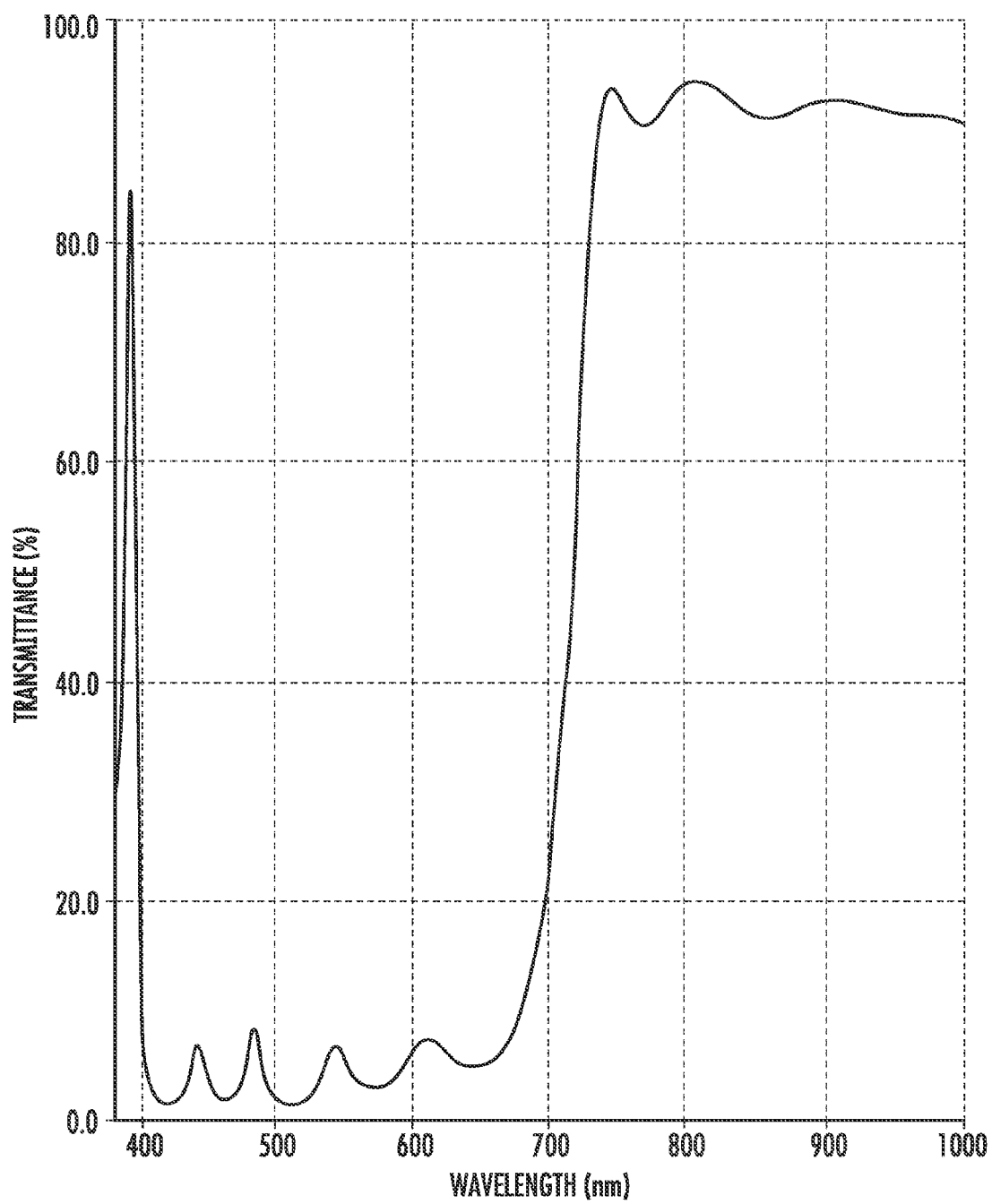
FIG. 26 is a graphical depiction of the transmissivity of light through the rear substrate and IRT stack of the reflective elements of FIGS. 23-25.

The transmissivity percentage of such a substrate versus the light wavelength is shown in FIG. 26. As can be seen in FIG. 26, such a rear substrate transmits more than approximately 90% of near infrared light, while substantially not transmitting light in the visible range of the spectrum. The transflective element 1316 is thus spectrally tuned to transmit near infrared light emitted from illumination source 1344, and may transmit the near infrared light from the scene back to the imaging sensor 1346. As can be seen in FIG. 26, the transmission is generally constant or flat for the desired wavelengths at an angle of incidence of the light source relative to the substrate between approximately 0 degrees and approximately 50 degrees.

The arrangement shown in FIG. 23 may allow the mirror manufacturer to purchase the rear substrate sheet or material, which may be purchased from a glass or substrate supplier or vendor with the IRT or cold mirror stack and the front ITO layer or coating already applied thereto or deposited thereon. The ITO layers and silicon oxide and titanium oxide layers may be deposited on the front surface or other layers via any known manner, such as vacuum deposition or the like, and such as disclosed in U.S. Pat. Nos. 5,668,663; 5,724,187; and 6,002,511, which are hereby incorporated herein by reference. This allows the mirror manufacturer to select an appropriate rear substrate, depending on the desired function or application of the mirror assembly, and to assemble the transflective element with the selected substrate. The mirror manufacturer may purchase the substrates, cut out the desired shape for the mirror reflective element and glue, adhere or otherwise join the substrates (with coatings thereon) together (and sandwich the electrochromic medium between the front and rear substrate) to form the desired transflective element.

Figure 24:
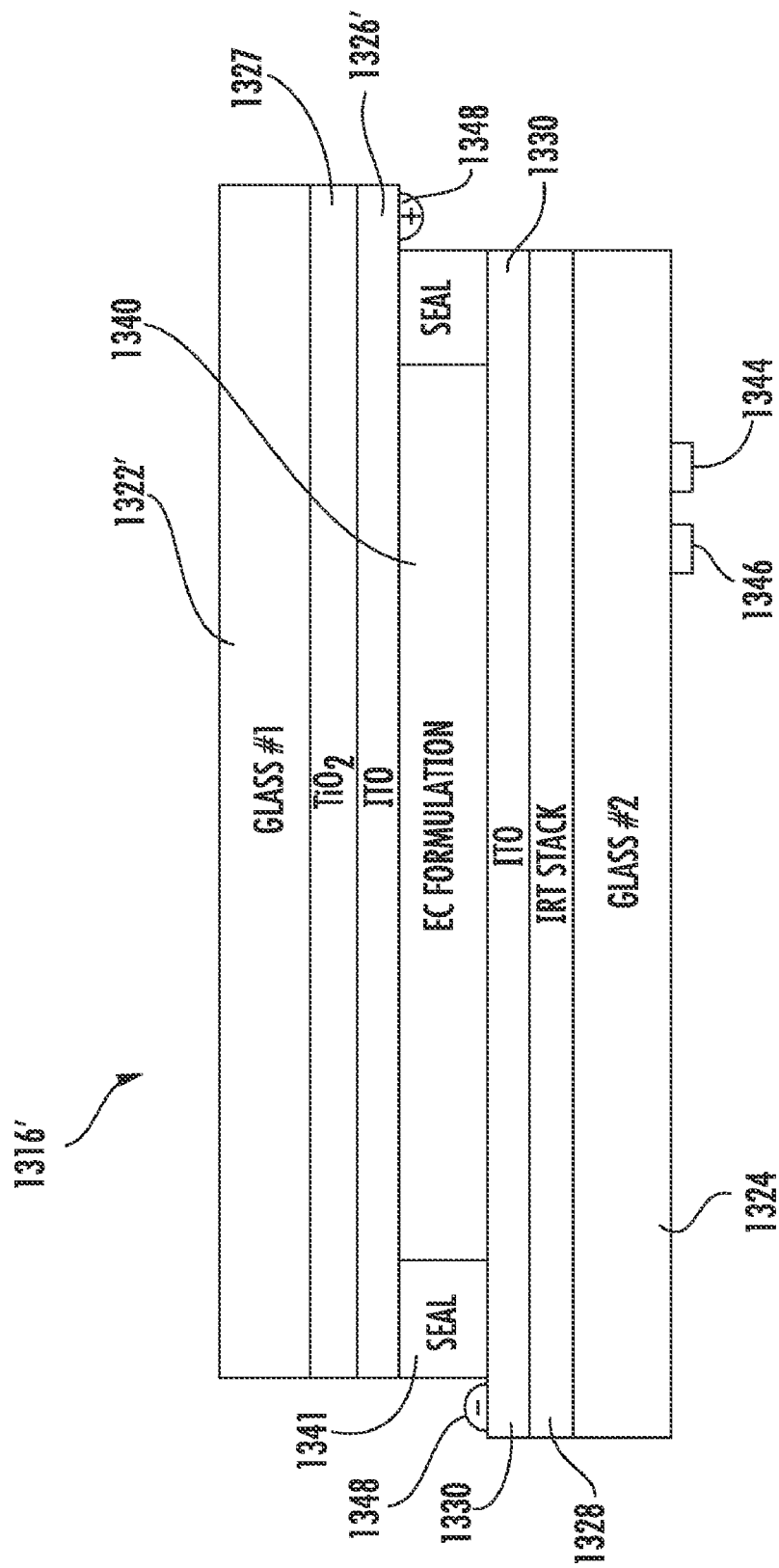
FIG. 24 is a sectional view of another reflective element in accordance with the present invention.
Figure 27:
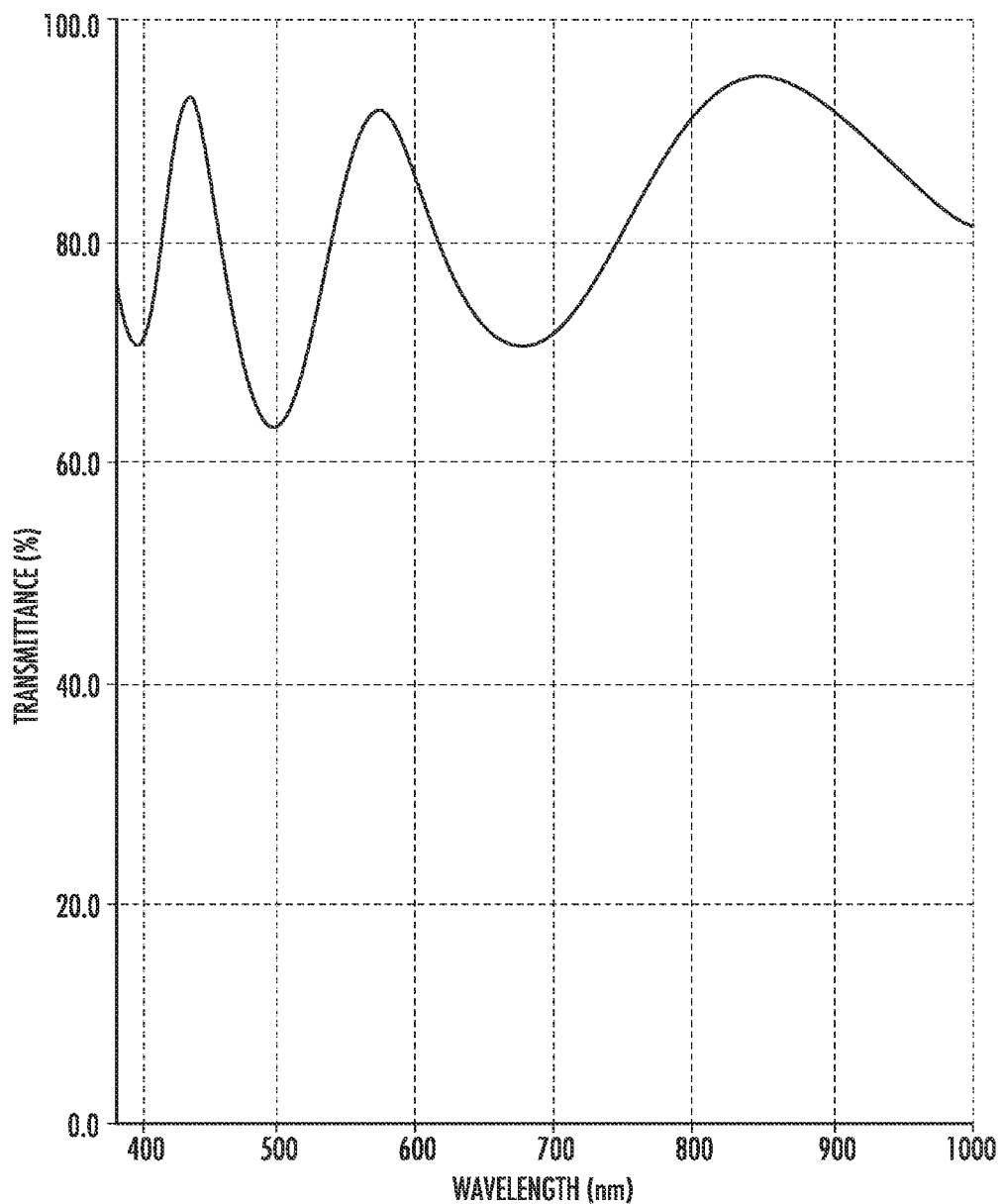
FIG. 27 is a graphical depiction of the transmissivity of light through the front substrate and enhanced semi-conductive layers of the reflective element of FIG. 24.

Optionally, and with reference to FIG. 24, a transflective element 1316' in accordance with the present invention may be substantially similar to transflective element 1316 discussed above, and may include a titanium oxide layer or coating 1327 on the rear surface of the front substrate 1322' and between the front substrate 1322' and the ITO layer or coating 1326'. In an exemplary embodiment, the titanium oxide layer 1327 may be approximately 250 nm thick, while the ITO layer 1326' may be approximately 130 nm thick, but other thicknesses may be implemented to achieve the desired result, without affecting the scope of the present invention. The titanium oxide layer 1327 may function to partially cancel out or compensate for any near infrared reflectivity by the ITO layers of the cell or element. This arrangement provides an enhanced semi-conductive layer or coating on the rear surface of the front substrate. A graphical depiction of the transmissivity of front substrate 1322' versus wavelength of light is shown in FIG. 27. In the illustrated embodiment, the peak transmissivity wavelength is approximately 880 nm. Such a reflective element or cell thus may be particularly suited for use with an imaging device or camera that has a peak sensitivity or response to light having a wavelength of approximately 880 nm.

Figure 25:
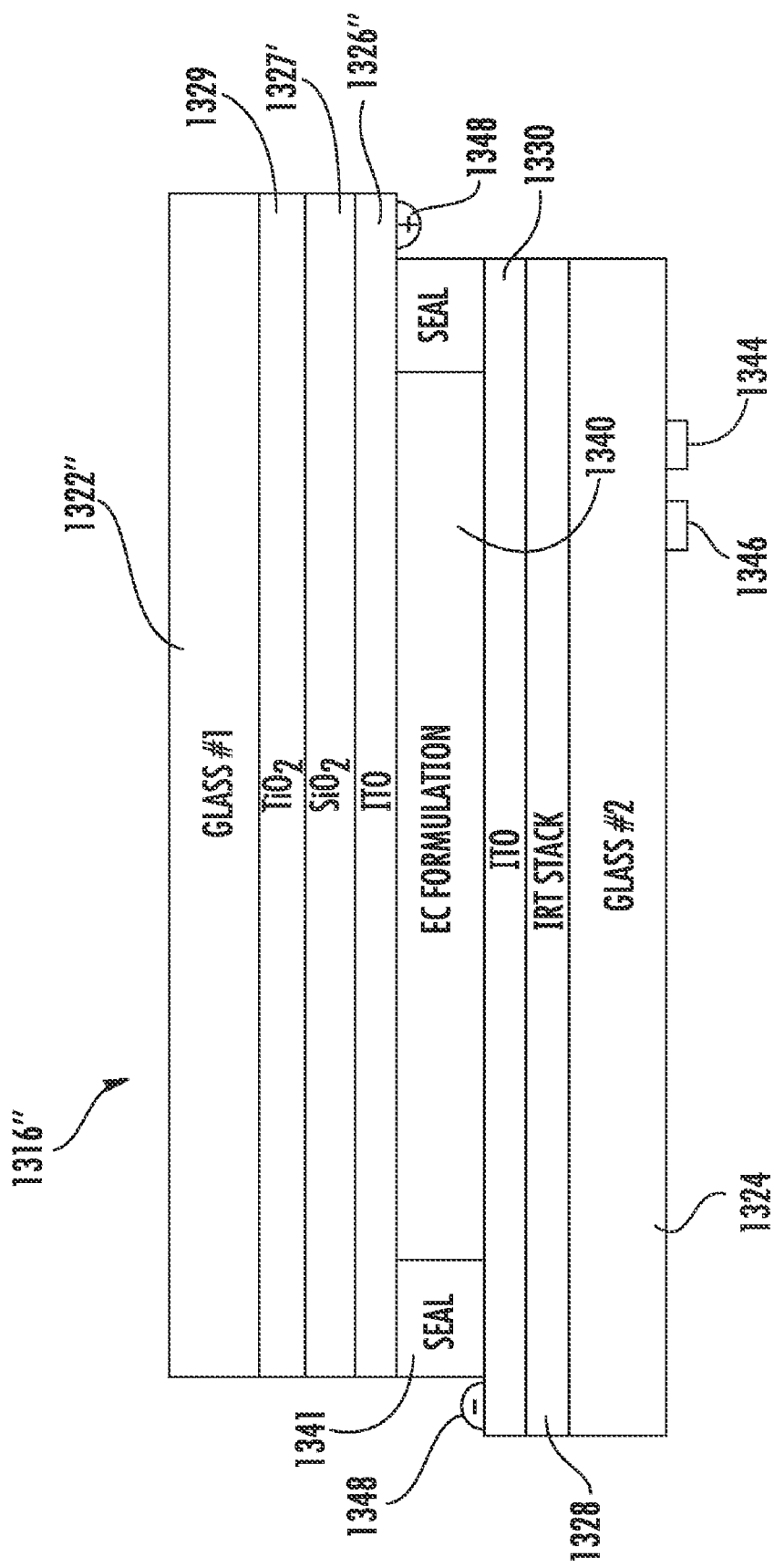
FIG. 25 is a sectional view of another reflective element in accordance with the present invention.
Figure 28:
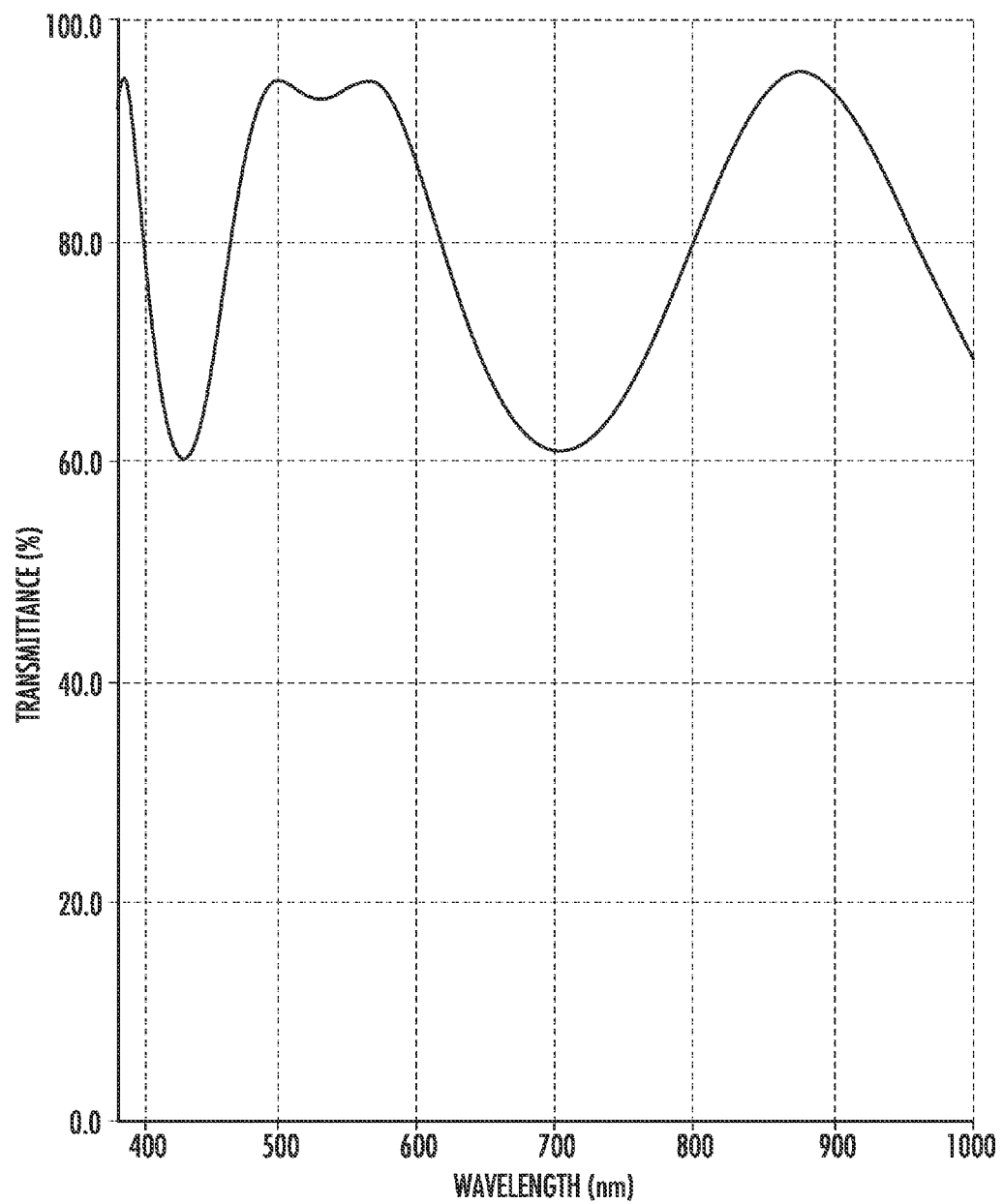
FIG. 28 is a graphical depiction of the transmissivity of light through the front substrate and enhanced semi-conductive layers of the reflective element of FIG. 25.

Optionally, and with reference to FIG. 25, another transflective element 1316" in accordance with the present invention may be substantially similar to transflective element 1316 of FIG. 23, discussed above, and may include an enhanced semi-conductive layer on the rear surface of the front substrate 1322". The enhanced semi-conductive layer includes a titanium oxide layer or coating 1329 deposited on the rear surface of the front substrate 1322", a silicon oxide layer 1327' deposited on titanium oxide layer 1329, and an ITO layer 1326" deposited on silicon oxide layer 1327'. In an exemplary embodiment, the titanium oxide layer 1329 may be approximately 109 nm thick, while the silicon oxide layer 1327' may be approximately 277 nm thick and the ITO layer 1326' may be approximately 130 nm thick. Other thicknesses may be implemented to achieve the desired result, without affecting the scope of the present invention. The titanium oxide layer 1329 and silicon oxide layer 1227' may function to partially cancel out or compensate for any near infrared reflectivity by the ITO layers of the cell or element to enhance the near infrared transmissivity of the front substrate and semi-conductive layers. A graphical depiction of the transmissivity of front substrate 1322" versus wavelengths of light is shown in FIG. 28. In the illustrated embodiment, the peak transmissivity wavelength is approximately 880 nm. Such a reflective element or cell thus may be particularly suited for use with an imaging device or camera that has a peak sensitivity or response to light having a wavelength of approximately 880 nm.

Figure 29:
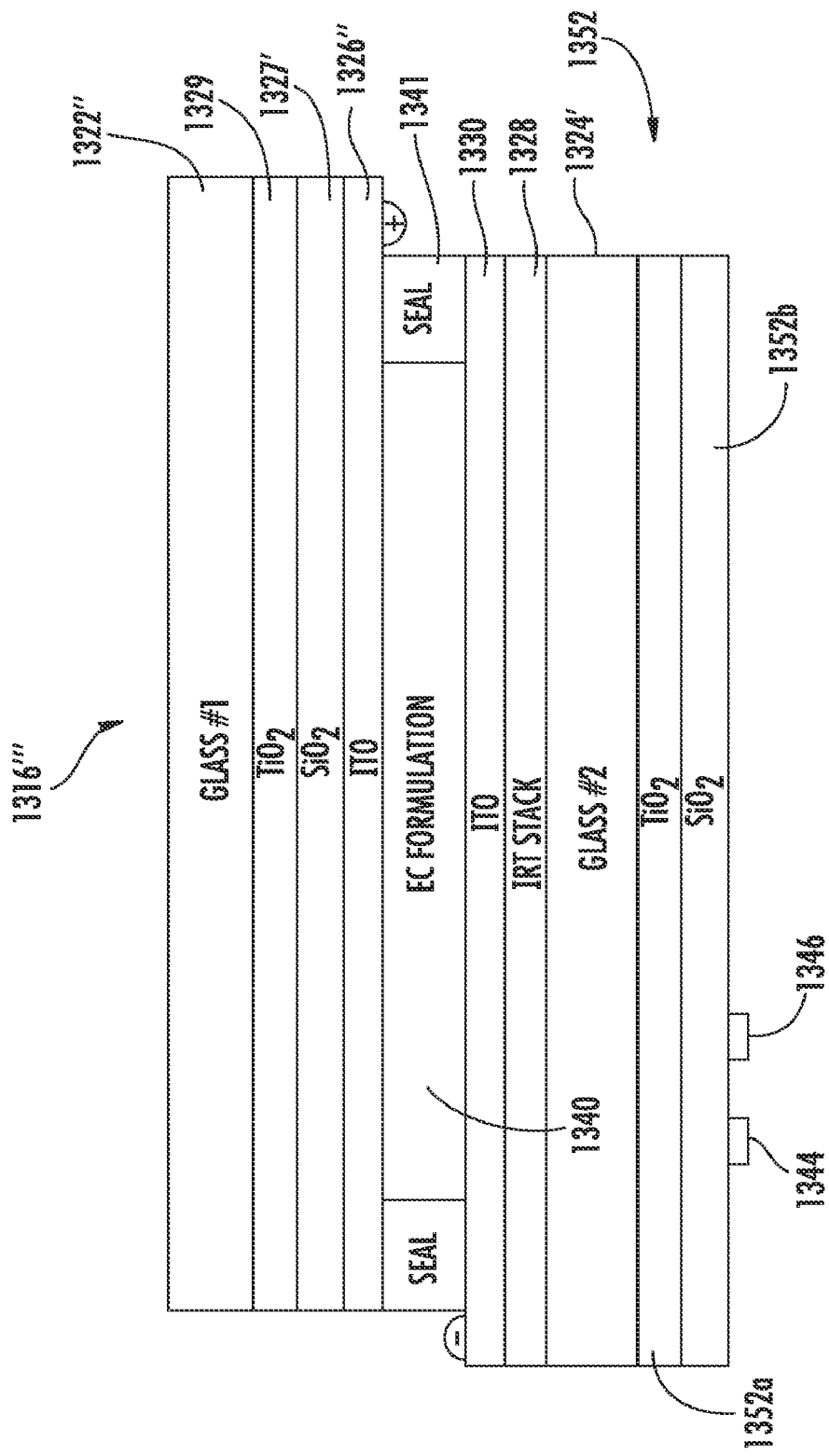
FIG. 29 is a sectional view of a reflective element similar to the reflective element of FIG. 25, with an anti-reflective stack or layers on a rear surface of the rear substrate in accordance with the present invention.

Optionally, and as shown in FIG. 29, a transflective element 1316' may include the substrates 1322", 1324' and coatings or layers such as described above with respect to transflective element 1316" (FIG. 25), and may further include an anti-reflective (AR) stack or layers 1352 at the rear surface of the rear substrate 1324'. The anti-reflective stack or layers 1352 may be selected to minimize the reflectance of light at a desired or targeted wavelength or range of wavelengths or spectral band to enhance the overall transmissivity at the desired or targeted spectral band. For example, the anti-reflective stack 1352 may be selected to minimize the reflectance of near infrared radiant energy, such as radiant energy having a wavelength of approximately 880 nm or thereabouts, such that the transmission of such radiant energy may be enhanced. In an exemplary embodiment, anti-reflective stack or layers 1352 comprises a layer of titanium oxide 1352a deposited on or disposed at the rear surface of the rear substrate 1324 and a layer of silicon oxide 1352b deposited on or disposed at the titanium oxide layer 1352a. In one embodiment, titanium oxide layer 1352a may have a thickness of approximately 25 nm, while silicon oxide layer 1352b may have a thickness of approximately 205 nm, such that the anti-reflective stack or layers 1352 reduces the reflectance of near infrared radiant energy having a wavelength of approximately 880 nm or thereabouts. Other layers or thicknesses may be selected to achieve other desired results, and may be selected depending on the particular reflective element design and the particular application of the reflective element, without affecting the scope of the present invention. Such anti-reflective surfaces may be applied to or disposed on the rearward surface of other mirror elements of the present invention described herein.

Therefore, the present invention provides a transflective electrochromic element or cell which may allow transmittance of near infrared light through the substrates while providing a desired amount of untinted photopic reflectance, and while also providing the desired degree of conductivity at the conductive or semi-conductive layers. The transflective element may include multiple dielectric layers or coatings on one of the substrates or on a rear cover or glass sheet of the transflective element. The dielectric layers cooperate to enhance transmissivity of infrared or near infrared light through the substrates, while providing the desired level of untinted photopic reflectance. The transflective element thus may allow the mirror assembly to include a near infrared light emitting diode or other near infrared emitting light source to be positioned behind the transflective element and within the mirror casing, whereby the light source may emit or project near infrared light through the transflective element toward and into the cabin of the vehicle. The mirror assembly may also include an imaging device which may be positioned behind the transflective element and may receive or capture images of the interior cabin of the vehicle which is covered by the near infrared light of the light source.

Figure 30:
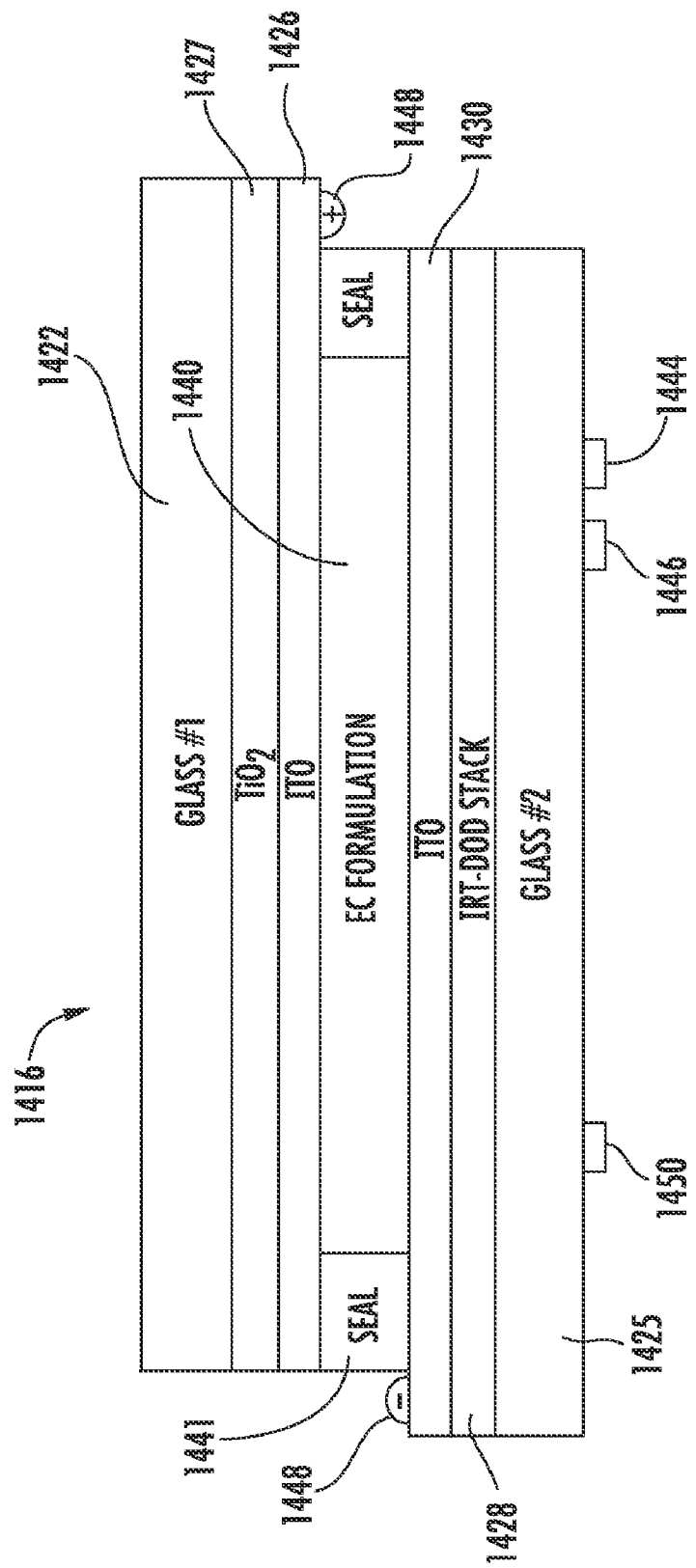
FIG. 30 is a sectional view of another reflective element in accordance with the present invention.

Optionally, and with reference to FIG. 30, it is envisioned that a transflective element 1416 in accordance with the present invention may provide high transmissivity of near infrared radiant energy, while also providing high transmissivity of a particular wavelength or range of wavelengths or spectral band or region of visible light, yet still providing high photopic reflectance of the other visible light and sufficient conductivity. Transflective element 1416 may be substantially similar to the transflective elements 1316, 1316', 1316", discussed above, but may include an infrared transmitting and display on demand stack 1428 (IRT-DOD stack) of alternating titanium oxide layers (or the like) and silicon oxide layers (or the like) that may provide for high transmissivity of near infrared radiant energy and high transmissivity of a desired visible light color, such as, for example, visible light having a wavelength of approximately 430 nm (blue). Different combinations of alternating layers may be selected to provide sufficient transmissivity of near infrared radiant energy and of other desired spectral bands, without affecting the scope of the present invention.

The titanium oxide layers provide a higher refractive index while the silicon oxides provide a lower refractive index. The combination of the lower and higher refractive indices of the alternating layers provides enhanced near infrared transmissivity, while providing high photopic reflectivity of most of the visible light, except the visible light in the desired spectral region or having the desired or selected or targeted wavelength. The transflective element thus may be used with a near infrared light emitting source 1444, which may be used in conjunction with an imaging source or camera 1446, and a display on demand element 1450 that may emit light at the desired or selected wavelength or color (such as, for example, blue light having a wavelength of 430 nm) so that it is viewable through the reflective element by a driver or occupant of the vehicle.

The other elements of the transflective element 1416 may be substantially similar to the transflective elements 1316, 1316', 1316'', discussed above, such that a detailed discussion of these elements will not be repeated herein. The similar or common elements are shown in FIG. 30 with similar reference numbers to those of FIG. 24, but with one hundred added to each number. In the illustrated embodiment of FIG. 29, the transflective element 1416 is shown with a titanium oxide (TiO$_2$) layer or coating 1427 on the rear surface of the front substrate 1422 and between the front substrate 1422 and the ITO layer or coating 1426, similar to transflective element 1316' of FIG. 24. However, other coatings or layers may be deposited on or applied to the front substrate of the transflective element, such as, for example, the other layers discussed above, without affecting the scope of the present invention.

In an exemplary embodiment of the infrared transmitting and visible light transmitting transflective element 1416, the IRT-DOD stack 1428 comprises nineteen such alternating layers with a twentieth layer of ITO 1430 deposited on the outermost IRT-DOD stack or layers. For example, the IRT-DOD stack may comprise a first titanium oxide layer approximately 50 nm thick on the surface of the substrate, a first silicon oxide layer approximately 83 nm thick on the first titanium oxide layer, a second titanium oxide layer approximately 48 nm thick on the first silicon oxide layer, a second silicon oxide layer approximately 159 nm thick on the second titanium oxide layer, a third titanium oxide layer approximately 50 nm thick on the second silicon oxide layer, a third silicon oxide layer approximately 97 nm thick on the third titanium oxide layer, a fourth titanium oxide layer approximately 61 nm thick on the third silicon oxide layer, a fourth silicon oxide layer approximately 104 nm thick on the fourth titanium oxide layer, a fifth titanium oxide layer approximately 59 nm thick on the fourth silicon oxide layer, a fifth silicon oxide layer approximately 84 nm thick on the fifth titanium oxide layer, a sixth titanium oxide layer approximately 35 nm thick on the fifth silicon oxide layer, a sixth silicon oxide layer approximately 65 nm thick on the sixth titanium oxide layer, a seventh titanium oxide layer approximately 46 nm thick on the sixth silicon oxide layer, a seventh silicon oxide layer approximately 76 nm thick on the seventh titanium oxide layer, an eighth titanium oxide layer approximately 48 nm thick on the seventh silicon oxide layer, an eighth silicon oxide layer approximately 175 nm thick on the eighth titanium oxide layer, a ninth titanium oxide layer approximately 19 nm thick on the eighth silicon oxide layer, a ninth silicon oxide layer approximately 61 nm thick on the ninth titanium oxide layer, and a tenth titanium oxide layer approximately 37 nm thick on the ninth silicon oxide layer. The semi-conductive layer 1430 may comprise an ITO layer or the like of approximately 130 nm thick. Clearly, other thicknesses and combinations of layers may be implemented to achieve the desired levels of transmissivity and reflectivity, such as high transmissivity of other colors or spectral regions of the spectrum, without affecting the scope of the present invention. The transflective element thus provides a third surface transflective mirror element, with multiple layers of silicon oxide and titanium oxide to enhance the near infrared transmissivity and particular visible light wavelength or wavelengths through the ITO layers and substrates.

Figure 31:
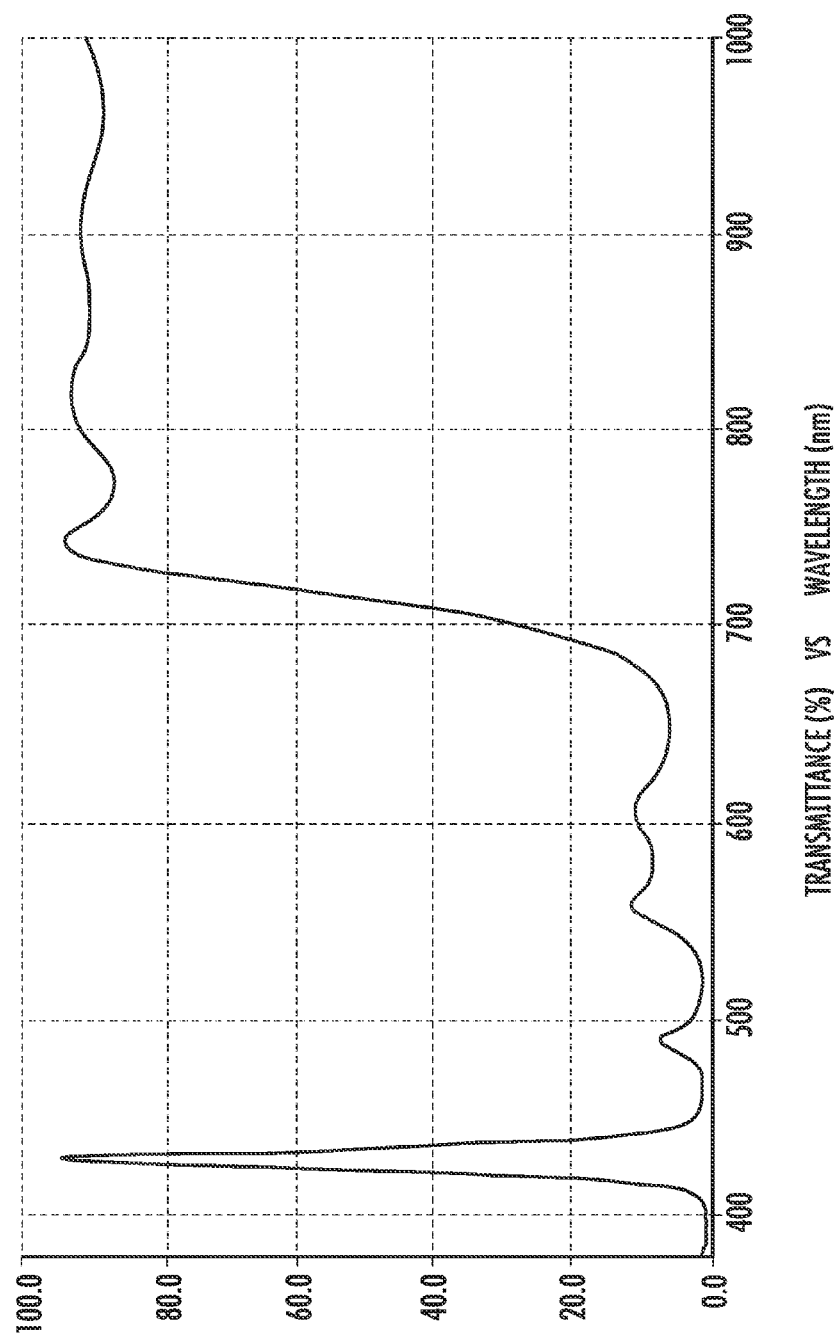
FIG. 31 is a graphical depiction of the transmissivity of light through the rear substrate and IRT-DOD stack of the reflective element of FIG. 30.

The transmissivity percentage of such a substrate versus the light wavelength is shown in FIG. 31. As can be seen in FIG. 31, such a substrate transmits more than approximately 90% of near infrared light, while substantially reflecting or not transmitting light in the visible range of the spectrum, except for light having a wavelength of approximately 430 nm, which is also highly transmitted (such as at greater than approximately 90% transmissivity) by the substrate and alternating layers of the IRT-DOD stack. The transflective element is thus spectrally tuned to transmit near infrared light that may be emitted from an illumination source 1444, and may transmit the near infrared light from the scene back to an imaging sensor 1446. The transflective element may also transmit light having a desired or targeted wavelength to allow for a colored display element or illumination source or indicator 1450 to be viewed through the transflective element.

Although shown and described as being implemented on a third surface of an electrochromic mirror element, it is envisioned that the layers or stacks of the present invention may be implemented at a fourth surface of the electrochromic reflective element, such as for a fourth surface reflective element, without affecting the scope of the present invention. In such an application, a radiant energy emitting device or element and/or an imaging sensor may be positioned rearward of the stack or layers for emitting or receiving radiant energy through the reflective element. Also, a protective layer or cover may be provided over the rearwardmost layer of the alternating layers and over or around the display element or sensor to protect the layers at the rear of the reflective element.

Figure 32:
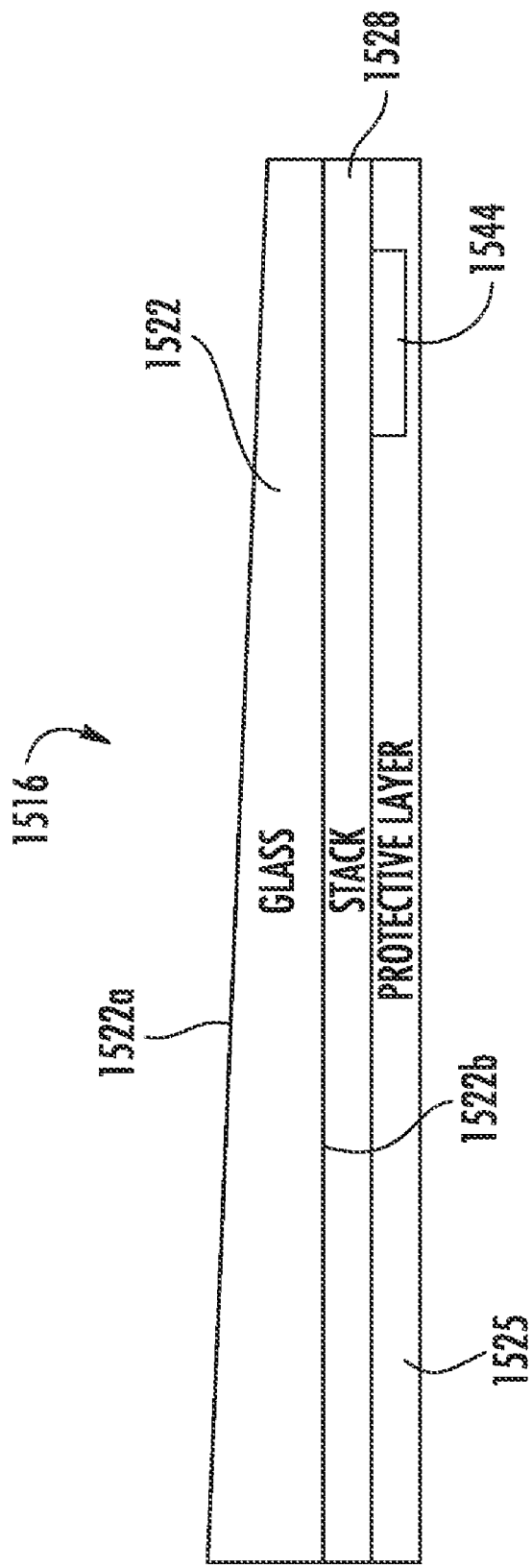
FIG. 32 is a sectional view of a prismatic reflective element in accordance with the present invention.

Also, although shown and described as being implemented in an electrochromic reflective element or cell, the alternating layers or stacks of the present invention may be implemented at a rear surface (second surface) of a prismatic reflective element, without affecting the scope of the present invention. For example, and with reference to FIG. 32, a prismatic reflective element 1516 may comprise a prismatic or wedge-shaped substrate 1522 having a forward or outwardly facing surface 1522a and a rearward surface 1522b opposite the forward surface 1522a. Prismatic reflective element 1522 includes alternating layers or a stack 1528 disposed at rear surface 1522b of prismatic substrate 1522. As shown in FIG. 32, a protective layer or coating 1525 may be applied over the stack 1528. The layers of stack 1528 may comprise alternating layers of metallic and non-metallic layers or coatings, such as layers or stacks similar to the ISI stacks or DOD stacks or IRT stacks or IRT-DOD stacks of the present invention, as discussed above, depending on the particular application of the prismatic reflective element. The particular materials and thicknesses of the layers may be selected to provide the desired transmissivity of a particular selected spectral band or bands of radiant energy through the prismatic reflective element, while providing sufficient reflectivity of other spectral bands of radiant energy.

Prismatic reflective element 1516 may include a display element or radiant energy emitting device or illumination source 1544 positioned at a rear surface of the rearward most layer of stack 1528 and operable to emit radiant energy, such as visible light, near infrared radiant energy or infrared radiant energy through stack 1528 and prismatic substrate 1522. The thicknesses and materials of the layers of stack 1528 may be selected to provide enhanced transmissivity of radiant energy or light within a particular spectral band through stack 1528 and prismatic substrate 1522, while providing sufficient reflectivity of light having wavelengths outside of the selected particular spectral band. The, particular-spectral band may be selected to match the spectral band of light or radiant energy emitted by radiant energy emitting device 1544, such as in the manners discussed above. Optionally, the prismatic reflective element may include an imaging sensor or the like, such as discussed above with respect to electrochromic reflective element 1316 or 1416, without affecting the scope of the present invention.

The radiant energy emitting element or display element thus may be viewable through the prismatic substrate without requiring windows or the like formed in the reflective layer at the rear of the prismatic substrate. The layers or stacks of the present invention thus may provide an improved display on demand or display on need type of display element for a prismatic reflective element. Although shown as a prismatic or wedge-shaped substrate, the substrate may comprise a substantially flat substrate or may comprise a curved substrate having one or more curved surfaces, without affecting the scope of the present invention.

Although described as being implemented with interior rearview mirror assemblies, it is further envisioned that the layers or stacks of the present invention may be implemented with reflective elements for exterior rearview mirror assemblies, such as exterior electrochromic rearview mirror assemblies or other exterior rearview mirror assemblies, such as exterior rearview mirror assemblies having a single flat substrate or having a curved outer surface or substrate or the like, without affecting the scope of the present invention. For example, an exterior reflective element may have a stack of alternating layers (such as the types discussed above) that may have enhanced transmissivity of visible light that has a spectral band that matches a color output of a turn signal indicator or other indicator or light emitting device positioned behind the reflective element, such as within the casing of the exterior rearview mirror assembly. The indicator may thus be viewable through the reflective element when the indicator is activated, while the reflective element substantially reflects other light over its entire viewing surface. The exterior rearview mirror assembly of the present invention thus may provide an indicator for viewing through the reflective element without requiring a window to be formed in the reflective layer or surface of the exterior reflective element. The present invention thus may provide a display on demand or display on need type of display to an exterior rearview mirror assembly. Optionally, the alternating layers may comprise an IRT stack or IRT-DOD stack, such as described above, and the exterior rearview mirror assembly may include an infrared or near infrared emitting element, and may include an imaging sensor or device or camera, such as for a side or rearward imaging system of the vehicle (such as for a viewing system such as the types disclosed in U.S. Pat. Nos. 5,550,677; 5,670,935 and 6,201,642, which are hereby incorporated herein by reference, or such as for a lane change assist system or side objection detection system or the like, such as the types disclosed in U.S. patent application Ser. No. 10/209,173, filed Jul. 31, 2002, now U.S. Pat. No. 6,882,287, Ser. No. 10/427, 051, filed Apr. 30, 2003, now U.S. Pat. No. 7,038,577, which are hereby incorporated herein by reference). The near infrared emitting element or elements may be positioned within the exterior rearview mirror assembly and behind the reflective element and may provide illumination at the side of the vehicle without distracting or adversely affecting the view or vision of drivers of other vehicles at the side of the subject vehicle.

The present invention thus provides mirror reflective elements that provide substantial visible reflectivity, and that may provide substantial transmissivity of near infrared light, and that may also or otherwise provide substantial transmissivity of visible light within a selected spectral band or region or range of wavelengths. The mirror reflective elements of the present invention thus may be spectrally tuned for the desired application, while still providing the desired degree of photopic reflectivity and the desired conductivity on the conductive or semi-conductive layers, such that the electrochromic medium of the mirror cell colors or darkens in a desired manner.

The electrical connectors for the transflective electrochromic cells or elements of the present invention may comprise clip connectors, electrical busbars or the like, such as disclosed in U.S. Pat. Nos. 5,066,112 and 6,449,082, which are hereby incorporated herein by reference. Although shown as having the substrates and connectors offset, clearly the transflective element may comprise a flush element, such as described in U.S. Pat. No. 5,066,112, or such as described in U.S. provisional applications, Ser. No. 60/490,111, filed Jul. 25, 2003 by McCabe et al. for FLUSH ELECTROCHROMIC CELL; and Ser. No. 60/423,903, filed Nov. 5, 2002 by McCabe for ONE SIDED FLUSH ELECTROCHROMIC CELL, which are all hereby incorporated herein by reference. Such a flush transflective element may facilitate a no-bezel or bezelless or low bezel mirror casing or assembly, with minimal or no offset between the substrates of the mirror assembly.

As discussed above, the mirror assembly of the present invention may include a display for providing information for viewing by the driver of the vehicle on the reflective element so that the driver can easily see the display. In order to maintain easy viewing of the display, it is desirable to adjust the display intensity in response to ambient light levels (in order to avoid washout during daytime driving conditions and glare during nighttime driving conditions) and in response to the degree of transmissivity of the electrochromic reflective element. For example, in low lighting conditions, such as during the nighttime, the intensity of the display may be dimmed to avoid glare, while in higher lighting conditions, such as during the daytime, the intensity of the display may be increased to provide sufficient visibility of the display to the driver of the vehicle. The mirror assembly may include light sensors for sensing the ambient light in the cabin of the vehicle or at the mirror assembly and may include a control which is operable to automatically adjust the display intensity and/or the transmissivity of the electrochromic medium in response to the ambient light sensors.

Further, automatic dimming circuitry used in electrochromic mirror assemblies utilizing the reflective elements of the current invention may utilize one or more (typically two) photo sensors to detect glaring and/or ambient lighting. For example, a silicon photo sensor such as a TSL235R Light-to-Frequency converter (available from Texas Advanced Optoelectronic Solutions Inc. of Plano, Tex.) can be used as such photo sensors. Such light-to-frequency converters comprise the combination of a silicon photodiode and a current-to-frequency converter on a single monolithic CMOS integrated circuit.

The mirror assembly or assemblies of the present invention may also include or house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays, such as shown in U.S. Pat. Nos. 5,530,240 and 6,329,925, blind spot detection systems, such as disclosed in U.S. Pat. Nos. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S.

Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, such as disclosed in U.S. Pat. Nos. 6,243,003 and 6,278,377, speakers, a compass, such as disclosed in U.S. Pat. No. 5,924,212 or U.S. patent application Ser. No. 10/456,599, filed Jun. 6, 2003, now U.S. Pat. No. 7,004,593, seat occupancy detector, a trip computer, an ONSTAR® system or the like (with all of the above-referenced patents and applications being commonly assigned to Donnelly Corporation, and with the disclosures of the referenced patents and applications being hereby incorporated herein by reference in their entireties).

The mirror assembly and/or reflective element of the present invention may include a printed circuit board (PCB) which may be attached to its rear surface (e.g. the fourth surface) by, for example, a suitable adhesive or the like. An example of such an arrangement is disclosed in commonly assigned U.S. Pat. No. 5,820,245, which is incorporated in its entirety by reference herein. The PCB optionally may include glare sensing and ambient photo sensors and electrochromic circuitry that automatically dims the reflectivity of the electrochromic mirror element when glare conditions are detected, such as at nighttime or the like. Alternately, the PCB may be snap connected, by a clip or otherwise attached, to a plastic plate that itself is adhered to the electrochromic element.

The printed circuit board may include electronic or electrical circuitry for actuating the variable reflectance of the reflective element and for operating other electrical or electronic functions supported in the rearview mirror assembly. The circuit board may support, for example, light emitting diodes (LEDs) for illuminating indicia on display elements provided on the chin of the bezel of the mirror assembly or display devices provided on the reflective element, or map or dash board lights or the like. The circuit board may be independently supported from the reflective element or in the casing or may be mounted to the reflective element's rear or fourth surface on a separate plate or may be directly adhered to the rear surface by a suitable adhesive. Reference is made to U.S. Pat. Nos. 5,671,996 and 5,820,245, the disclosures of which are hereby incorporated herein by reference in their entireties.

Therefore, the present invention provides a reflective element which provides a combination of substantially transparent, conductive or semi-conductive layers and substantially reflective, conductive metallic layer or layers on one of the surfaces of the reflective element, such as the inward surface (or third surface) of a second substrate of an electrochromic reflective element or a rear surface (or fourth surface) of an electrochromic reflective element or a rear surface of a prismatic reflective element or the like. The reflective element of the present invention provides enhanced manufacturing processing of the reflective element, since the thicknesses of the layers and tolerances associated therewith are sufficiently large enough to be sputter coated or otherwise deposited via a low cost process. The reflective element of the present invention also provides for a reflective and transmissive element which allows transmission of display information through the reflective element, while still providing sufficient reflectance over the entire surface of the reflective element, even in the display area. Accordingly, multiple displays may be positioned on, at or around the reflective element, without loss of reflectivity of the element. The materials and thicknesses of the layers of the reflective element may be selected to spectrally tune the reflective element to allow transmission of one or more particular spectral bands or range of wavelengths, in order to tune the reflective element for use with a particular spectral band of light being emitted by a particular display. The materials and thicknesses of the layers may also be selected to spectrally tune the reflective element to enhance transmissivity of near infrared radiant energy. Also, the thicknesses of one or more layers may be varied across the mirror element to provide regions or areas of increased transmissivity for a display, while maintaining a desired level of reflectivity at the principle viewing area of the mirror element. The mirror element may comprise an electrochromic element or a prismatic element and may be implemented at an interior rearview mirror assembly or an exterior rearview mirror assembly. Optionally, the mirror element may comprise a substantially flat element or may comprise a curved element, such as a convex element or aspheric element or the like.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. An interior rearview mirror system for a vehicle, said interior rearview mirror system comprising:
   an interior electrochromic rearview mirror assembly comprising an electrochromic reflective element;
   wherein said electrochromic reflective element comprises a front substrate and a rear substrate, said front substrate having first and second surfaces and said rear substrate having third and fourth surfaces, and wherein said front substrate and said rear substrate are arranged so that said second surface of said front substrate opposes said third surface of said rear substrate with an electrochromic medium disposed therebetween;
   wherein a mirror reflector is established at said third surface of said rear substrate and wherein said mirror reflector comprises a transflective mirror reflector that is partially transmissive to visible light and partially reflective of visible light incident thereat;
   wherein said transflective mirror reflector comprises at least three layers, and wherein said three layers comprise a metallic layer, a transparent conductive metal oxide layer and a transparent dielectric metal oxide layer;
   wherein said metallic layer is closer to said electrochromic medium than said transparent conductive metal oxide layer and said transparent dielectric metal oxide layer, and wherein said transparent conductive metal oxide layer and said transparent dielectric metal oxide layer are disposed between said metallic layer and said third surface of said rear substrate;
   wherein said at least three layers of said transflective mirror reflector are established at said third surface of said rear substrate by a vacuum deposition process comprising sputtering from multiple sputtering targets in a single vacuum deposition chamber;
   wherein, during sputtering of said metallic layer of said transflective mirror reflector, a perimeter region of said third surface of said rear substrate is masked so that said metallic layer is not sputtered onto the masked perimeter region of said third surface of said rear substrate; and
   wherein said vacuum deposition process comprises use of an ion source, and wherein said ion source comprises at least one of (i) an anode layer source, (ii) a Kaufmann source, (iii) a gridded source, (iv) a non-gridded source, (v) an RF source and (vi) a linear ion source.

2. The interior rearview mirror system of claim 1, wherein said ion source is used for substrate cleaning.

3. The interior rearview mirror system of claim 1, wherein said metallic layer comprises one of a silver metallic layer and a silver alloy metallic layer.

4. The interior rearview mirror system of claim 3, wherein said transparent conductive metal oxide layer comprises one of indium tin oxide and tin oxide.

5. The interior rearview mirror system of claim 3, wherein said transparent dielectric metal oxide layer comprises one of titanium oxide and silicon oxide.

6. The interior rearview mirror system of claim 1, wherein said metallic layer has a specific resistivity of less than approximately $5 \times 10^{-5}$ ohm·cm.

7. The interior rearview mirror system of claim 1, wherein said transparent conductive metal oxide layer comprises an indium tin oxide layer and said transparent dielectric metal oxide layer comprises a titanium oxide layer.

8. The interior rearview mirror system of claim 7, wherein said indium tin oxide layer is disposed between said titanium oxide layer and said third surface of said rear substrate.

9. The interior rearview mirror system of claim 1, wherein one of said multiple sputtering targets comprises a silver alloy metal target.

10. The interior rearview mirror system of claim 9, wherein another of said multiple sputtering targets comprises a metal oxide target.

11. The interior rearview mirror system of claim 10, wherein said metal oxide target comprises an indium tin oxide target.

12. The interior rearview mirror system of claim 11, wherein one of said multiple sputtering targets comprises a titanium oxide target.

13. The interior rearview mirror system of claim 1, wherein a metallic layer at least partially traverses a portion of the perimeter region of said third surface of said rear substrate and wherein said metallic layer that at least partially traverses the portion of the perimeter region of said third surface of said rear substrate is in electrical continuity with said transflective mirror reflector.

14. The interior rearview mirror system of claim 13, wherein said metallic layer that traverses the portion of the perimeter region of said third surface of said rear substrate comprises a tab out portion of said metallic layer of said transflective mirror reflector.

15. The interior rearview mirror system of claim 1, wherein said interior rearview mirror system comprises a display device disposed behind said transflective mirror reflector of said electrochromic reflective element, wherein said display device comprises a display screen backlit by a plurality of light emitting diodes, and wherein information displayed by said display device when said plurality of light emitting diodes is activated is viewable by a driver of a vehicle equipped with said interior rearview mirror system when the driver is normally operating the equipped vehicle, and wherein, when said plurality of light emitting diodes is activated and said display device is displaying information, light emitted by said plurality of light emitting diodes passes through said display screen and through said transflective mirror reflector for viewing by the driver of the equipped vehicle.

16. The interior rearview mirror system of claim 15, wherein said display screen comprises an active matrix liquid crystal display screen and wherein said plurality of light emitting diodes comprises a plurality of white light-emitting light emitting diodes.

17. The interior rearview mirror system of claim 15, wherein said displayed information comprises information related to a driver assist function.

18. The interior rearview mirror system of claim 1, comprising a camera disposed behind said transflective mirror reflector and viewing through said transflective mirror reflector, wherein said transflective mirror reflector is transmissive of light in at least one of the infrared spectral region and the near infrared spectral region, and wherein said camera is sensitive to light in at least one of the infrared spectral region and the near infrared spectral region.

19. An interior rearview mirror system for a vehicle, said interior rearview mirror system comprising:

an interior electrochromic rearview mirror assembly comprising an electrochromic reflective element;

wherein said electrochromic reflective element comprises a front substrate and a rear substrate, said front substrate having first and second surfaces and said rear substrate having third and fourth surfaces, and wherein said front substrate and said rear substrate are arranged so that said second surface of said front substrate opposes said third surface of said rear substrate with an electrochromic medium disposed therebetween;

wherein a mirror reflector is established at said third surface of said rear substrate and wherein said mirror reflector comprises a transflective mirror reflector that is partially transmissive to visible light and partially reflective of visible light incident thereat;

wherein said transflective mirror reflector comprises at least three layers, and wherein said three layers comprise a metallic layer, a transparent conductive metal oxide layer and a transparent dielectric metal oxide layer;

wherein said metallic layer comprises one of a silver metallic layer and a silver alloy metallic layer;

wherein said transparent conductive metal oxide layer comprises an indium tin oxide layer and wherein said transparent dielectric metal oxide layer comprises a titanium oxide layer;

wherein said metallic layer is closer to said electrochromic medium than said transparent conductive metal oxide layer and said transparent dielectric metal oxide layer, and wherein said transparent conductive metal oxide layer and said transparent dielectric metal oxide layer are disposed between said metallic layer and said third surface of said rear substrate;

wherein said at least three layers of said transflective mirror reflector are established at said third surface of said rear substrate by a vacuum deposition process comprising sputtering from multiple sputtering targets in a single vacuum deposition chamber; and wherein one of said multiple sputtering targets comprises one of a silver metal target and a silver alloy metal target, and wherein another of said multiple sputtering targets comprises an indium tin oxide target and wherein another of said multiple sputtering targets comprises a titanium oxide target.

20. The interior rearview mirror system of claim 19, wherein said vacuum deposition process comprises use of an ion source for substrate cleaning.

21. The interior rearview mirror system of claim 20, wherein said ion source comprises at least one of (i) an anode layer source, (ii) a Kaufmann source, (iii) a gridded source, (iv) a non-gridded source, (v) an RF source and (vi) a linear ion source.

22. The interior rearview mirror system of claim 19, wherein said transparent conductive metal oxide layer is disposed between said transparent dielectric metal oxide layer and said third surface of said rear substrate.

23. The interior rearview mirror system of claim 19, wherein, during sputtering of said metallic layer of said transflective mirror reflector, a perimeter region of said third surface of said rear substrate is masked so that said metallic layer is not sputtered onto the masked perimeter region of said third surface of said rear substrate.

24. The interior rearview mirror system of claim 23, wherein a metallic layer at least partially traverses a portion of the perimeter region of said third surface of said rear substrate and wherein said metallic layer that at least partially traverses the portion of the perimeter region of said third surface of said rear substrate is in electrical continuity with said transflective mirror reflector.

25. The interior rearview mirror system of claim 24, wherein said metallic layer that traverses the portion of the perimeter region of said third surface of said rear substrate comprises a tab out portion of said metallic layer of said transflective mirror reflector.

26. An interior rearview mirror system for a vehicle, said interior rearview mirror system comprising:
an interior electrochromic rearview mirror assembly comprising an electrochromic reflective element;
wherein said electrochromic reflective element comprises a front substrate and a rear substrate, said front substrate having first and second surfaces and said rear substrate having third and fourth surfaces, and wherein said front substrate and said rear substrate are arranged so that said second surface of said front substrate opposes said third surface of said rear substrate with an electrochromic medium disposed therebetween;
wherein a mirror reflector is established at said third surface of said rear substrate and wherein said mirror reflector comprises a transflective mirror reflector that is partially transmissive to visible light and partially reflective of visible light incident thereat;
wherein said transflective mirror reflector comprises at least three layers, and wherein said three layers comprise a metallic layer, a transparent conductive metal oxide layer and a transparent dielectric metal oxide layer;
wherein said metallic layer comprises one of a silver metallic layer and a silver alloy metallic layer;
wherein said metallic layer is closer to said electrochromic medium than said transparent conductive metal oxide layer and said transparent dielectric metal oxide layer, and wherein said transparent conductive metal oxide layer and said transparent dielectric metal oxide layer are disposed between said metallic layer and said third surface of said rear substrate;
wherein said at least three layers of said transflective mirror reflector are established at said third surface of said rear substrate by a vacuum deposition process comprising sputtering from multiple sputtering targets in a single vacuum deposition chamber;
wherein said vacuum deposition process comprises use of an ion source; and
wherein at least one of (a) said interior rearview mirror system comprises a display device disposed behind said transflective mirror reflector of said electrochromic reflective element, wherein said display device comprises a display screen backlit by a plurality of light emitting diodes, and wherein information displayed by said display device when said plurality of light emitting diodes is activated is viewable by a driver of a vehicle equipped with said interior rearview mirror system when the driver is normally operating the equipped vehicle, and wherein, when said plurality of light emitting diodes is activated and said display device is displaying information, light emitted by said plurality of light emitting diodes passes through said display screen and through said transflective mirror reflector for viewing by the driver of the equipped vehicle, and (b) a camera is disposed behind said transflective mirror reflector and views through said transflective mirror reflector, wherein said transflective mirror reflector is transmissive of light in at least one of the infrared spectral region and the near infrared spectral region and wherein said camera is sensitive to light in at least one of the infrared spectral region and the near infrared spectral region.

27. The interior rearview mirror system of claim 26, wherein said ion source comprises a linear ion source.

28. The interior rearview mirror system of claim 26, wherein said transparent conductive metal oxide layer is disposed between said transparent dielectric metal oxide layer and said third surface of said rear substrate.

29. The interior rearview mirror system of claim 26, wherein, during sputtering of said metallic layer of said transflective mirror reflector, a perimeter region of said third surface of said rear substrate is masked so that said metallic layer is not sputtered onto the masked perimeter region of said third surface of said rear substrate.

30. The interior rearview mirror system of claim 29, wherein a metallic layer at least partially traverses a portion of the perimeter region of said third surface of said rear substrate and wherein said metallic layer that at least partially traverses the portion of the perimeter region of said third surface of said rear substrate is in electrical continuity with said transflective mirror reflector.

31. The interior rearview mirror system of claim 30, wherein said metallic layer that traverses the portion of the perimeter region of said third surface of said rear substrate comprises a tab out portion of said metallic layer of said transflective mirror reflector.

32. An interior rearview mirror system for a vehicle, said interior rearview mirror system comprising:
an interior electrochromic rearview mirror assembly comprising an electrochromic reflective element;
wherein said electrochromic reflective element comprises a front substrate and a rear substrate, said front substrate having first and second surfaces and said rear substrate having third and fourth surfaces, and wherein said front substrate and said rear substrate are arranged so that said second surface of said front substrate opposes said third surface of said rear substrate with an electrochromic medium disposed therebetween;
wherein a mirror reflector is established at said third surface of said rear substrate and wherein said mirror reflector comprises a transflective mirror reflector that is partially transmissive to visible light and partially reflective of visible light incident thereat;
wherein said transflective mirror reflector comprises at least three layers, and wherein said three layers comprise a metallic layer, a transparent conductive metal oxide layer and a transparent dielectric metal oxide layer;
wherein said metallic layer comprises one of a silver metallic layer and a silver alloy metallic layer;
wherein said transparent conductive metal oxide layer comprises one of indium tin oxide and tin oxide, and wherein said transparent dielectric metal oxide layer comprises one of titanium oxide and silicon oxide;
wherein said metallic layer is closer to said electrochromic medium than said transparent conductive metal oxide layer and said transparent dielectric metal oxide layer, and wherein said transparent conductive metal oxide layer and said transparent dielectric metal oxide layer are disposed between said metallic layer and said third surface of said rear substrate;

wherein said at least three layers of said transflective mirror reflector are established at said third surface of said rear substrate by a vacuum deposition process comprising sputtering from multiple sputtering targets in a single vacuum deposition chamber;

wherein, during sputtering of said metallic layer of said transflective mirror reflector, a perimeter region of said third surface of said rear substrate is masked so that said metallic layer is not sputtered onto the masked perimeter region of said third surface of said rear substrate; and wherein a metallic layer at least partially traverses a portion of the perimeter region of said third surface of said rear substrate and wherein said metallic layer that at least partially traverses the portion of the perimeter region of said third surface of said rear substrate is in electrical continuity with said transflective mirror reflector.

33. The interior rearview mirror system of claim 32, wherein said metallic layer that traverses the portion of the perimeter region of said third surface of said rear substrate comprises a tab out portion of said metallic layer of said transflective mirror reflector.

34. The interior rearview mirror system of claim 32, wherein at least one of (a) said vacuum deposition process comprises use of an ion source, and wherein said ion source comprises at least one of (i) an anode layer source, (ii) a Kaufmann source, (iii) a gridded source, (iv) a non-gridded source, (v) an RF source and (vi) a linear ion source, and (b) an ion source is used for substrate cleaning.

35. The interior rearview mirror system of claim 32, wherein at least one of (a) one of said multiple sputtering targets comprises a silver alloy metal target, (b) one of said multiple sputtering targets comprises a metal oxide target, (c) one of said multiple sputtering targets comprises an indium tin oxide target and (d) one of said multiple sputtering targets comprises a titanium oxide target.

36. The interior rearview mirror system of claim 32, wherein said interior rearview mirror system comprises a display device disposed behind said transflective mirror reflector of said electrochromic reflective element, wherein said display device comprises a display screen backlit by a plurality of light emitting diodes, and wherein information displayed by said display device when said plurality of light emitting diodes is activated is viewable by a driver of a vehicle equipped with said interior rearview mirror system when the driver is normally operating the equipped vehicle, and wherein, when said plurality of light emitting diodes is activated and said display device is displaying information, light emitted by said plurality of light emitting diodes passes through said display screen and through said transflective mirror reflector for viewing by the driver of the equipped vehicle.

37. The interior rearview mirror system of claim 36, wherein said display screen comprises an active matrix liquid crystal display screen and wherein said plurality of light emitting diodes comprises a plurality of white light-emitting light emitting diodes.

38. The interior rearview mirror system of claim 36, wherein said displayed information comprises information related to a driver assist function.

* * * * *

UNITED STATES PATENT AND TRADEMARK OFFICE
CERTIFICATE OF CORRECTION

| | | |
|---|---|---|
| PATENT NO. | : 8,400,704 B2 | Page 1 of 2 |
| APPLICATION NO. | : 13/555553 | |
| DATED | : March 19, 2013 | |
| INVENTOR(S) | : Ian A. McCabe et al. | |

It is certified that error appears in the above-identified patent and that said Letters Patent is hereby corrected as shown below:

In the Specification

Column 1:
Line 52, Delete "," after --the--

Column 2:
Line 20, "minor" should be --mirror--

Column 9:
Line 47, "FIG," should be --FIG.--

Column 13:
Line 15, "oxides;" should be --oxides,--

Column 14:
Line 14, Delete "," after --24--444
Line 17, "FIG," should be --FIG.--

Column 16:
Line 38, Delete "," after --allow--

Column 26:
Line 32, "1116c," should be --1116c.--

Column 27:
Line 10, "151" should be --ISI--

Column 31:
Line 24, "FIG. 21;" should be --FIG. 21,--

Signed and Sealed this
Seventh Day of April, 2015

Michelle K. Lee
*Director of the United States Patent and Trademark Office*

Column 32:
Line 41, "FIG," should be --FIG.--

Column 33:
Line 49, "1316'" should be --1316"--

Column 36:
Line 63, "The, particular-spectral" should be --The particular spectral--